(12) United States Patent
Wyndham et al.

(10) Patent No.: US 10,092,893 B2
(45) Date of Patent: *Oct. 9, 2018

(54) SUPERFICIALLY POROUS MATERIALS COMPRISING A SUBSTANTIALLY NONPOROUS HYBRID CORE HAVING NARROW PARTICLE SIZE DISTRIBUTION; PROCESS FOR THE PREPARATION THEREOF; AND USE THEREOF FOR CHROMATOGRAPHIC SEPARATIONS

(75) Inventors: Kevin D. Wyndham, Upton, MA (US); Beatrice W. Muriithi, Franklin, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/638,924

(22) PCT Filed: Jul. 25, 2011

(86) PCT No.: PCT/US2011/045246
§ 371 (c)(1),
(2), (4) Date: Feb. 14, 2013

(87) PCT Pub. No.: WO2012/018596
PCT Pub. Date: Feb. 9, 2012

(65) Prior Publication Data
US 2013/0206665 A1    Aug. 15, 2013

Related U.S. Application Data

(60) Provisional application No. 61/367,797, filed on Jul. 26, 2010.

(51) Int. Cl.
*B01J 20/32* (2006.01)
*B01J 20/282* (2006.01)
(Continued)

(52) U.S. Cl.
CPC ....... *B01J 20/283* (2013.01); *B01J 20/28004* (2013.01); *B01J 20/285* (2013.01);
(Continued)

(58) Field of Classification Search
None
See application file for complete search history.

(56) References Cited

U.S. PATENT DOCUMENTS

| | | |
|---|---|---|
| 3,808,125 A | 4/1974 | Good |
| 3,892,678 A | 7/1975 | Halasz et al. |

(Continued)

FOREIGN PATENT DOCUMENTS

| | | |
|---|---|---|
| EP | 0852334 | 7/1998 |
| EP | 1163050 | 12/2001 |

(Continued)

OTHER PUBLICATIONS

Asiaie et al. "Sintered Octadecylsilica as Monolithic Column Packing in Capillary Electrochromatography and Micro High-Performacne Liquid Chromatography", J. Chromatogr. A, 806: 251-263 (1998).

(Continued)

*Primary Examiner* — Kara Graber
(74) *Attorney, Agent, or Firm* — Womble Bond Dickinson (US) LLP; Deborah Vernon; Rebecca Barnes

(57) ABSTRACT

The present invention provides novel chromatographic materials, e.g., for chromatographic separations, processes for its preparation and separations devices containing the chromatographic material; separations devices, chromatographic columns and kits comprising the same; and methods for the preparation thereof. The chromatographic materials of the invention are chromatographic materials comprising having a narrow particle size distribution.

20 Claims, 7 Drawing Sheets

SEM (left) and FIB/SEM (middle, right) analysis of selected superficially porous particles prepared by the process of the invention.

(51) Int. Cl.
*B01J 20/285* (2006.01)
*B01J 20/283* (2006.01)
*B01J 20/286* (2006.01)
*B01J 20/28* (2006.01)

(52) U.S. Cl.
CPC ....... *B01J 20/286* (2013.01); *B01J 20/28057* (2013.01); *B01J 20/3204* (2013.01); *B01J 20/3219* (2013.01); *B01J 20/3236* (2013.01); *B01J 20/3257* (2013.01); *B01J 20/3289* (2013.01); *B01J 20/3293* (2013.01); *B01J 20/28071* (2013.01); *Y10T 428/2991* (2015.01)

(56) References Cited

U.S. PATENT DOCUMENTS

| | | |
|---|---|---|
| 3,935,299 A | 1/1976 | Kiselev et al. |
| 4,017,528 A | 4/1977 | Unger et al. |
| 4,029,583 A | 6/1977 | Ho Chang et al. |
| 4,104,363 A | 8/1978 | Vozka et al. |
| 4,169,069 A | 9/1979 | Unger et al. |
| 4,324,689 A | 4/1982 | Shah |
| 4,327,191 A | 4/1982 | Dromard et al. |
| 4,334,118 A | 6/1982 | Manning |
| 4,415,631 A | 11/1983 | Schutijser |
| 4,477,492 A | 10/1984 | Bergna et al. |
| 4,724,207 A | 2/1988 | Hou et al. |
| 4,775,520 A | 10/1988 | Unger et al. |
| 4,874,518 A | 10/1989 | Kirkland et al. |
| 4,889,632 A | 12/1989 | Svec et al. |
| 4,911,903 A | 3/1990 | Unger et al. |
| 4,923,610 A | 5/1990 | Svec et al. |
| 4,952,349 A | 8/1990 | Svec et al. |
| 4,983,369 A | 1/1991 | Barder et al. |
| 5,068,387 A | 11/1991 | Kleyer et al. |
| 5,071,565 A | 12/1991 | Fritz et al. |
| 5,108,595 A | 4/1992 | Kirkland et al. |
| 5,137,627 A | 8/1992 | Feibush |
| 5,154,822 A | 10/1992 | Simpson et al. |
| 5,177,128 A | 1/1993 | Lindemann et al. |
| 5,194,333 A | 3/1993 | Ohnaka et al. |
| 5,250,186 A | 10/1993 | Dollinger et al. |
| 5,256,386 A | 10/1993 | Nystrom et al. |
| 5,271,833 A | 12/1993 | Funkenbusch et al. |
| 5,298,833 A | 3/1994 | Hou |
| 5,304,243 A | 4/1994 | Yamaguchi et al. |
| 5,374,755 A | 12/1994 | Neue et al. |
| 5,378,790 A | 1/1995 | Michalczyk et al. |
| 5,403,908 A | 4/1995 | Watanabe et al. |
| 5,425,930 A | 6/1995 | Anderson |
| 5,453,185 A | 9/1995 | Frechet et al. |
| 5,498,678 A | 3/1996 | Steffier |
| 5,548,051 A | 8/1996 | Michalczyk et al. |
| 5,558,849 A | 9/1996 | Sharp |
| 5,565,142 A | 10/1996 | Deshpande et al. |
| 5,624,875 A | 4/1997 | Nakanishi et al. |
| 5,637,135 A | 6/1997 | Ottenstein et al. |
| 5,650,474 A | 7/1997 | Yamaya et al. |
| 5,651,921 A | 7/1997 | Kaijou et al. |
| 5,667,674 A | 9/1997 | Hanggi et al. |
| 5,670,257 A | 9/1997 | Sakai et al. |
| 5,728,457 A | 3/1998 | Frechet et al. |
| 5,734,020 A | 3/1998 | Wong |
| 5,856,379 A | 1/1999 | Shiratsuchi et al. |
| 5,866,006 A | 2/1999 | Lihme et al. |
| 5,869,152 A | 2/1999 | Colon |
| 5,935,429 A * | 8/1999 | Liao .................. B01D 15/1807 210/198.2 |
| 5,965,202 A | 10/1999 | Taylor-Smith et al. |
| 5,976,479 A | 11/1999 | Alcaraz et al. |
| 5,988,655 A | 11/1999 | Sakai et al. |
| 6,017,632 A | 1/2000 | Pinnavaia et al. |
| 6,022,902 A | 2/2000 | Koontz |
| 6,027,643 A | 2/2000 | Small et al. |
| 6,090,477 A | 7/2000 | Burchell et al. |
| 6,136,187 A | 10/2000 | Zare et al. |
| 6,183,867 B1 | 2/2001 | Barthel et al. |
| 6,207,098 B1 | 3/2001 | Nakanishi et al. |
| 6,210,570 B1 | 4/2001 | Holloway |
| 6,227,304 B1 | 5/2001 | Schlegel |
| 6,238,565 B1 | 5/2001 | Hatch |
| 6,248,686 B1 | 6/2001 | Inagaki et al. |
| 6,251,280 B1 | 6/2001 | Dai et al. |
| 6,271,292 B1 | 8/2001 | Mager et al. |
| 6,277,304 B1 | 8/2001 | Wei et al. |
| 6,281,257 B1 | 8/2001 | Ma et al. |
| 6,288,198 B1 | 9/2001 | Mechtel et al. |
| 6,313,219 B1 | 11/2001 | Taylor-Smith |
| 6,375,864 B1 | 4/2002 | Phillips et al. |
| 6,380,266 B1 | 4/2002 | Katz et al. |
| 6,395,341 B1 | 5/2002 | Arakawa et al. |
| 6,465,387 B1 | 10/2002 | Pinnavaia et al. |
| 6,476,098 B1 | 11/2002 | Arakawa et al. |
| 6,491,823 B1 | 12/2002 | Safir et al. |
| 6,528,167 B2 | 3/2003 | O'Gara |
| 6,599,951 B2 | 7/2003 | Zampini et al. |
| 6,663,668 B1 | 12/2003 | Chaouk et al. |
| 6,686,035 B2 | 2/2004 | Jiang et al. |
| 6,881,804 B1 | 4/2005 | Sellergren et al. |
| 7,064,234 B2 | 6/2006 | Lindner et al. |
| 7,175,913 B2 | 2/2007 | O'Gara |
| 7,211,192 B2 | 5/2007 | Shea et al |
| 7,223,473 B2 | 5/2007 | Jiang et al. |
| 7,250,214 B2 | 7/2007 | Walter et al. |
| 7,439,272 B2 | 10/2008 | Xu |
| 7,488,559 B2 | 2/2009 | Inagaki et al. |
| 7,846,337 B2 | 12/2010 | Chen et al. |
| 7,919,177 B2 | 4/2011 | Jiang et al. |
| 8,404,346 B2 | 3/2013 | Walter et al. |
| 8,658,277 B2 | 2/2014 | Wyndham et al. |
| 2001/0033931 A1 | 10/2001 | Jiang et al. |
| 2002/0070168 A1 | 6/2002 | Jiang et al. |
| 2003/0150811 A1 | 8/2003 | Walter et al. |
| 2004/0035793 A1 | 2/2004 | Legendre et al. |
| 2004/0048067 A1 | 3/2004 | O'Gara |
| 2004/0191516 A1 | 9/2004 | Jiang et al. |
| 2005/0051489 A1 | 3/2005 | Tai et al. |
| 2005/0178730 A1 | 8/2005 | Li |
| 2005/0230298 A1 | 10/2005 | Jiang et al. |
| 2005/0281884 A1 | 12/2005 | Adair et al. |
| 2006/0070937 A1 | 4/2006 | Rustamov et al. |
| 2006/0144770 A1* | 7/2006 | Granger et al. .......... 210/198.2 |
| 2006/0194919 A1 | 8/2006 | Lichtenhan et al. |
| 2006/0207923 A1 | 9/2006 | Li |
| 2007/0090052 A1 | 4/2007 | Broske et al. |
| 2007/0135304 A1 | 6/2007 | Walter et al. |
| 2007/0189944 A1* | 8/2007 | Kirkland ............. B01J 20/28004 423/118.1 |
| 2007/0215547 A1 | 9/2007 | O'Gara |
| 2007/0243383 A1 | 10/2007 | Jiang et al. |
| 2008/0053894 A1 | 3/2008 | O'Gara |
| 2008/0269368 A1 | 10/2008 | Wyndham et al. |
| 2008/0277346 A1 | 11/2008 | Kirkland et al. |
| 2009/0053524 A1 | 2/2009 | Yamada et al. |
| 2009/0127177 A1 | 5/2009 | Jiang et al. |
| 2009/0209722 A1 | 8/2009 | Jiang et al. |
| 2009/0277838 A1 | 11/2009 | Liu et al. |
| 2009/0277839 A1 | 11/2009 | Linford |
| 2009/0297853 A1 | 12/2009 | Kirkland et al. |
| 2010/0005187 A1 | 1/2010 | Breiter et al. |
| 2010/0051877 A1* | 3/2010 | Wei et al. .................. 252/408.1 |
| 2010/0076103 A1 | 3/2010 | Wyndham et al. |
| 2010/0206797 A1 | 8/2010 | Chen et al. |
| 2011/0100916 A1* | 5/2011 | Shannon ................ B01D 15/08 210/660 |

(56) References Cited

U.S. PATENT DOCUMENTS

| | | |
|---|---|---|
| 2012/0055860 A1 | 3/2012 | Wyndham |
| 2013/0112605 A1 | 5/2013 | Wyndham et al. |
| 2013/0135610 A1 | 5/2013 | Bouvier et al. |
| 2014/0284259 A1 | 9/2014 | Jiang et al. |
| 2016/0184736 A1 | 6/2016 | Wyndham et al. |

FOREIGN PATENT DOCUMENTS

| | | |
|---|---|---|
| JP | 50-080400 A | 6/1975 |
| JP | 58-120525 A | 7/1983 |
| JP | 59-054619 A | 3/1984 |
| JP | S60-257358 A | 12/1985 |
| JP | H04-187237 | 7/1992 |
| JP | 06-064915 A | 3/1994 |
| JP | H07-120450 | 5/1995 |
| JP | 2893104 A | 9/1995 |
| JP | 07247180 | 9/1995 |
| JP | 09-278485 A | 10/1997 |
| JP | 10062401 A | 3/1998 |
| JP | 10328558 A | 12/1998 |
| JP | H11-199351 A | 7/1999 |
| JP | 2008-503716 A | 2/2008 |
| JP | 2009-540276 A | 11/2009 |
| WO | WO-98/058253 A1 | 12/1998 |
| WO | WO-99/037705 A1 | 7/1999 |
| WO | WO-00/45951 A1 | 8/2000 |
| WO | WO-01/18790 A1 | 3/2001 |
| WO | WO-0237506 A1 | 5/2002 |
| WO | WO-2002060562 A1 | 8/2002 |
| WO | WO-03/14450 A1 | 2/2003 |
| WO | WO-03/22392 A1 | 3/2003 |
| WO | WO-04/41398 A2 | 5/2004 |
| WO | WO-2005/079427 A2 | 9/2005 |
| WO | WO-2006019988 A1 | 2/2006 |
| WO | WO-2008085435 A1 | 7/2008 |
| WO | 2008103423 | 8/2008 |
| WO | WO-2008103423 A1 | 8/2008 |
| WO | WO-2009/126207 A1 | 10/2009 |

OTHER PUBLICATIONS

Bereznitski, et al. "Characterization of silica-based octyl phases of different bonding density part II. Studies of surface properties andchromatographic selectivity," 1998. J. Chromatogr. A 828:59-73.
Boury et al. "Generation of porosity in a hybrid organic-inorganic xerogel by chemical treatment," 1999. New J. Chem. 23: 531-538.
Boury et al., "Hybrid organic-inorganic xerogel access to meso- and microporous silica by thermal and chemical treatment," 1999. Chem. Mater. 11:281-291.
Collioud, et al. "Oriented and covalent immobilization of target molecules to solid supports: synthesis and application of a light-activatable and thiol-reactive cross-linking reagent," 1993. Bioconjugate 4:528-536.
Czajkowska et al., "Adsorption, thermogravimetric, and chromatographic studies of bare silicas and silica-based octyl bonded phases," 1998. J. Liq. Chromatogr. Relat. Technol. 21:1957-1977.
Chujo et al., "New Preparative Methods for Organic-Inorganic Polymer Hybrids", Polymeric Materials: Science & Engineering 2001, 84, 783.
Chujo et al., "New Preparative Methods for Organic=Inorganic Polymer Hybrids", Mrs Bulletin/May 2001; 389-392.
Dulay et al., "Preparation and Characterization of Monolithic Porous Capillary Columns Loaded with Chromatographic Particles", Anal. Chem., 70(23): 5103-5107 (1998).
Feng et al., "Synthesis of Polymer-Modified Mesoporous Materials Via the Nonsurfactant-Templated Sol-Gel Process", Polymer Preprints 2000, 41(1), 515-516.
Feng et al., "Synthesis of Polystyrene-silica hybrid mesoporous materials via the nonsurfactant-templated Sol-Gel Process", J. Mater. Chem., 2000, 10, 2490-2494.
Goldstein, et al., "Microwave Sintereing of Amorphous Silica Powders", J. of Mat. Sci. Letters, 16: 310-312 (1997).
Grun et al., Microporous and Mesoporous Materials 1999, 27, pp. 207.
Hileman et al., Anal. Chem. 1973, 45, pp. 1126.
Hanson, M. J. Chromatography A, 1993, 656, pp. 369.
Inagaki, et al. J. Am. Chem. Soc. 1999, 121, 9611.
Jones et al., "The oxidation of the carbon-silicon bond," 1996. Tetrahedron, 52(22):7599-7662.
Maskos et al., "Oligonucleotide hybridizations on glass supports: a novel linker for oligonucleotide synthesis and hybridization properties of oligonucleotides synthesised in situ," 1992. Nucleic Acids Research 20(7):1679-1684.
MacBeath et al., "Printing proteins as microarrays for high-throughput function determination," 2000. Science 289:1760-1763.
Nawrocki et al., "Influence of silica surface chemistry and structure on the properties, structure and coverage of alkyl-bonded phases for high-performance liquid chromatography," 1988. J. of Chromatography 449(1):1-24.
Nawrocki, "Silica surface controversies, strong adsorption sites, their blockage and removal. Part 1," 1991. Chromatographia 31(3-4):177-192.
Neue et al., "Use of high-performance LC packings from pH 1 to pH 12," 1999 American Laboratory, p. 36-39.
O'Gara et al., "Simple preparation of C8 HPLC stationary phase with an internal polar functional group," 1995 Analytical Chemistry 67:3809-13.
O'Gara et al., "Dependence of cyano bonded phase hydrolytic stability on ligand structure and solution pH," 2000 J. Chromatogr. A 893:245-251.
Petro et al., Chromatograhia, 1993, 9/10, pp. 549.
Perry, R.J., Chemtech, 1999, pp. 39.
Reynolds et al., "Submicron sized organo-silica spheres for capillary electrochromatography," 2000 J. Liq. Chrom & Rel. Technol., 23(1):161-173.
Silsesquixanes—An Introduction to Hybrid Inorganic—Organic Composites—Data by Sigma Aldrich. Retrieved Dec. 4, 2006 from http://www.azom.com/details.asp?ArticleID=2934.
Tamaki et al., "Synthesis of polystyrene/silica gel polymer hybrids by in-situ polymerization method", Polymer Bulletin 39, 303-310.
Tamao, K. "Oxidative cleavage of the silicon-carbon bond: Development, mechanism, scope, and limitations," 1996 Advances in Silicon Chemistry, 3:1-62.
Tamao et al., "Oxidative cleavage of silicon-carbon bonds in organosilicon flourides to alcohols," 1982 Tetrahedron 39(6):983-990.
Tamao et al., "Hydrogen peroxide oxidation of the silicon-carbon bond in organoalkoxysilanes," 1983 Organometallics 2: 1694-1696.
Tang et al., "Monolithic Columns Containing Sol-Gel Bonded Octadecylsilica for Capillary Electrochrmoatography", J. Chromatogr. A, 837: 35-50 (1999).
Tang et al., "Continuous-Bed Columns Containing Sol-Gel Bonded Octadecylsilica for Capillary Liquid Chromatography", J. Microcolumn Separations, 12: 6-12 (2000).
Ueno et al., "Compaction and Sintering Behavior of Silica Particles Surface-Modified by Al Chelate Compounds", Journal of the Ceramic Society of Japan, 109(3): 210-216 (2001).
Unger et al., "Recent developments in the evaluation of chemically bonded silica packings for liquid chromatography," J. Chromatogr. 1976, 125(1): 115-127.
Wei et al., "Synthesis and Biotechnological Application of Vinyl Polyme-Inorganic Hybrid . . . ", Chinese Journal of Polymer Science, vol. 18, No. 1, (2000), 1-7.
Wei et al., "Polymethacrylate-silica Hybrid nanoporous materials . . . ", Adv. Mater. 2000, 12, No. 19, Oct. 2, 1448-1450.
Xin, et al., "Design and Evaluation of a New Capillary Electrochromatography System", Electrophoresis, 20: 67-73 (1999).
Yang et al., "Oxidative cleavage of carbon-silicon bond as a new method to characterize bonded stationary phases on silica gel," 1998 Anal. Chem. 70:2827-2830.

(56) References Cited

OTHER PUBLICATIONS

Inagaki, Shinji et al. "An ordered mesoporous organosilica hybrid material with a crystal-like wall structure," Nature, 2002, 03.21, vol. 416, No. 6878, p. 304-307.

Wyndham et al. Characterization and Evaluation of C18 HPLC Stationary Phases Based on Ethyl-Bridged Hybrid Organic/Inorganic Particles, Analytical Chemistry, US, Nov. 15, 2003, vol. 75, No. 24, p. 6781-6788.

Englehardt et al. Chemically bonded stationary phases for aqueous high-performance exclusionchromatography, Journal of Chromatography, 1977, vol. 142, pp. 311-320.

B. Porsch, "Epoxy- and diol-modified silica: optimization of surface bonding reaction," Journal of Chromatography A, 653, 1-7 (1993).

International Search Report for PCT/US2011/045246, dated Feb. 9, 2012, 3 pages.

International Search Report for PCT/US2011/045246, published Feb. 9, 2012, 3 pages.

International Search Report for PCT/US2011/045252, published Dec. 12, 2011, 4 pages.

\* cited by examiner

Product 1h

Product 1l

Product 5a

Product 11b diamond cores

Product 73L1

Product 74L3

Product 76L2

Product 77L2

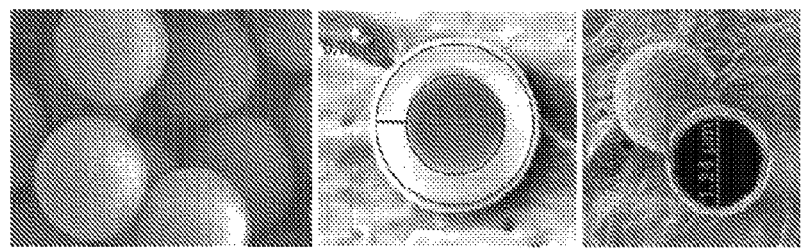
Figure 7: SEM (left) and FIB/SEM (middle, right) analysis of selected superficially porous particles prepared by the process of the invention.
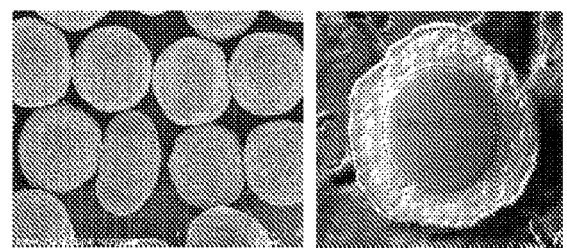
Figure 8: SEM (left) and FIB/SEM analysis of HALO (AMT) Superficially porous particles

SUPERFICIALLY POROUS MATERIALS COMPRISING A SUBSTANTIALLY NONPOROUS HYBRID CORE HAVING NARROW PARTICLE SIZE DISTRIBUTION; PROCESS FOR THE PREPARATION THEREOF; AND USE THEREOF FOR CHROMATOGRAPHIC SEPARATIONS

RELATED APPLICATION

This application is the U.S. National Phase pursuant to 35 U.S.C. § 371, of US international application Ser. No. PCT/US2011/045246, filed Jul. 25, 2011, designating the United States and published in English on Feb. 9, 2012 as publication WO 2012/018596 A2, which claims the benefit of U.S. provisional application Ser. No. 61/367,797, filed Jul. 26, 2010. The entire disclosures of are the aforementioned patent applications are incorporated herein by this reference.

BACKGROUND OF THE INVENTION

Superficially porous particles (also called pellicular, fused-core, or core-shell particles) were routinely used as chromatographic sorbents in the 1970's. These earlier superficially porous materials had thin porous layers, prepared from the adsorption of silica sols to the surface of ill-defined, polydisperse, nonporous silica cores (>20 μm). The process of spray coating or passing a solution of sols through a bed of particles was commonly used. Kirkland extensively explored the use of superficially porous particles throughout this time and helped develop the Zipax brand of superficially porous materials in the 1970's. A review of Kirkland's career was provided by Unger (*Journal of Chromatography A*, 1060 (2004) 1).

Superficially porous particles have been a very active area of research in the past five years. One prior report that uses a mixed condensation of a tetraalkoxysilane with an organosilane of the type YSi(OR)$_3$ where Y contains an alkyl or aryl group and R is methoxy or ethoxy, has been reported by Unger for both fully porous (EP 84,979 B1, 1996) and superficially porous particles (Advanced Materials 1998, 10, 1036). These particles do not have sufficient size (1-2 μm) for effective use in UPLC, nor do they contain chromatographically enhanced pore geometry. Narrow distribution superficially porous particles have been reported by Kirkland (US Application 20070189944) using a Layer-by-Layer approach (LBL)—however these particles are not highly spherical. Other surfactant-templated approaches, can yield low yields of narrow distribution, fully porous particles, however these approaches have not been used to prepare monodisperse, spherical superficially porous particles having chromatographically enhanced pore geometry.

Modern, commercially available superficially porous particles use smaller (<2 μm), monodisperse, spherical, high purity non-porous silica cores. A porous layer is formed, growing these particles to a final diameter between 1.7-2.7 μm. The thickness of the porous layer and pore diameter are optimized to suit a particular application (e.g., small vs. large molecule separations). In order to remove polyelectrolytes, surfactants, or binders (additional reagents added during the synthesis) and to strengthen the particles for use in HPLC or UPLC applications, these material are calcined (500-1000° C. in air). Additional pore enlargement, acid treatment, rehydroxylation, and bonding steps have been reported.

Evaluation of superficially porous materials (e.g., Journal of Chromatography A, 1217 (2010) 1604-1615; Journal of Chromatography A, 1217 (2010) 1589-1603) indicates improvements in column performance may be achieved using columns packed with these superficially porous materials. While not limited to theory, improvements were noted in van Deemter terms as well as improved thermal conductivity. The University of Cork also has a recent patent application (WO 2010/061367 A2) on superficially porous particles.

Although these reported superficially porous particle processes differ, they can be classified as layering of preformed sols (e.g., AMT process) or growth using high purity tetraalkoxysilane monomers (e.g., the University of Cork process). The AMT and University of Cork processes are similar in that they incorporate a repeated in-process workup (over nine times) using centrifugation followed by redispersion. For the AMT process this is a requirement of the layer-by-layer approach, in which alternate layers of positively charged poly-electrolyte and negatively charged silica sols are applied. For the University of Cork process the in-process workup is used to reduce reseeding and agglomeration events. Particles prepared by this approach have smooth particle surfaces and have notable layer formation by FIB/SEM analysis. While both approaches use similar spherical monodisperse silica cores that increase in particle size as the porous layer increases, they differ in final particle morphology of the superficially porous particle. The AMT process, as shown in FIG. 8, results in bumpy surface features and variation of the porous layer thickness. This difference in surface morphology may be due to variation in the initial layering of sols. Most notably both processes use high temperature thermal treatment in air to remove additives (polyelectrolyte or surfactants) and improve the mechanical properties of their superficially porous particles. Since hybrid materials are not thermally stable above 600° C., this approach is not applicable to the formation of hybrid superficially porous particles.

The synthesis of narrow particle size distribution porous chromatographic particles is expected to have great benefit for chromatographic separations. Such particles should have an optimal balance of column efficiency and backpressure. While the description of monodisperse superficially porous silica particles has been noted in the literature, these particles do not display chromatographically enhanced pore geometry and desirable pore diameters for many chromatographic applications. Thus, there remains a need for a process in which narrow particle size distribution porous materials can be prepared with desirable pore diameters and chromatographically enhanced pore geometry. Similarly, there remains a need for a process in which narrow particle size distribution porous materials can be prepared with improved chemical stability with high pH mobile phases.

BRIEF SUMMARY OF THE INVENTION

In one aspect, the invention provides a superficially porous material comprising a substantially nonporous inorganic/organic hybrid core and one or more layers of a porous shell material surrounding the core.

In certain embodiments, the material of the invention is comprised of superficially porous particles. In other embodiments the material of the invention is comprised of a superficially porous monolith.

In certain embodiments, the material of the invention has a substantially narrow particle size distribution. In particular embodiments the 90/10 ratio of particle sizes of the material is from 1.00-1.55; from 1.00-1.10 or from 1.05-1.10. In specific embodiments, the core has a substantially narrow particle size distribution. In particular embodiments the 90/10 ratio of particle sizes of the core is from 1.00-1.55; from 1.00-1.10 or from 1.05-1.10.

In certain embodiments, the material of the invention has chromatographically enchancing pore geometry.

In other embodiments, the material of the invention has a small population of micropores.

In certain embodiments, the material of the invention comprises a hybrid core having the formula:

$$(SiO_2)_d/[R^2((R)_p(R^1)_q SiO_t)_m] \qquad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0, t is 0.5, 1.0, or 1.5;

d is 0 to about 30;

m is an integer from 1-20; wherein R, $R^1$ and $R^2$ are optionally substituted; provided that: (1) when $R^2$ is absent, m=1 and $$t = \frac{(4-(p+q))}{2},$$

when 0<p+q≤3; and (2) when $R^2$ is present, m=2-20 and $$t = \frac{(3-(p+q))}{2},$$

when p+q≤2.

In other embodiments, the material of the invention comprises a hybrid core having the formula:

$$(SiO_2)_d/[(R)_p(R^1)_q SiO_t] \qquad (II)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In yet other embodiments, the material of the invention comprises a hybrid core having has the formula:

$$(SiO_2)_d/[(R^2((R^1)_r SiO_t)_m] \qquad (III)$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; when r=1 then t=1; or when r=2, then t=0.5; and m is an integer from 1-20.

In still other embodiments, the material of the invention comprises a hybrid core having the formula:

$$(A)_x(B)_y(C)_z \qquad (IV)$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; x and y are positive numbers, and z is a non negative number, wherein x+y+z=1. In certain embodiments, z=0, then 0.002≤x/y≤210, and when z≠0, then 0.0003≤y/z≤500 and 0.002≤x/(y+z)≤210.

In other embodiments, the material of the invention comprises a hybrid core having the formula:

$$(A)_x(B)_y(B^*)_{y^*}(C)_z \qquad (V)$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; x and y are positive numbers and z is a non negative number, wherein x+y+z=1. In certain embodiments, when z=0, then 0.002≤x/(y+y*)≤210, and when z 0, then 0.0003≤(y+y*)/z≤500 and 0.002≤x/(y+y*+z)≤210.

In certain embodiments, the porous shell material is a porous silica.

In other embodiments, the porous shell material is a porous composite material.

In certain embodiments, in which the material of the invention comprises more than one layer of porous shell material, each layer is independently selected from is a porous inorganic/organic hybrid material, a porous silica, a porous composite material or mixtures thereof.

In certain embodiments, the hybrid core of the material of the invention has an increased hybrid content near the surface of the core.

In other embodiments, the hybrid core of the material of the invention has a decreased hybrid content near the surface of the core.

In certain embodiments, the material of the invention has an increased hybrid content near the surface of the superficially porous material.

In other embodiments, the material of the invention has a decreased hybrid content near the surface of the superficially porous material.

In certain embodiments, the material of the invention has a highly spherical core morphology; a rod shaped core morphology; a bent-rod shaped core morphology; a toroid shaped core morphology; or a dumbbell shaped core morphology.

In particular embodiments, the material of the invention has a mixture of highly spherical, rod shaped, bent-rod shaped, toroid shaped or dumbbell shaped core morphologies.

In particular embodiments, the material of the invention has a significantly higher thermal conductivity than a fully porous silica particles of the same size. In other embodiments, the material of the invention has a significantly higher thermal conductivity than a superficially porous silica particles of the same size.

In particular embodiments, the material of the invention are capable of forming a packed beds with improved permeability as compared to a fully porous silica particles of the same size. In still other embodiments, the material of the invention is capable of forming a packed beds with improved permeability as compared to a superficially porous silica particles of the same size.

In particular embodiments, the material of the invention has improved chemical stability to high pH mobile phases as compared to unbonded, fully porous silica particles of the same size. In still other embodiments, the material of the invention improved chemical stability to high pH mobile phases as compared to unbonded, superficially porous silica particles of the same size.

In certain embodiments, the core has a particle size of 0.5-10 μm; 0.8-5.0 μm; or 1.3-3.0 μm.

In other embodiments, each porous layer is independently from 0.05 μm to 5 μm. in thickness as measured perpendicular to the surface of the nonporous core; from 0.06 μm to 1 μm. in thickness as measured perpendicular to the surface of the nonporous core; or from 0.20 μm to 0.70 μm. in thickness as measured perpendicular to the surface of the nonporous core.

In particular embodiments, the materials of the invention have an average particle size between 0.8-10.0 μm; between 1.1-5.0 μm; or between 1.3-2.9 μm.

In other embodiments, the materials of the invention have pores having an average diameter of about 25-600 Å; about 60-350 Å; about 80-300 Å; or about 90-150 Å.

In still other embodiments, the materials of the invention have an average pore volume of about 0.11-0.50 cm$^3$/g; of about 0.09-0.45 cm$^3$/g; or of about 0.17-0.30 cm$^3$/g.

In yet other embodiments, the materials of the invention have a pore surface area is between about 10 m$^2$/g and 400 m$^2$/g; between about 15 m$^2$/g and 300 m$^2$/g; or between about 60 m$^2$/g and 200 m$^2$/g.

In still other embodiments, the materials of the invention are surface modified. In particular embodiments, the materials of the invention are surface modified by:
coating with a polymer;
by coating with a polymer by a combination of organic group and silanol group modification;
a combination of organic group modification and coating with a polymer;
a combination of silanol group modification and coating with a polymer; formation of an organic covalent bond between the material's organic group and a modifying reagent; or
a combination of organic group modification, silanol group modification and coating with a polymer.

In certain embodiments of the invention, the superficially porous material has a smooth surface. In other embodiments of the invention, the superficially porous material has a rough surface.

In another aspect, the invention provides a method for preparing a superficially porous material comprising:
a.) providing a substantially nonporous hybrid core material; and
b.) applying to said core material one or more layers of porous shell material to form a superficially porous material In certain embodiments, the method for preparing a superficially porous material further comprises the step of:
c.) optimizing one or more properties of the superficially porous material.

In other embodiments, each layer of porous shell material wherein each layer is independently selected from is a porous inorganic/organic hybrid material, a porous silica, a porous composite material or mixtures thereof.

In still other embodiments, each layer of porous shell material is applied using sols, a polyelectrolyte or a chemically degradable polymer, wherein:
a) the sols are inorganic sols, hybrid sols, nanoparticles, or mixtures thereof; and
b) the polyelectrolyte or chemically degradable polymer is removed from the material using chemical extraction, degradation, or thermal treatment at temperatures less than 500° C., or combinations thereof.

In certain embodiments, each layer of porous shell material is applied by formation through an electrostatic or acid/base interaction of an ionizable group comprising the steps of:
a) prebonding the substantially nonporous core with an alkoxysilane that has an ionizable group,
b) treating the substantially nonporous core to sols that are inorganic, hybrid, nanoparticle, or mixtures thereof, that have been prebonded with an alkoxysilane that has an ionizable group of the opposite charge to the ionizable group on the surface of the core; and
c) forming additional layers on the material with sols that are inorganic, hybrid, nanoparticle, or mixtures thereof that have been prebonded with an alkoxysilane that has an ionizable group of opposite charge to the ionizable group of prior layer.

In particular embodiments, the prebonding of the substantially nonporous core or sols includes washing with and acid or base, or a charged polyelectrolyte. In other embodiments, the prebonding of the substantially nonporous core or sols includes chemical transformation of an accessible hybrid organic group.

In still other embodiments the accessible hybrid organic group is an aromatic group that can undergo sulfonation, nitration, amination, or chloromethylation followed by oxidation or nucleophillic displacement with amine containing groups to form ionizable groups. In yet other embodiments, the accessible hybrid organic group is an alkene group that can undergo oxidation, cross-metathesis, or polymerization to form ionizable groups. In specific embodiments, the accessible hybrid organic group is a thiol group that can undergo oxidation, radical addition, nucleophillic displacement, or polymerization to form ionizable groups.

In yet other embodiments, the prebonding of the substantially nonporous core or sols includes bonding with an alkoxysilane that has an ionizable group of equation 1,

where n=1-30, advantageously 2-3;
x is 0-3; advantageously 0;
Y represents chlorine, dimethylamino, triflate, methoxy, ethoxy, or a longer chain alkoxy group;

R represent a basic group, including (but not limited to) —NH$_2$, —N(R')H, —N(R')$_2$, —NH(R')$_3^+$, —NH(CH$_2$)$_m$NH$_2$, —NH(CH$_2$)$_m$N(R')H, —NH(CH$_2$)$_m$N(R')$_2$, —NH(CH$_2$)$_m$N(R')$_3^+$, pyridyl, imidizoyl, polyamine.

R' independently represents an alkyl, branched alkyl, aryl, or cycloalkyl group; m is 2-6.

In still yet other embodiments, the prebonding of the substantially nonporous core or sols includes bonding with an alkoxysilane that has an ionizable group of equation 2, $$A(CH_2)_nSi(Y)_{3-x}(R')_x \qquad \text{(equation 2)}$$

where n=1-30, advantageously 2-3;

x is 0-3; advantageously 0;

Y represents chlorine, dimethylamino, triflate, methoxy, ethoxy, or a longer chain alkoxy group;

A represent an acidic group, including (but not limited to) a sulfonic acid, carboxylic acid, phosphoric acid, boronic acid, arylsulfonic acid, arylcarboxylic acid, arylphosphonic acid, and arylboronic acid.

R' independently represents an alkyl, branched alkyl, aryl, or cycloalkyl group.

In particular embodiments, each layer of porous shell material is applied using a polyelectrolyte or a chemically degradable polymer.

In other embodiments, the polyelectrolyte or a chemically degradable is removed from the material by chemical extraction, degradation, or thermal treatment at temperatures less than 500° C., or combinations thereof.

In certain embodiments, each layer of porous shell material is applied using alkoxysilanes, organoalkoxysilanes, nanoparticles, polyorganoalkoxysiloxanes, or combinations thereof, comprising the steps of:
a) condensing siloxane precursors on the substantially nonporous core in a reaction mixture comprising ethanol, water and ammonium hydroxide and optionally containing a non-ionic surfactant, an ionic surfactant, a polyelectrolyte or a polymer to form the porous shell material; and
b) introducing porosity is introduced through extraction, degradation, oxidation, hydrolysis, deprotection, or transformation of the hybrid group, ionic surfactant or non-ionic surfactant or a combination thereof.

In particular embodiments, the alkoxysilanes, organoalkoxysilanes, nanoparticles, polyorganoalkoxysiloxanes, or combinations thereof, are condensed on the substantially nonporous core in a solution comprising ethanol, water, ammonium hydroxide, an ionic surfactant; and an non-ionic surfactant.

In other embodiments, the ionic surfactant is $C_{10}$-$C_{30}$N(R)$_3^+$X$^-$, where R is methyl, ethyl, propyl, alkyl, fluoroalkyl; X is a halogen, hydroxide, or of the form R'SO$_3^-$ or R'CO$_2^-$ where R' is methyl, ethyl, butyl, propyl, isopropyl, tert-butyl, aryl, tolyl, a haloalkyl or a fluoroalkyl group.

In yet other embodiments, the ionic surfactant is octadecyltrimethylammonium bromide, octadecyltrimethylammonium chloride, hexadecyltrimethylammonium bromide, hexadecyltrimethylammonium chloride, dodecyltrimethylammonium bromide, or dodecyltrimethylammonium chloride.

In particular embodiments, the concentration of ionic surfactant is maintained in the reaction solution between 5-17 mM; or in embodiments between 8-14 mM.

In other embodiments, the non-ionic surfactant is a diblock or triblock copolymer. In certain embodiments, the copolymer is (PEO)x(PPO)y(PEO)x, wherein PEO is a polyethylene oxide repeat unit, PPO is a polypropylene oxide repeat unit, x is an integer between 5-106, y is an integer between 30-85.

In particular embodiments the triblock copolymer is Pluronic® P123, having (PEO)$_{20}$(PPO)$_{70}$(PEO)$_{20}$. In still other embodiments, the alkoxysilanes, organoalkoxysilanes, or combinations thereof, are condensed on the substantially nonporous core in a solution comprising:

ethanol, water, ammonium hydroxide or combinations thereof;

octadecyltrimethylammonium bromide; and

Pluronic® P123.

In certain embodiments, the alkoxysilane used is selected from the group of tetramethoxsilane or tetraethoxysilane.

In still other embodiments, the organosiloxane is selected from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene.

In yet other embodiments, the alkoxysilane used is tetraethoxysilane and the organoalkoxysilane used is 1,2-bis(triethoxysilyl)ethane.

In certain other embodiments, the concentration of octadecyltrimethylammonium bromide is maintained between 8-14 mM.

In certain other embodiments, the molar ratio of octadecyltrimethylammonium bromide and Pluronic® P123 is maintained at or above 1.30.

In still other embodiments, the molar ratio of alkoxysilane to organoalkoxysilane ranges between 30:1 to 1:30.

In certain embodiments, alkoxysilane, organoalkoxysilane, or combinations thereof are prediluted in ethanol. In certain such embodiments, prediluted ethanol solutions of alkoxysilane, organoalkoxysilane, or combinations thereof are added at a slow and constant rate to prevent fines generation, aggregation and agglomeration. In other such embodiments, prediluted ethanol solutions of alkoxysilane, organoalkoxysilane, or combinations thereof are added a rate between 5-500 μL/min In other embodiments, a secondary solution comprising ethanol, water, ammonium hydroxide, ionic surfactant and non-ionic surfactant is added at a slow and constant rate to prevent fines generation, aggregation and agglomeration. In certain such embodiments the secondary solution comprising ethanol, water, ammonium hydroxide, ionic surfactant and non-ionic surfactant is added within a range between the rate required to maintain a uniform ratio of particle surface area ($m^2$) to reaction volume, to the rate required to maintain a uniform ratio of particle volume ($m^3$) to reaction volume.

In certain embodiments, the surfactant mixture is removed through one or more of the following; extractions with acid, water, or organic solvent; ozonolysis treatments, thermal treatments <500° C., or thermal treatments between 500-1000° C.

In still other embodiments, the surfactant mixture is removed through combination of acid extractions and ozonolysis treatments.

In certain embodiments, each layer of porous shell material is applied using alkoxysilanes, organoalkoxysilanes, nanoparticles, polyorganoalkoxysiloxanes, or combinations thereof: comprising the steps of:
  a) condensing siloxane precursors on the substantially nonporous core in a reaction mixture comprising ethanol, water or ammonium hydroxide to form a non-porous hybrid inorganic/organic shell material; and
  b) introducing porosity is introduced through extraction, degradation, oxidation, hydrolysis, deprotection, or transformation of the hybrid group or a combination thereof.

In some such embodiments, the alkoxysilane used is selected from the group of tetramethoxsilane or tetraethoxysilane.

In other such embodiments, the organosiloxane is selected as one or more of the following from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene, octadecyltrimethoxysilane, octadecyltriethoxysilane, octyltrimethoxysilane, octyltriethoxysilane, dodecyltrimethoxysilane, and dodecyltriethoxysilane.

In still other such embodiments, the alkoxysilane used is tetraethoxysilane and the organoalkoxysilane used is octadecyltrimethoxysilane.

In certain such embodiments, the alkoxysilane, one or more organoalkoxysilanes, or combinations thereof are prediluted in ethanol.

In some such embodiments, the prediluted ethanol solutions of alkoxysilane, one or more organoalkoxysilanse, or combinations thereof are added a slow and constant rate to prevent fines generation, aggregation and agglomeration.

In other such embodiments, prediluted ethanol solutions of alkoxysilane, one or more organoalkoxysilanes, or combinations thereof are added a rate between 5-500 μL/min In certain embodiments, a secondary solution comprising ethanol, water, and ammonium hydroxide is added at a slow and constant rate to prevent fines generation, aggregation and agglomeration.

In certain other embodiments, a secondary solution comprising ethanol, water, and ammonium hydroxide is added within a range between the rate required to maintain a uniform ratio of particle surface area ($m^2$) to reaction volume, to the rate required to maintain a uniform ratio of particle volume ($m^3$) to reaction volume.

In certain embodiments, porosity is introduced through extraction, degradation, hydrolysis, deprotection, or transformation of the hybrid group through one or more of the following; extractions with acid, water, or organic solvent; ozonolysis treatments, thermal treatments <500° C., or thermal treatments between 500-1000° C.

In still other embodiments, porosity is introduced through extraction, degradation, hydrolysis, deprotection, or transformation of the hybrid group through combination of acid extractions, ozonolysis treatments and/or thermal treatments <500° C.

In certain embodiments, each layer is applied using a mixture of formula XX.

$$(D)_d(E)_e(F)_f \qquad \text{(Formula XX)}$$

wherein,
  a) d+e+f=1,
  b) D is one or more inorganic components upon initial condensation,
  c) E is one or more hybrid components upon initial condensation and
  d) F is one or more hybrid components upon initial condensation that can be further reacted to increase the porosity of the superficially porous layer In certain such embodiments, the precursor for the inorganic component upon initial condensation (D) is selected from oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of silicon, titanium, zirconium, or aluminum.

In other such embodiments, the precursor for the inorganic component upon initial condensation (D) is selected from tetraethoxysilane, tetramethoxysilane, methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

In still other such embodiments, the precursor for the hybrid component upon initial condensation (E) is selected from 1,2-bis(triethoxysilyl)ethane, 1,2-bis(trimethoxysilyl)ethane, 1,4-bis(triethoxysilyl)benzene, 1,4-bis(trimethoxysilyl)benzene, 1,3-bis(triethoxysilyl)benzene, 1,3-bis(trimethoxysilyflbenzene, 1,3,5-tris(triethoxysilyl)benzene, 1,3,5-tris(trimethoxysilyl)benzene, and bis(4-triethoxysilylphenyl)diethoxysilane.

In yet other such embodiments, the precursor for the hybrid component upon initial condensation that can be further reacted to increase the porosity of the superficially porous layer (F) is selected from phenyltrimethoxysilane, phenyltriethoxysilane, acetyloxyethyltrimethoxysilane; acetyloxyethyltriethoxysilane; chloroethyltriethoxysilane; chloroethyltrimethoxysilane; methacryloxypropyltrimethoxysilane; methacryloxypropyltriethoxysilane; bromoethyltrimethoxysilane; bromoethyltriethoxysilane; fluorotriethoxysilane; fluorotrimethoxysilane; and alkoxysilanes of the type:

$$(CH_3CH_2O)_{4-v}Si(OR^*)_v \qquad \text{(Formula XXb)}$$

wherein

R* was the corresponding octadecyl, dodecyl, octyl, 2-ethoxyethyl, or 3-ethyl-3-pentyl group, v was an integer equal to 1-4, In such embodiments, porosity is introduced by reaction of hybrid group F through protodesilylation, hydrolysis, deprotection, acid extraction, thermal treatment<500° C., oxidation, ozonolysis or decomposition.

Another aspect of the invention provides, a method to produce a hybrid core with increased hybrid content near the surface of the core by modifying a nonporous silica core with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid material that has increased hybrid content near the external surface of the material by modifying a superficially porous material with one more or more layers formed using an organosiloxane, a mixture of organosiloxane and alkoxysilane, polyorganoalkoxysilanes, a hybrid inorganic/organic surrounding material, or combination thereof.

Yet another aspect of the invention provides, a method to produce a superficially porous hybrid particle that has increased hybrid content near the external surface of the particle by modifying a superficially porous particle with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid particle that has increased hybrid content near the external surface of the particle by modifying a superficially porous particle that is substantially silica (>90 molar %) with one more or more layers formed using an organosiloxane, a mixture of organosiloxane and alkoxysilane, polyorganoalkoxysilanes, a hybrid inorganic/organic surrounding material, or combination thereof.

Still yet another aspect of the invention provides, a method to produce a superficially porous hybrid particle that has increased hybrid content near the external surface of the particle comprising the steps of a.) forming a superficially porous particle that is substantially silica (>90 molar %) and has a pore volume between 0.18-0.50 cm$^3$/g; and b.) reducing the porosity of this particle by 0.01-0.20 cm$^3$/g by modifying this particle with one more or more layers formed using an organosiloxane, a mixture of organosiloxane and alkoxysilane, polyorganoalkoxysilanes, a hybrid inorganic/organic surrounding material, or combination thereof.

In certain embodiments of the invention, the methods provide materials in which 1-15 layers are formed in the process. In other aspects, 2-5 layers are formed. In still other 1-2 layers are formed.

In certain embodiments of the invention the superficially porous material is optimized by acid extraction, classification, ozonolysis treatment, hydrothermal treatment, acid treatment or combinations thereof.

In yet other embodiments of the invention, the superficially porous material is further surface modified. In some aspects by: coating with a polymer; coating with a polymer by a combination of organic group and silanol group modification; a combination of organic group modification and coating with a polymer; a combination of silanol group modification and coating with a polymer; formation of an organic covalent bond between the material's organic group and a modifying reagent; or a combination of organic group modification, silanol group modification and coating with a polymer.

In another aspect, the invention provides a method for increasing the porosity of a substantially nonporous material comprising:

a.) providing a substantially nonporous hybrid core material; and b.) applying to said core material one or more layers of porous shell material to form a superficially porous material.

In another aspect, the invention provides a separations device having a stationary phase comprising the superficially porous material of the invention. In certain embodiments, said device is selected from the group consisting of chromatographic columns, thin layer plates, filtration membranes, microfluidic separation devices, sample cleanup devices, solid supports, solid phase extraction devices, microchip separation devices, and microliter plates.

In certain other embodiments, the separations device is useful for applications selected from the group consisting of solid phase extraction, high pressure liquid chromatography, ultra high pressure liquid chromatography, combinatorial chemistry, synthesis, biological assays, ultra performance liquid chromatography, ultra fast liquid chromatography, ultra high pressure liquid chromatography, supercritical fluid chromatography, and mass spectrometry. In still other embodiments, the separations device is useful for biological assays and wherein the biological assays are affinity assays or ion-exchanged assays.

In another aspect, the invention provides a chromatographic column, comprising a) a column having a cylindrical interior for accepting a packing material and b) a packed chromatographic bed comprising the superficially porous material of the invention.

In another aspect, the invention provides a chromatographic device, comprising a) an interior channel for accepting a packing material and b) a packed chromatographic bed comprising the superficially porous material of the invention.

In another aspect, the invention provides a kit comprising the superficially porous material of the invention, and instructions for use. In certain embodiments, the instructions are for use with a separations device. In certain other embodiments, the separations device is selected from the group consisting of chromatographic columns, thin layer plates, microfluidic separation devices, solid phase extraction devices, filtration membranes, sample cleanup devices and microtiter plates.

BRIEF DESCRIPTION OF THE DRAWINGS

FIG. 7 is an SEM (left) and FIB/SEM (middle, right) analysis of selected superficially porous particles from Example 44.

FIG. 8 is an SEM left) and FIB/SEM analysis of HALO (AMT) Superficially porous particles.

DETAILED DESCRIPTION OF THE INVENTION

Figure 1:
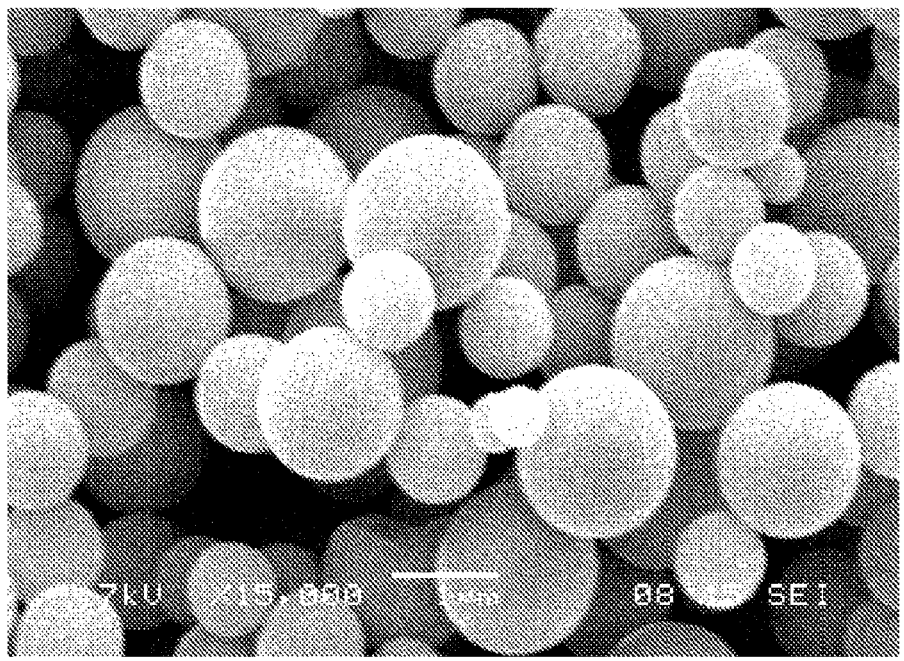
FIG. 1 is an SEM analysis of Products 1 h (top) and 11 (bottom) from Example 1.
Figure 1:
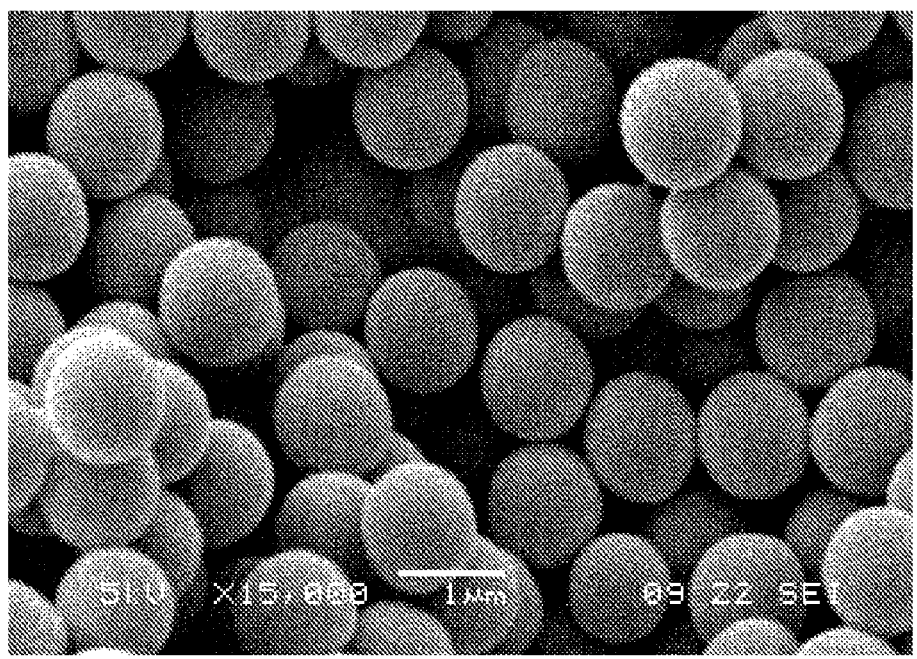

The present invention provides novel chromatographic materials, e.g., for chromatographic separations, processes for its preparation and separations devices containing the chromatographic material. The present invention will be more fully illustrated by reference to the definitions set forth below.

Definitions

"Hybrid", including "hybrid inorganic/organic material," includes inorganic-based structures wherein an organic functionality is integral to both the internal or "skeletal" inorganic structure as well as the hybrid material surface. The inorganic portion of the hybrid material may be, e.g., alumina, silica, titanium, cerium, or "Hybrid" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium oxides, or ceramic material; in an advantageous embodiment, the inorganic portion of the hybrid material is silica. As noted above, exemplary hybrid materials are shown in U.S. Pat. Nos. 4,017,528, 6,528,167, 6,686,035 and 7,175,913 and International Application Publication No. WO 2008/103423.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —$CF_3$, —CN, or the like.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means —$NO_2$; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, advantageously from 1 to about 6 carbon atoms. The term "alkylthio" refers to an alkyl group, as defined above, having a sulfhydryl group attached thereto. Suitable alkylthio groups include groups having 1 to about 12 carbon atoms, advantageously from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, advantageously 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, advantageously from 1 to about 6 carbon atoms.

The term "alkyl" includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has 30 or fewer carbon atoms in its backbone, e.g., $C_1$-$C_{30}$ for straight chain or $C_3$-$C_{30}$ for branched chain. In certain embodiments, a straight chain or branched chain alkyl has 20 or fewer carbon atoms in its backbone, e.g., $C_1$-$C_{20}$ for straight chain or $C_3$-$C_{20}$ for branched chain, and more advantageously 18 or fewer. Likewise, advantageous cycloalkyls have from 4-10 carbon atoms in their ring structure and more advantageously have 4-7 carbon atoms in the ring structure. The term "lower alkyl" refers to alkyl groups having from 1 to 6 carbons in the chain and to cycloalkyls having from 3 to 6 carbons in the ring structure.

Moreover, the term "alkyl" (including "lower alkyl") as used throughout the specification and Claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "amino," as used herein, refers to an unsubstituted or substituted moiety of the formula —NRaRb, in which Ra and Rb are each independently hydrogen, alkyl, aryl, or heterocyclyl, or Ra and Rb, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of Ra and Rb, is further substituted with an amino group.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The term "ceramic precursor"" is intended include any compound that results in the formation of a ceramic material.

The term "chiral moiety" is intended to include any functionality that allows for chiral or stereoselective syntheses. Chiral moieties include, but are not limited to, substituent groups having at least one chiral center, natural and unnatural amino-acids, peptides and proteins, derivatized cellulose, macrocyclic antibiotics, cyclodextrins, crown ethers, and metal complexes.

The language "chromatographically-enhancing pore geometry" includes the geometry of the pore configuration of the presently-disclosed materials, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life and high mass transfer properties (as evidenced by, e.g., reduced band spreading and good peak shape.) These properties can be measured or observed using art-recognized techniques. For example, the chromatographically-enhancing pore geometry of the present porous materials is distinguished from the prior art particles by the absence of "ink bottle" or "shell shaped" pore geometry or morphology, both of which are undesirable because they, e.g., reduce mass transfer rates, leading to lower efficiencies. Chromatographically-enhancing pore geometry is found in porous materials containing only a small population of micropores. Porous materials with such a low micropore surface area (MSA) give chromatographic enhancements including high separation efficiency and good mass transfer properties (as evidenced by, e.g., reduced band spreading and good peak shape). Micropore surface area (MSA) is defined as the surface area in pores with diameters less than or equal to 34 Å, determined by multipoint nitrogen sorption analysis from the adsorption leg of the isotherm using the BJH method. As used herein, the acronyms "MSA" and "MPA" are used interchangeably to denote "micropore surface area".

The term "functionalizing group" includes organic functional groups which impart a certain chromatographic functionality to a chromatographic stationary phase.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "metal oxide precursor" is intended include any compound that contains a metal and results in the formation of a metal oxide, e.g., alumina, silica, titanium oxide, zirconium oxide, or cerium oxide.

The term "monolith" is intended to include a collection of individual particles packed into a bed formation, in which the shape and morphology of the individual particles are maintained. The particles are advantageously packed using a material that binds the particles together. Any number of binding materials that are well known in the art can be used such as, for example, linear or cross-linked polymers of divinylbenzene, methacrylate, urethanes, alkenes, alkynes, amines, amides, isocyanates, or epoxy groups, as well as condensation reactions of organoalkoxysilanes, tetraalkoxysilanes, polyorganoalkoxysiloxanes, polyethoxysiloxanes, and ceramic precursors. In certain embodiments, the term "monolith" also includes hybrid monoliths made by other methods, such as hybrid monoliths detailed in U.S. Pat. No. 7,250,214; hybrid monoliths prepared from the condensation of one or more monomers that contain 0-99 mole percent silica (e.g., $SiO_2$); hybrid monoliths prepared from coalesced porous inorganic/organic particles; hybrid monoliths that have a chromatographically-enhancing pore geometry; hybrid monoliths that do not have a chromatographically-enhancing pore geometry; hybrid monoliths that have ordered pore structure; hybrid monoliths that have non-periodic pore structure; hybrid monoliths that have non-crystalline or amorphous molecular ordering; hybrid monoliths that have crystalline domains or regions; hybrid monoliths with a variety of different macropore and mesopore properties; and hybrid monoliths in a variety of different aspect ratios. In certain embodiments, the term "monolith" also includes inorganic monoliths, such as those described in G. Guiochon/*J. Chromatogr. A* 1168 (2007) 101-168.

The term "nanoparticle" is a microscopic particle/grain or microscopic member of a powder/nanopowder with at least one dimension less than about 100 nm, e.g., a diameter or particle thickness of less than about 100 nm (0.1 mm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 nm in diameter, e.g., less than or equal to 50 nm in diameter, e.g., less than or equal to 20 nm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

The term "substantially disordered" refers to a lack of pore ordering based on x-ray powder diffraction analysis. Specifically, "substantially disordered" is defined by the lack of a peak at a diffraction angle that corresponds to a d value (or d-spacing) of at least 1 nm in an x-ray diffraction pattern.

"Surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The language "surface modified" is used herein to describe the composite material of the present invention that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later crosslinking, imparting the chemical character of the surface modifier to the base material. In one embodiment, the organic groups of a hybrid material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, J. *Advanced Organic Chemistry*, 3rd Edition, Wiley, New York, 1985.

The term "nanoparticle" is a microscopic particle/grain or microscopic member of a powder/nanopowder with at least one dimension less than about 100 nm, e.g., a diameter or particle thickness of less than about 100 nm (0.1 µm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 µm in diameter, e.g., less than or equal to 50 µm in diameter, e.g., less than or equal to 20 µm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

The properties of materials change as their size approaches the nanoscale and as the percentage of atoms at the surface of a material becomes significant. For bulk materials larger than one micrometer the percentage of atoms at the surface is minuscule relative to the total number of atoms of the material. The interesting and sometimes unexpected properties of nanoparticles are partly due to the aspects of the surface of the material dominating the properties in lieu of the bulk properties. In certain embodiments, selection of the nanoparticle affects the selectivity of the chromatographic material. For example, dispersion of $TiO_2$ or zirconium oxide could modify the surface charge, surface acidity, and therefore, the chromatographic selectivity.

The language, "composite material" and the term "composite" are used interchangeably herein to describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, a short-hand convention may be used to describe a composite material containing a dispersed nanoparticle, $Np/(A)_w(B)_c(C)_y$, and may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003)

The terms "material having a high thermal conductivity", "high thermal conductivity core", and a "high thermal conductivity additive" are defined as a material, core material, or composite additive having a thermal conductivity greater than 20 W/(m·K). In various embodiments the additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). High thermal conductivity cores or additives can be, for example and without limitation, a 0.1-8 μm core particle, nanoparticle additives, or a metal oxide precursor. In various embodiments the high thermal conductivity core or additive includes (but is not limited to) aluminum, copper, gold, and diamonds.

A "high thermal diffusivity" core or additive is defined as an additive used in a superficially porous materials as having a thermal diffusivity greater than 20 mm²/s. In various embodiments the core or additive has a thermal diffusivity ranges from: about 20 mm²/s to not more than 2000 mm²/s; about 100 mm²/s to not more than 1600 mm²/s; and 150 mm²/s to not more than 1400 mm²/s. This high thermal conductivity core or additive can be a 0.1-8 μm core particle, nanoparticle additives, or a metal oxide precursor. In various embodiments the high thermal conductivity core or additive includes (but is not limited to) aluminum, copper, gold, and diamonds.

A "high thermal conductivity superficially porous material (or particle)" is defined as a material that has improved thermal conductivity or improved thermal diffusivity over a porous silica particle of the same size. In various embodiments the higher thermal conductivity superficially porous material is a material that has improved thermal conductivity or thermal diffusivity over a superficially porous silica particle of the same size. In various embodiments the higher thermal conductivity superficially porous material is a material that has improved thermal conductivity over a fully porous hybrid particle of the same size. Determination of particle thermal conductivity can be made by the method of Gritti and Guiochon [J. Chromatogr. A, 2010, 1217, 5137) taking into account differences in bulk material properties, pore volume, surface modification type and coverage.

The terms "magnetic material", "magnetic cores" and "magnetic additives" are defined as a material, core material, or composite additive that gas a mass magnetization (σ, magnetic moment per unit mass, magnetic saturation or saturation magnetization) at room temperature greater than 15 emu/g (A m²/kg). This includes ferromagnetic and ferrimagnetic materials, including (but is not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

As used herein, the term "fines" refers to undesired materials generated in the processes of the invention that are below the 10 vo % of the target particle size distribution. Fines can be formed from reseeding events or from particle breakage. Resulting fines can be nonporous or fully porous. Often fines are substantially smaller than the 10 vol % of the target particle size distribution. Often fines are <1 um in size. Very small fines can cause problems in chromatography in that the percolate through the packed bed and get stuck in the outlet frit. This generates increased column pressure. Alternatively fines small enough to percolate through the packed bed and outlet frit can result in problems with detectors and can contaminate a product. Problems with detector include clogging flow channels, blocking detector windows, and anomalous detector readings. Such issues can reduce the lifetime of a detector and can require extensive cleaning protocols. Such issues can also impact the precision, accuracy, reliability, reproducibility, and robustness of analytical data generated. Fines can be removed by classification.

As used herein, the terms "aggregates" and "agglomerates" refer to undesired materials generated in the processes of the invention that are larger than the 90 vol % of the target particle size distribution. aggregates and/or agglomerates can form from imperfections of the core material, improper mixing or dispersion in the process, or excessive forces during workup. Aggregates and agglomerates can impact the efficiency, permeability, reproducibility and robustness of packed beds within chromatographic columns. It is difficult to optimally pack a chromatographic column with materials having an elevated amount of aggregates and agglomerates. Aggregates and agglomerates can break apart within a packed bed structure when exposed to high pressures and shears. This can result in a mechanical instability of the packed bed and the result of a void on the top of the column. This breaking of aggregates and agglomerates can also result in the generation of fines. Aggregates and agglomerates can be removed by classification.

Hybrid Inorganic/Organic Superficially Porous Particles.

Hybrid particle technologies are highly desirable for many chromatographic applications due to the increased chemical stability and reduced silanol activity they provide. One key advantage of hybrid particles over silica and hybrid coated silica particles in chromatographic applications is their superior column stability when used with alkaline mobile phases (pH 8-12). Silica and hybrid coated silica packing materials have limited lifetimes under these conditions due to the dissolution of the silica and collapse of the packed bed.

Currently there are no means to prepare hybrid superficially porous particle for chromatographic applications. This is due in part to the need to utilize one or more calcination steps (≥500° C.) during the superficially porous particle synthesis. Such temperatures degrade most organic groups of a hybrid material.

Approach to the Synthesis of Hybrid Superficially Porous Particles.

In one approach spherical silica or hybrid non-porous cores are prepared following standard protocols. A superficially porous layer is formed using two or more of the following; TEOS, a thermally degradable organofunctional silane (e.g., acetoxypropyltrialkoxysilane or bromoethyltrialkoxysilane) along with a more thermally stable hybrid silanes, such as (but not limited to) phenylene bridged silanes. In this process lower temperature thermal treatment (<500° C.) is performed to degrade the thermally degradable organofunctional silane as a means to introduce porosity, while maintaining the more thermally stable hybrid group. The temperature is determined by TGA experiments performed in air. Additional steps of classification, pore modification, acid treatment and bonding are performed, as detailed herein.

In another approach, spherical hybrid non-porous cores are prepared following standard protocols. A superficially porous layer is prepared using a surfactant or a mixed surfactant approach using one or more silanes that include (but is not limited to) TEOS, a lower temperature degradable organofunctional silane (e.g., acetoxypropyltrialkoxysilane or bromoethyltrialkoxysilane), ethylene bridged alkoxysilanes, or phenylene bridged alkoxysilanes. The surfactant is removed using an acid ethanol process (e.g., hydrochloric acid in ethanol). Alternatively, the surfactant is removed by thermal treatment (<500° C.) at a temperature that preserves the hybrid group, while removing the surfactant. This temperature is determined by TGA experiments performed in air. Alternatively the surfactant is removed by oxidation (e.g., ozonolysis). Alternatively, one or more of the surfactants used in this process are selected from the group of acid labile, base labile, or other labile surfactants. These labile surfactants can be reacted and removed later by selecting the correct chemical conditions (e.g., acid hydrolysis, base hydrolysis, reduction or oxidation, hydrogenation or hydrogenolysis). Additional steps of classification, pore modification, acid treatment and bonding are performed, as detailed above. In another approach, spherical silica or hybrid non-porous cores are prepared following standard protocols. Separately a hybrid sol (<100 nm) solution is prepared using one or more silanes that include (but is not limited to) TEOS, lower temperature degradable organofunctional silane (e.g., acetoxypropyltrialkoxysilane or bromoethyltrialkoxysilane), ethylene bridged alkoxysilanes, or phenylene bridged alkoxysilanes. A uniform superficially porous layer is then prepared in a layer-by-layer approach using a suitable positively charged polyelectrolyte. Suitable polyelectrolytes include (but is not limited to) linear, branched, and block polymers containing one or more of the following groups; alkyl, cycloalkyl, aryl, ethylene oxide groups along with one or more of the following groups; primary, secondary, tertiary and quaternary amino groups, pyrrolidone, pyridine, and imidazole. The polyelectrolyte is removed by thermal treatment (<500° C.) at a temperature that preserves the hybrid group, while removing the polyelectrolyte. This temperature is determined by TGA experiments performed in air. Alternatively the polyelectrolyte is removed by ozonolysis. Additional steps of classification, pore modification, acid treatment and bonding are performed, as detailed herein.

Higher Thermal Conductivity Superficially Porous Particles.

Recent studies (Gritti, F. *Journal of Chromatography A*, 1217 (2010) 5069-5083) suggest superficially porous silica particles have significantly higher thermal conductivities when compared to fully porous particles of the same size. This higher thermal conductivity is one reason why superficially porous particles were noted to have improved chromatographic performance.

Approach to the synthesis of higher thermal conductivity superficially porous particles It is well known that many materials have higher thermal conductivities than silica. Included in this is diamond. Micron and sub-micron sized diamond particles are well known, and can be prepared from natural and chemical processes. Alternatively diamond nanoparticles can be incorporated within non-porous cores (including non-porous silica) The use of a diamond core (0.5-3 μm) for a superficially porous particle may result in a measurable increase in thermal conductivity when compared to a silica based superficially porous particle of comparable size. In order to reduce undesired chromatographic interactions that may result from a diamond core, a non-porous silica or hybrid surface coating may be advantageously used. This surface coating step may be advantageously repeated or performed in a growth-process to achieve the desired thickness. Calcination and surface rehydroxylation may be advantageously used at the end of this step.

The superficially porous layer may be silica or hybrid, and can be prepared in any of the processes described herein. Additional steps of classification, calcination, pore modification, re-calcination, rehydroxylation and bonding are then performed (as required), as detailed herein.

Improved Permeability Using Superficially Porous Technologies.

The impact of particle attributes on packed bed permeability can be modeled using the Kozeny-Carman equation. One can use this equation to model pressures required to push a solvent through a column packed with particles that varies in interstitial fraction ($\varepsilon$) and particle size ($d_p$). Pressure changes with the square of particle size (based on number count), while column efficiency correlates linearly with particle size (based on volume count). As a result, decreasing particle size to improve efficiency results in a dramatic increase in column pressure. While chromatographic systems exist that can handle increased column pressures, it is desirable to obtain the lowest column pressures available for a given particle size. One means to achieve this is to decrease the difference between the number and volume average particle size. For example, using particles that are monodisperse. Monodisperse non-porous, fully porous and superficially porous particles have been reported. For the latter the ability to prepare monodisperse particles is a function of the non-porous core as well as the uniformity of the porous layer. As described herein, the materials of the instant invention provide improved permeability as well as improved chemical stability with high pH mobile phases.

Approach to the Synthesis of Superficially Porous Particles that Form Packed Beds with Improved Permeability.

A further improvement in permeability can be achieved if the particle shape is modified. For example, a uniform micron-sized doughnut, rod, dumbbell, star, or bent-rod-shaped cores is used in place of a highly spherical core. Additional shapes include (but not limited to) spirals, discoidal, concave disks, spools, rings, helix, saddles, cross, cube, derby, helix, cylinders, and tubes. Examples of dumbbell, doughnut, rod, spiral, and gyroid particles have been reported {Doshi, N. PNAS, 2009, 106, 51, 21495; Alexander, L. *Chem. Commun.*, 2008, 3507; Naik, S. *J. Phys. Chem. C* 2007, 111, 11168; Pang, X. *Microporous and Mesoporous Materials* 85 (2005) 1; Kievsky, Y. *IEEE Transactions on Nanotechnology*, 2005, 4, 5, 490; Sugimoto, T. in Monodispersed Particles, (Elsevier Science BV, Amsterdam) 2001; Ozin, G. *Adv. Mater.*, 1997, 9, 662}.

Important factors for the non-spherical cores is that they be relatively uniform in dimensions, free-flowing, non-porous, and mechanically strong enough for use in HPLC and UPLC. The composition of these cores may be selected from (but is not limited to) silica, metal oxides, diamonds, heavily cross linked polymers, and hybrid materials. Improvements in core uniformity can be achieved through classification. A reduction in porosity can be achieved by pore filling with a similar or different composition (e.g., pore filling a silica material with a crosslinked polymer composition). Improvements in mechanical strength is achieved by increasing crosslinking with the same or different composition (e.g., creating a silica network within a polymer composition), or by calcination. For the latter, higher temperatures (e.g., >800° C.) may be advantageously used.

In order to reduce undesired chromatographic interactions due to the core, a non-porous surface coating with a silica, hybrid, or polymeric composition may be advantageously used. This surface coating step may need to be repeated or performed in a growth-process to achieve the desired thickness. To ensure that the core morphology is not substantially modified, this step advantageoulsy provides a uniform surface layer. Calcination and surface rehydroxylation may be advantageously used at the end of this step.

A uniform silica or hybrid superficially porous layer may be formed from any one of the processes described above. To ensure the core morphology is not substantially modified, this step advantageoulsy yields a highly uniform porous layer. Additional steps of classification, calcination, pore modification, re-calcination, rehydroxylation and bonding are then performed (as required) as detailed above. These non-spherical superficially porous materials can be packed in chromatographic columns individually or as mixtures with other shapes, or with spherical particles. It is important to optimize column packing conditions for these mixed systems. Considerations of maintaining similar dispersion, bulk density and settling rates between the different materials need to be made.

Improved Process to Prepare Zuperficially Porous Materials.

As noted herein, the AMT process and the University of Cork process both require repeated in-process workups using centrifugation followed by redispersion during the formation of the superficially porous layer. The concerns with repeated centrifugation is aggregation/agglomeration, difficulty redispersing particles, product uniformity, and long labor times required for this process. Aggregation and agglomeration are extremely detrimental for this process. It is possible for aggregates/agglomerates to be further coated in both of these processes. By its nature repeated centrifugation allows for these un-aged, 'green' materials to get close to each other. Excessive centrifugation time and g-forces can results in a tight bed structure that can be hard to redisperse. Filtration (including tangential filtration) is an alternative to centrifugation that allows for a less compact bed to be formed. Unfortunately the time period required to filter <3 µm materials that may be laden with sub-micron fines is prohibitive. These sub-micron fines can readily clog the filter material preventing complete filtration to occur.

There are also many methods available to redisperse particles, including sonication using sonic baths, in-line sonicators, in-tank sonicators, sonic horns, rotor-stator mixers, milling, low shear and high shear mixing (e.g., sawtooth impellers). Optimization of amplitude, frequency and pulse sequences is used for optimal sonication. Adjusting the conductivity, pH and surfactant mixture can also be used to optimally redisperse particles (through solvent washes, or controlled order of addition of reagents). One concern for these redispersion methods is the potential to harm the superficially porous layer. It is expected that elevated shears may result in a fracturing of the porous layer. The resulting material may have bare-spots, or non-uniform porous layers.

A further concerns is the long reaction times required for an iterative process, such as those described by AMT and the University of Cork. While such materials can be prepared on a laboratory and batch scale, the times required for these processes can exceed those typically used for the synthesis of fully porous particles.

Another concern for uniform shell processes such is the impact of reseeding. Reseeded particles (<0.5 µm) can emerge during the growth step. If they are not effectively removed, the will start to grow preferentially over the larger porous layer, solid core materials. At some point the two particle distributions can overlap. The end result of this, after further processing steps, is the overlapping mixture of superficially porous and fully porous particles. These overlapping mixture of particles are difficult to separate, quantify or understand the impact on chromatographic performance (including chromatographic reproducibility).

Approach to the improved synthesis of superficially porous materials.

In this approach magnetic capture methods are used to collect magnetic core particles in place of centrifugation or filtration. These methods include in-tank, in-line, or off-line magnetic capture.

In-tank magnetic capture uses a removable magnetic rod (or alternatively an electromagnet) placed within a removable or permanent glass sleeve or baffle. In this approach the magnetic rod is placed within the glass sleeve during the time of capture. After the remaining reaction solution is emptied and a new wash or reaction solvent is added, the magnetic rod is removed and bound magnetic core particles are redispersed. Alternatively, an external magnet is placed on the side of the reactor allowing magnetic core particles to be captured on the reactor side-wall. After the remaining reaction solution is emptied and a new wash or reaction solvent is added, the external magnet is removed and bound magnetic core particles are redispersed.

The in-line magnetic capture method involves pumping the reaction solution in a recirculation loop through a collection container. This collection container is placed within a magnetic holding block. Magnetic core particles are collected in this container. After the remaining reaction solution is emptied and a new wash or reaction solvent is added, the collection container is removed from the magnetic holding block and the bound magnetic core particles are redispersed as they are pumped back into the reaction vessel. By using the appropriate sized collection container (advantageously containing one or more flat surfaces) this approach has an advantage in that it allows for good control of the surface area exposed to the magnetic field.

The off-line magnetic capture method is similar to filtration in that the reaction solution is transferred to a secondary vessel. In this secondary vessel, a magnetic field is applied to allow for the controlled collection of magnetic core particles. Reaction solution or wash solvents are removed by filtration, decanting, or by siphon. Magnetic core particles are redispersed in the appropriate solvent and transferred back to the reaction vessel.

During the magnetic capture step for all of these approaches, a loose collection of magnetic core particles is formed. These collections of core particles are less dense than the cake formed by excessive centrifugation. As a result these particles are easier to redisperse. The manner of redispersing magnetic core particles is similar to the approaches described above.

In this approach a non-porous magnetic core is used in place of a non-porous silica or hybrid core. This magnetic core can contain (but is not limited to) magnetic forms of iron oxides, iron, metals, metal oxides, chromium dioxide, ferrites, or cobalt. Advantageously the magnetic core contains magnetite, maghemite. The magnetic core can exist as a pure metal or metal oxide or exist in combination with a second material that includes (but is not limited to) silica, hybrid, polymer, or non-magnetic materials. For example, a magnetic core can be formed by incorporating <100 nm magnetite or cobalt nanoparticles within non-porous silica or polymer particles. The magnetic nanoparticles can be homogeneously dispersed nanoparticles or dispersed clusters of nanoparticles within this material, adsorbed only to the surface, or contained only in the interior of the non-porous core particles. Alternatively 0.3-1.5 µM magnetite or cobalt particles can be used as the non-porous core. Magnetic capture methods are used in this process in place of centrifugation or filtration.

In order to reduce undesired chromatographic interactions due to the core, a non-porous surface coating with a silica, hybrid, or polymeric composition may be advantageously used. This surface coating step may be repeated or performed in a growth-process to achieve the desired thickness. Magnetic capture methods are used in this process in place of centrifugation or filtration. To ensure that the core morphology is not substantially modified, this step advantageously provides a uniform surface layer. Calcination and surface rehydroxylation may be advantageously used at the end of this step.

A uniform silica or hybrid superficially porous layer may be formed from any one of the processes described above. To ensure the core morphology is not substantially modified, this step advantageously yields a highly uniform porous layer. Magnetic capture methods are used in this process in place of centrifugation or filtration. Additional steps of classification, calcination, pore modification, re-calcination, rehydroxylation and bonding are then performed (as needed) as detailed above.

Considering the problem associated with reseeded particles for uniform layer processes such as the novel one described above or the University of Cork process, a magnetic core particle allows for a unique means to separate the porous layer materials from reseeded particles. This can be utilized in-process or during product workup.

The use of magnetic core particles as well as magnetic capture methods allows for a unique process of automating the synthesis of superficially porous particles. The use of in-tank magnetic capture (e.g., using electromagnets) allows for full automation of particle collection. Automated bottom valves and solvent addition valves, are used to fully automate synthesis conditions. In-tank or in-line particle size measurements are used to monitor reaction performance and determined reaction completion.

Core and Shell Materials.

The invention provides superficially porous materials, particles and/or monoliths comprising a substantially non-porous inorganic/organic hybrid core and one or more layers of a porous shell material surrounding the core.

In certain embodiments, the superficially porous material of the invention a substantially narrow particle size distribution. In certain other embodiments, the 90/10 ratio of particle sizes is from 1.00-1.55. In specific embodiments, the 90/10 ratio of particle sizes is from 1.00-1.10 or from 1.05-1.10. In other specific embodiments, the 90/10 ratio of particle sizes is from 1.10-1.55; from 1.10-1.50; or from 1.30-1.45.

In certain embodiments, the superficially porous material of the invention, wherein the material has chromatographically enchancing pore geometry. That is, in some embodiments, the superficially porous material of the invention has only a small population of micropores.

Hybrid Core

The novel inorganic/organic hybrid materials of the invention comprise a substantially nonporous inorganic/organic hybrid core. That is, the inorganic/organic hybrid core of the invention has a pore volume of less than 0.10 cc/g. The hybrid core may possess or not possess a copolymeric structure. In certain embodiments, the hybrid core may or may not posess nanoparticles of a composite material.

Thus, in one aspect, the invention comprises an inorganic/organic hybrid core, wherein the inorganic portion of the hybrid core is present in an amount ranging from about 0 molar % to not more than about 99 molar %, wherein the pores of the core are substantially disordered. In other embodiments, the inorganic portion of the hybrid core is present in an amount from about 0 molar % to not more than about 75 molar %. In still other embodiments, the inorganic portion of the hybrid core is present in an amount from about 0 molar % to not more than about 50 molar %. In yet other embodiments, the inorganic portion of the hybrid core is present in an amount from about 0 molar % to not more than about 25 molar %.

In various embodiments of the aforementioned aspect of the invention, the amount of the inorganic portion of the hybrid core ranges from: about 0 molar % to not more than about 1 molar %; about 0 molar % to not more than about 2 molar %; about 0 molar % to not more than about 3 molar %; about 0 molar % to not more than about 4 molar %; about 0 molar % to not more than about 5 molar %; about 0 molar % to not more than about 6 molar %; about 0 molar % to not more than about 7 molar %; about 0 molar % to not more than about 8 molar %; about 0 molar % to not more than about 9 molar %; about 0 molar % to not more than about 10 molar %; about 0 molar % to not more than about 11 molar %; about 0 molar % to not more than about 12 molar %; about 0 molar % to not more than about 13 molar %; about 0 molar % to not more than about 14 molar %; about 0 molar % to not more than about 15 molar %; about 0 molar % to not more than about 16 molar %; about 0 molar % to not more than about 17 molar %; about 0 molar % to not more than about 18 molar %; about 0 molar % to not more than about 19 molar %; about 0 molar % to not more than about 20 molar %; about 0 molar % to not more than about 21 molar %; about 0 molar % to not more than about 22 molar %; about 0 molar % to not more than about 23 molar %; about 0 molar % to not more than about 24 molar %; and about 0 molar % to not more than about 25 molar; about 0 molar % to not more than about 26 molar %; about 0 molar % to not more than about 27 molar %; about 0 molar % to not more than about 28 molar %; about 0 molar % to not more than about 29 molar %; about 0 molar % to not more than about 30 molar %; about 0 molar % to not more than about 31 molar %; about 0 molar % to not more than about 32 molar %; about 0 molar % to not more than about 33 molar %; about 0 molar % to not more than about 34 molar %; about 0 molar % to not more than about 35 molar %; about 0 molar % to not more than about 36 molar %; about 0 molar % to not more than about 37 molar %; about 0 molar % to not more than about 38 molar %; about 0 molar % to not more than about 39 molar %; about 0 molar % to not more than about 40 molar %; about 0 molar % to not more than about 41 molar %; about 0 molar % to not more than about 42 molar %; about 0 molar % to not more than about 43 molar %; about 0 molar % to not more than about 44 molar %; about 0 molar % to not more than about 45 molar %; about 0 molar % to not more than about 46 molar %; about 0 molar % to not more than about 47 molar %; about 0 molar % to not more than about 48 molar %; about 0 molar % to not more than about 49 molar %; about 0 molar % to not more than about 50 molar %; about 0 molar % to not more than about 100 molar %; about 50 molar % to not more than about 99 molar %; and about 75 molar % to not more than about 99 molar %.

The inorganic portion of the hybrid core may be alumina, silica ($SiO_2$), titanium oxide, zirconium oxide, or ceramic materials. The hybrid material of the invention in which the inorganic portion is $SiO_2$ is particularly advantageous.

In one embodiment, the organic content is from about 1 to about 40% carbon. In another embodiment, the organic content is from about 5 to about 35% carbon. In yet another embodiment, the invention provides a porous inorganic/organic hybrid particle, wherein the organic content is from about 25 to about 40% carbon. In a further embodiment, the organic content is from about 25 to about 35% carbon. In a further embodiment, the organic content is from about 5 to about 15% carbon.

In one embodiment, the hybrid material of the invention comprises a hybrid core of formula I:

$$(SiO_2)d[R^2((R)_p(R^1)_qSiO_t)_m] \qquad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0, t is 0.5, 1.0, or 1.5;

d is 0 to about 30;

m is an integer from 1-20; wherein R, $R^1$ and $R^2$ are optionally substituted; provided that: (1) when $R^2$ is absent, m=1 and $$t = \frac{(4-(p+q))}{2},$$

when 0<p+q≤3; and (2) when $R^2$ is present, m=2-20 and $$t = \frac{(3-(p+q))}{2},$$

when p+q≤2.

In certain embodiments, $R^2$ is absent, t=1.5 when p+q=1; or t=1 when p+q=2. In other embodiments, $R^2$ is present, p=0, q is 0 or 1 and t=1.5 when q=0; or t=1 when q=1.

In certain embodiments, $R^2$ is absent. In other embodiments, $R^2$ is present. In embodiments of formula I in which $R^2$ is present, the invention comprises a hybrid core of formula I, wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another embodiment, d is 0.11. In still another embodiment, d is 0.33. In certain embodiments, d is 0.83.

In other embodiments of formula I in which $R^2$ is present, the invention comprises a hybrid core of formula I, wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms. In a further embodiment, p is 0, 1, or 2. In another further embodiment, t is 1.0 or 1.5. In another embodiment, m is 1 or 2.

Certain advantageous embodiments of hybrid cores of formula I in which $R^2$ is present are set forth in the following table (product numbers refer to the numbers used in the examples set forth below):

| Reference | Product In reference | Formula | d | p | q | t | m |
|---|---|---|---|---|---|---|---|
| U.S. Pat. No. 6,686,035 B2 | 3i | $(SiO2)_{0.96}(O_{1.5}SiCH_2CH_2SiO_{1.5})_{0.04}$ | 27 | 0 | 0 | 1.5 | 2 |
| U.S. Pat. No. 6,686,035 B2 | 3j | $(SiO2)_{0.89}(O_{1.5}SiCH_2CH_2SiO_{1.5})_{0.11}$ | 8 | 0 | 0 | 1.5 | 2 |
| U.S. Pat. No. 6,686,035 B2 | 3k | $(SiO2)_{0.85}(O_{1.5}SiCH_2CH_2SiO_{1.5})_{0.2}$ | 4 | 0 | 0 | 1.5 | 2 |
| U.S. Pat. No. 6,686,035 B2 | 3l | $(SiO2)_{0.66}(O_{1.5}SiCH_2CH_2SiO_{1.5})_{0.33}$ | 2 | 0 | 0 | 1.5 | 2 |
| U.S. Pat. No. 6,686,035 B2 | 3n | $(SiO2)_{0.5}(O_{1.5}SiCH_2CH_2SiO_{1.5})_{0.5}$ | 1 | 0 | 0 | 1.5 | 2 |
| WO 2008/103423 A1 | 13a | $(SiO2)_{0.45}(O_{1.5}SiCH_2CH_2SiO_{1.5})_{0.55}$ | 0.83 | 0 | 0 | 1.5 | 2 |
| WO 2008/103423 A1 | 13b, 13d-13g | $(SiO2)_{0.25}(O_{1.5}SiCH_2CH_2SiO_{1.5})_{0.75}$ | 0.33 | 0 | 0 | 1.5 | 2 |
| WO 2008/103423 A1 | 13c | $(SiO2)_{0.1}(O_{1.5}SiCH_2CH_2SiO_{1.5})_{0.9}$ | 0.11 | 0 | 0 | 1.5 | 2 |
| WO 2008/103423 A1 | 5h | $(O_{1.5}SiCH_2CH_2SiO_{1.5})$ | 0 | 0 | 0 | 1.5 | 2 |
| WO 2008/103423 A1 | 11a-i, l-q, t | $(O_{1.5}SiCH_2CH_2SiO_{1.5})_x(YSiO_{1.5})_{1-x}$ | 0 | 0, 1 | 0 | 1.5, 1.5 | 2, 1 |
| WO 2008/103423 A1 | 11j | $(O_{1.5}SiCH_2CH_2SiO_{1.5})_x(YSiO_{1.5})_w(ZSiO_{1.5})_{1-x-w}$ | 0 | 0, 1, 1 | 0, 0, 0 | 1.5, 1.5, 1.5 | 2, 1, 1 |
| WO 2008/103423 A1 | 11k, s | $(O_{1.5}SiCH_2CH_2SiO_{1.5})_x(O_{1.5}Si\text{—}Y\text{—}SiO_{1.5})_{1-x}$ | 0 | 0, 0 | 0, 0 | 1.5, 1.5 | 2, 2 |
| WO 2008/103423 A1 | 11e | $(O_{1.5}SiCH_2CH_2SiO_{1.5})_x(Y_2SiO_1)_{1-x}$ | 0 | 0, 2 | 0, 0 | 1, 5, 1.0 | 2, 1 |
| WO 2008/103423 A1 | 11r | $(O_{1.5}SiCH_2CH_2SiO_{1.5})_x(FSiO_{1.5})_{1-x}$ | 0 | 0, 0 | 0, 0 | 1.5, 1.5 | 2, 1 |

In another embodiment, the hybrid material of the invention comprises a hybrid core of formula II:

$$(SiO_2)_d/[(R)_p(R^1)_qSiO_t] \quad (II)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In yet another embodiment, the hybrid material of the invention comprises a hybrid core of formula III:

$$(SiO_2)/[R^2((R^1)_rSiO_r)_m] \quad (III)$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; when r=1 then t=1; or when r=2, then t=0.5; and m is an integer from 1-20.

In various embodiments, the invention comprises a hybrid core of formulas I and II, wherein R is $C_1$-$C_{18}$ alkoxy, $C_1$-$C_{18}$ alkyl, or $C_1$-$C_{18}$ alkyl. In various embodiments, the invention comprises a hybrid core of formulas I, II and III, wherein $R^1$ is $C_1$-$C_{18}$ alkoxy, $C_1$-$C_{18}$ alkyl, or $C_1$-$C_{18}$ alkyl. In various embodiments, the invention comprises a hybrid core of formulas I and III, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In yet another embodiment, the hybrid material of the invention comprises a hybrid core of formula IV:

$$(A)_x(B)_y(C)_z \quad (IV)$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; x and y are positive numbers, and z is a non negative number, wherein x+y+z=1. In certain embodiments, z=0, then $0.002 \leq x/y \leq 210$, and when $z \neq 0$, then $0.0003 \leq y/z \leq 500$ and $0.002 \leq x/(y+z) \leq 210$.

In a related embodiment, the hybrid material of the invention may comprise a hybrid core of formula V:

$$(A)_x(B)_y(B^*)_{y^*}(C)_z \quad (V)$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; x and y are positive numbers and z is a non negative number, wherein x+y+z=1. In certain embodiments, when z=0, then $0.002 \leq x/(y+y^*) \leq 210$, and when $z \neq 0$, then $0.0003 \leq (y+y^*)/z \leq 500$ and $0.002 \leq x/(y+y^*+z) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

A may also be one of the following:

B may also be one of the following:

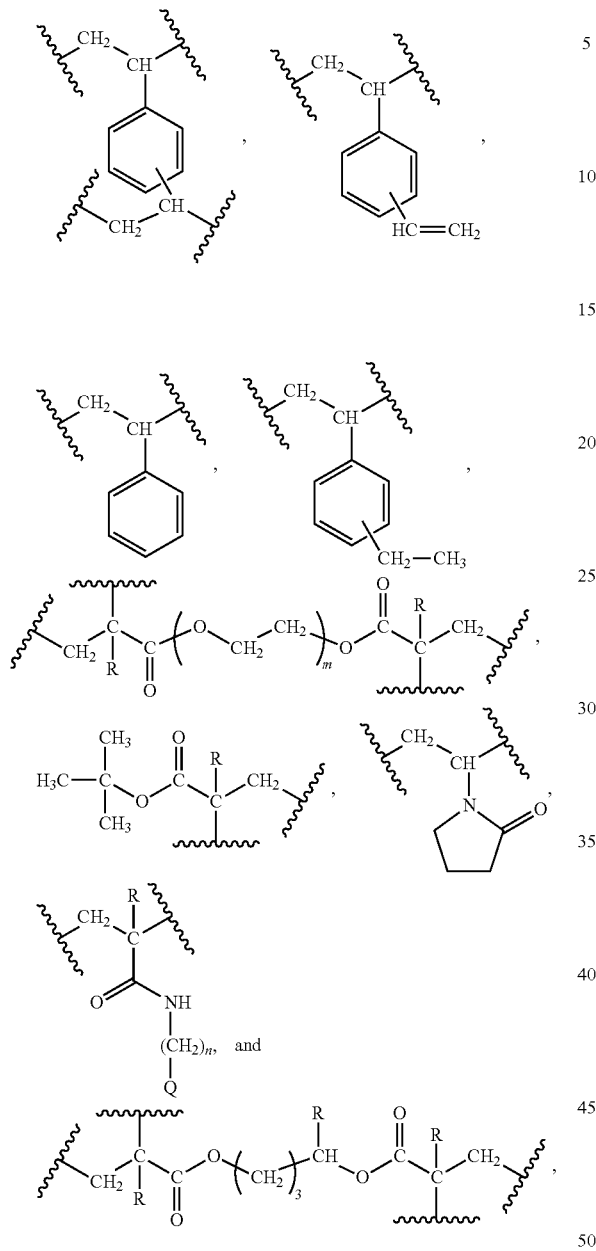

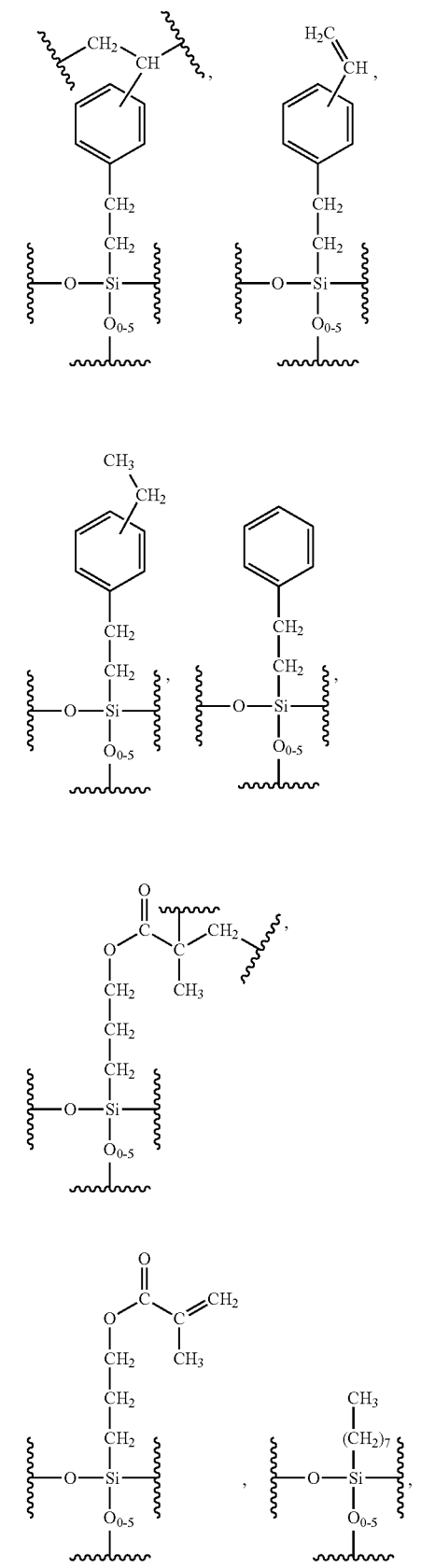

wherein each R is independently H or a $C_1$-$C_{10}$ alkyl group (e.g, methyl, ethyl, or propyl); m is an integer of from 1 to about 20; n is an integer of from 0 to 10; and Q is hydrogen, $N(C_{1-6}alkyl)_3$, $N(C_{1-6}alkyl)_2(C_{1-6}alkyl-SO_3)$, or $C(C_{1-6}hydroxyalkyl)_3$.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

-continued

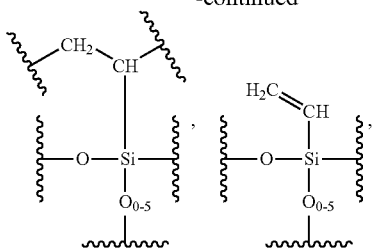

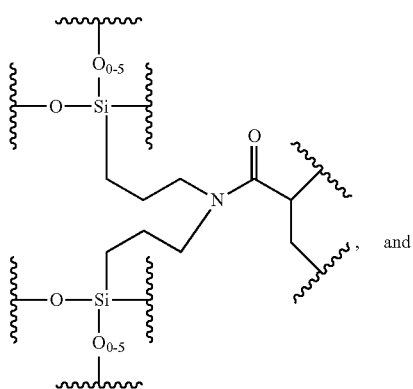

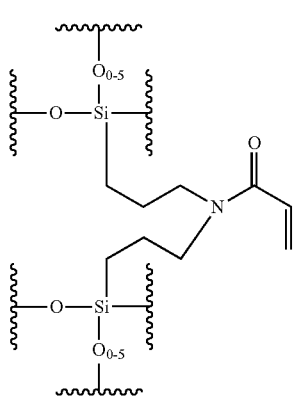

Repeat unit C may be —SiO$_2$— and may be derived from an alkoxysilane, such as tetraethoxysilane (TEOS) or tetramethoxysilane (TMOS).

In one embodiment, A is a substituted ethylene group, B is a oxysilyl-substituted alkyl group, and C is a oxysilyl group, for example the following:

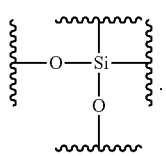

A specific embodiment of a porous hybrid core of formula IV is:

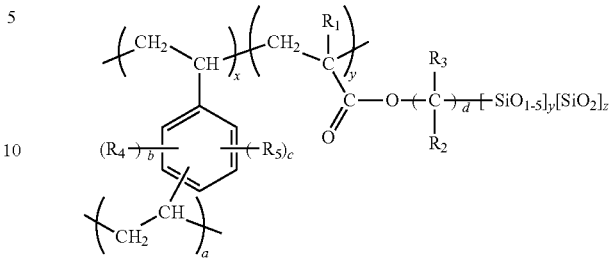

wherein $R_1$ is H, F, Cl, Br, I, lower alkyl (e.g., $CH_3$ or $CH_2CH_3$);

$R_2$ and $R_3$ are each independently H, F, Cl, Br, I, alkane, substituted alkane, alkene, substituted alkene, aryl, substituted aryl, cyano, ether, substituted ether, embedded polar group;

$R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2x$, $0 \leq b \leq 4$, and $0 \leq c \leq 4$, provided that $b+c \leq 4$ when $a=1$;

$1 \leq d \leq 20$, $0.0003 \leq y/z \leq 500$ and $0.002 \leq x/(y+z) \leq 210$.

In still another embodiment, the hybrid cores are spherical. In a further embodiment, the spherical core has a non-crystalline or amorphous molecular ordering. In a further embodiment, the spherical core has a non-periodic pore structure.

In another embodiment, the hybrid core has an average size of about 0.1 μm to about 300 μm. In a further embodiment, the hybrid core has an average size of about 0.1 μm to about 30 μm. In a further embodiment, the hybrid core has an average size of about 0.5 μm to about 30 μm. In a further embodiment, the hybrid core has an average size of about 0.9 μm to about 10 μm. In a further embodiment, the hybrid core has an average size of about 1.0 μm to about 3.0 μm.

In certain embodiments, the hybrid core material of the invention a substantially narrow particle size distribution. In certain other embodiments, the 90/10 ratio of particle sizes is from 1.00-1.55. In specific embodiments, the 90/10 ratio of particle sizes is from 1.00-1.10 or from 1.05-1.10. In other specific embodiments, the 90/10 ratio of particle sizes is from 1.10-1.55; from 1.10-1.50; or from 1.30-1.45.

In certain embodiments, the hybrid core is hydrolytically stable at a pH of about 1 to about 14. In one embodiment, the hybrid core is hydrolytically stable at a pH of about 10 to about 14. In another embodiment, the hybrid core is hydrolytically stable at a pH of about 1 to about 5.

In one embodiment, the invention comprises an inorganic/organic hybrid core as described herein, wherein the core is formed by hydrolytic condensation of one or more monomers selected from the group consisting of:

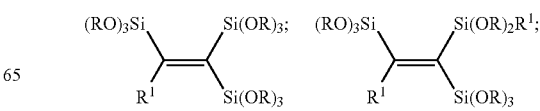

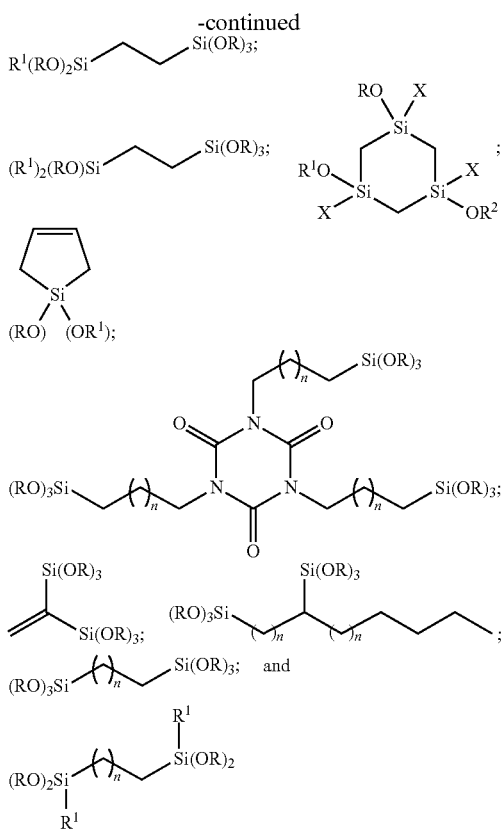

wherein R, R¹ and R² are as defined previously; X is $C_1$-$C_{18}$ alkoxy or $C_1$-$C_{18}$ alkyl; and n is 1-8.

In a further embodiment, the monomer is 1,2-bis(triethoxysilyl)ethane:

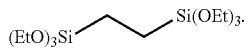

In another further embodiment, the monomer is 1,2-bis(methyldiethoxy silyl)ethane:

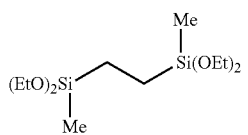

or 1,8-bis(triethoxysilyl)octane:

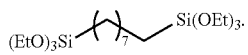

In certain embodiments, the monomer is phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; and 3-cyanobutyltrimethoxysilane alone or in a mixture with tetraethoxysilane or tetramethoxysilane.

In another embodiment, the monomer is a substituted benzene, including (but not limited to) 1,4-bis(triethoxysilyl)benzene, 1,4-bis(trimethoxysilyfl)benzene, 1,3-bis(triethoxysilyl)benzene, 1,3-bis(trimethoxysilyfl)benzene, 1,3,5-tris(triethoxysilyfl)benzene, 1,3,5-tris(trimethoxysilyfl)benzene, and bis(4-triethoxysilylphenyl)diethoxysilane.

In other embodiment, the porous inorganic/organic hybrid core as described herein has been surface modified with a surface modifier having the formula $Z_a(R')_b$Si—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the hybrid core have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier is selected from the group consisting of octyltrichlorosilane, octadecyltrichlorosilane, octyldimethylchlorosilane and octadecyldimethylchlorosilane. Advantageously, the surface modifier is selected from the group consisting of octyltrichlorosilane and octadecyltrichlorosilane.

In another embodiment, the hybrid core has been surface modified by a combination of organic group and silanol group modification.

In still another embodiment, the hybrid core has been surface modified by a combination of organic group modification and coating with a polymer. In a further embodiment, the organic group comprises a chiral moiety.

In yet another embodiment, the hybrid core has been surface modified by a combination of silanol group modification and coating with a polymer.

In other embodiments, the hybrid core has been surface modified via formation of an organic covalent bond between the particle's organic group and the modifying reagent.

In still other embodiments, the hybrid core has been surface modified by a combination of organic group modification, silanol group modification and coating with a polymer.

In another embodiment, the hybrid core has been surface modified by silanol group modification.

In certain embodiments, the porous inorganic/organic hybrid core is a monolith.

In another aspect, the invention provides materials as described herein wherein the hybrid core further comprises a nanoparticle or a mixture of more than one nanoparticles dispersed within the hybrid core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride. In certain embodiments the nanoparticle comprises a composite material, a magnetic material, a high thermal conductivity additive or a nanoparticle having a layered structure of additives.

In other embodiments, the nanoparticles may be less than or equal to 200 nm in diameter, less than or equal to 100 nm in diameter, less than or equal to 50 nm in diameter, or less than or equal to 20 nm in diameter.

Porous Shell Layer Material

The materials of the invention have one or more layers of a porous shell material applied to the substantially nonporous core. In certain embodiments, one or more layers of porous shell material are a porous inorganic/organic hybrid material; a porous silica or a porous composite material.

In certain aspects, the materials of the invention have a rough surface. In still other aspects, the materials of the invention have a smooth surface. As used herein, In certain embodiments, each porous layer is independently from 0.02 μm to 5 μm. in thickness as measured perpendicular to the surface of the nonporous core.

In other embodiments, each porous layer is independently from 0.06 μm to 1 μm. in thickness as measured perpendicular to the surface of the nonporous core.

In still other embodiments, each porous layer is independently from 0.20 μm to 0.70 μm. in thickness as measured perpendicular to the surface of the nonporous core.

In certain embodiments, the materials of the invention have between 1 and 15 layers of porous shell material. In other embodiments between 2 and 5 layers of porous shell material. In still others 1 or 2 layers of porous shell materials.

Porous Hybrids

In certain embodiments, the porous hybrid layer material or shell material which may layered onto the hybrid core may be independently derived from condensation of one or more polymeric organofunctional metal precursors, and/or polymeric metal oxide precursors on the surface of the hybrid core, or application of partially condensed polymeric organofunctional metal precursors, a mixture of two or more polymeric organofunctional metal precursors, or a mixture of one or more polymeric organofunctional metal precursors with a polymeric metal oxide precursors on the surface of the hybrid core.

In certain aspects, the inorganic portion of the surrounding material is independently selected from the group consisting of alumina, silica, titania, cerium oxide, or zirconium oxides, and ceramic materials.

Alternatively, the hybrid layer material may independently derived from condensation of one or more organofunctional silanes and/or tetraalkoxysilane on the surface of the hybrid core, or application of partially condensed organofunctional silane, a mixture of two or more organofunctional silanes, or a mixture of one or more organofunctional silanes with a tetraalkoxysilane (i.e., tetraethoxysilane, tetramethoxysilane) on the surface of the hybrid core.

In other aspects, the hybrid layer material may independently comprise from about 0-100 mol % hybrid material. The inorganic portion of the surrounding material may independently be alumina, silica, titanium oxide, cerium oxide, zirconium oxide or ceramic materials or a mixture thereof.

In specific aspects, the inorganic portion of the hybrid layer material may independently be present in an amount ranging from about 0 molar % to not more than about 25 molar %, wherein the pores of the surrounding material are substantially disordered. Similarly, the inorganic portion of the surrounding material may independently be present in an amount ranging from about 25 molar % to not more than about 50 molar %, wherein the pores of the surrounding material are substantially disordered, and wherein the hybrid layer material may or may not independently possesses a chromatographically enhancing pore geometry (CEPG). In certain embodiments, the inorganic portion of the hybrid layer material may independently be present in an amount ranging from about 50 molar % to not more than about 75 molar %, wherein the pores of the hybrid layer material are substantially disordered, and wherein the hybrid layer material independently possesses a chromatographically enhancing pore geometry (CEPG). In still other embodiments, the inorganic portion of the hybrid layer material may independently be present in an amount ranging from about 75 molar % to not more than about 100 molar %, wherein the pores of the hybrid layer material are substantially disordered, and wherein the hybrid layer material may or may not independently possesses a chromatographically enhancing pore geometry (CEPG).

In still other aspects, the inorganic portion of the hybrid layer material may independently be present in an amount ranging from about 0 molar % to not more than about 100 molar %; specifically, 0%-10%, 0%-5%, 0%-4%, 0%-3%, 0%-2%, 0%-1%, 1%-10%, 1%-5% a, 1%-4%, 1%-3%, 1%-2%, 5%-100%, 10%-100%, 15%-100%, 20%-100%, 25%-100%, 30%-100%, 35%-100%, 40%-100%, 45%-100%, 55%-100%, 60%-100%, 65%-100%, 70%-100% a, 75%-100%, 80%-100%, 81%-100%, 82%-100%, 83%-100%, 84%-100%, 85%-100%, 86%-100%, 87%-100%, 88%-100%, 89%-100%, 90%-100%, 91%-100%, 92%-100%, 93%-100%, 94%-100%, 95%-100%, 96%-100%, 97%-100%, 98%-100%, or 99%-100%.

In some aspects, the hybrid layer material may comprise a material of formula I:

$$(SiO_2)d[R^2((R)_p(R^1)_qSiO_t)_m]; \qquad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

R² is C₁-C₁₈ alkyl, C₂-C₁₈ alkenyl, C₂-C₁₈ alkynyl, C₃-C₁₈ cycloalkyl, C₁-C₁₈ heterocycloalkyl, C₅-C₁₈ aryl, C₁-C₁₈ heteroaryl; or absent; wherein each R² is attached to two or more silicon atoms;

p and q are each independently 0.0 to 3.0;

t is 0.5, 1.0, or 1.5;

d is 0 to about 30;

m is an integer from 1-20; wherein R, R¹ and R² are optionally substituted; provided that:

(1) when R² is absent, m=1 and $$t = \frac{(4-(p+q))}{2},$$

when 0<p+q≤3; and (2) when R is present, m=2-20 and $$t = \frac{(3-(p+q))}{2},$$

when p+q≤2.

In other aspects, the hybrid layer material may comprise a material of formula II:

$$(SiO_2)_d/[(R)_p(R^1)_q SiO_t] \quad (II);$$

wherein,

R and R¹ are each independently C₁-C₁₈ alkoxy, C₁-C₁₈ alkyl, C₁-C₁₈ alkyl, C₂-C₁₈ alkenyl, C₂-C₁₈ alkynyl, C₃-C₁₈ cycloalkyl, C₁-C₁₈ heterocycloalkyl, C₅-C₁₈ aryl, C₅-C₁₈ aryloxy, or C₁-C₁₈ heteroaryl;

d is 0 to about 30;

p and q are each independently 0.0 to 3.0, provided that when p+q=1 then t=1.5; when p+q=2 then t=1; or when p+q=3 then t=0.5.

In still other aspects, the hybrid layer material may comprise a material of formula III:

$$(SiO_2)_d/[(R^2((R^1)_rSiO_t)_m] \quad (III)$$

wherein,

R¹ is C₁-C₁₈ alkoxy, C₁-C₁₈ alkyl, C₁-C₁₈ alkyl, C₂-C₁₈ alkenyl, C₂-C₁₈ alkynyl, C₃-C₁₈ cycloalkyl, C₁-C₁₈ heterocycloalkyl, C₅-C₁₈ aryl, C₅-C₁₈ aryloxy, or C₁-C₁₈ heteroaryl;

R² is C₁-C₁₈ alkyl, C₂-C₁₈ alkenyl, C₂-C₁₈ alkynyl, C₃-C₁₈ cycloalkyl, C₁-C₁₈ heterocycloalkyl, C₅-C₁₈ aryl, C₁-C₁₈ heteroaryl; or absent; wherein each R² is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

In yet aspects, the hybrid layer material may comprise a material of formula IV:

$$(A)x(B)y(C)z \quad (IV),$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x and y are positive numbers and z is a non negative number, wherein x+y+z=1. In certain embodiments, when z=0, then 0.002≤x/y≤210, and when z≠0, then 0.0003≤y/z≤500 and 0.002≤x/(y+z)≤210.

In still yet other aspects, the hybrid layer material may comprise a material of formula V:

$$(A)x(B)y(B^*)y^*(C)z \quad (V),$$

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x and y are positive numbers and z is a non negative number, wherein x+y+y*+z=1. In certain embodiments, when z=0, then 0.002≤x/(y+y*)≤210, and when z≠0, then 0.0003≤(y+y*)/z≤500 and 0.002≤x/(y+y*+z)≤210.

In certain aspects, R² in the formulas presented above may be present or absent.

In certain aspects, R¹ in the formulas presented above is C₁-C₁₈ alkyl group substituted by hydroxyl. In still other aspects, R¹ in the formulas presented above is hydroxypropyl. In still other aspects, the hydroxy substituted alkyl group is further functionalized by an isocyanate. In yet other aspects, the isocyanate is octadecyl isocyanate, dodecyl isocyanate, pentafluorophenyl isocyanate, 4-cyanophenyl isocyanate, 3-cyanophenyl isocyanate, 2-cyanophenyl isocyanate, phenyl isocyate, benzyl isocyanate, phenethyl isocyanate or diphenylethyl isocyante.

In certain embodiments, the organosiloxane is, without limitation, phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyfl)benzene; 1,3-bis(triethoxysilyl)benzene; 1,3-bis(trimethoxysilyl)benzene; 1,8-bis(triethoxysilyl)octane; 1,8-bis(trimethoxysilyfl)octane; 1,2-bis(trimethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; and 3-cyanobutyltrimethoxysilane alone or in a mixture with tetraethoxysilane or tetramethoxysilane.

In another embodiment, the organosiloxane is, without limitation, a substituted benzene, including (but not limited to) 1,4-bis(triethoxysilyfIbenzene, 1,4-bis(trimethoxysilyl) benzene, 1,3-bis(triethoxysilyl)benzene, 1,3-bis(trimethoxysilyl)benzene, 1,3,5-tris(triethoxysilyl)benzene, 1,3,5-tris (trimethoxysilyfIbenzene, and bis(4-triethoxysilylphenyl) diethoxysilane.

In another aspect, the invention provides materials as described herein wherein the hybrid layer material further comprises a nanoparticle or a mixture of more than one nanoparticles dispersed within the hybrid core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride.

In other embodiments, the nanoparticles may be less than or equal to 200 μm in diameter, less than or equal to 100 μm in diameter, less than or equal to 50 μm in diameter, or less than or equal to 20 μm in diameter.

Porous Silica

In certain embodiments, the porous shell layer materials are porous silica.

Porous Composites.

In certain embodiments, the porous shell layer materials are composite materials. Composite materials describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, the short-hand convention used herein to describe a composite material containing a dispersed nanoparticle, $Np/(A)_w(B)_x(C)_y$, may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-VCH (Weinheim, Germany), 2003) The term "nanoparticle" is a microscopic particle/grain or microscopic member of a powder/nanopowder with at least one dimension less than about 100 nm, e.g., a diameter or particle thickness of less than about 100 nm (0.1 μm), which may be crystalline or noncrystalline.

Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 μm in diameter, e.g., less than or equal to 50 μm in diameter, e.g., less than or equal to 20 μm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

Nanoparticles are of great scientific interest as they are effectively a bridge between bulk materials and atomic or molecular structures. A bulk material should have constant physical properties regardless of its size, but at the nanoscale this is often not the case. Size-dependent properties are observed such as quantum confinement in semiconductor particles, surface plasmon resonance in some metal particles and superparamagnetism in magnetic materials.

In certain embodiments, the composite materials include magnetic materials, materials having a high thermal conductivity, or mixtures thereof.

Materials having a high thermal conductivity, high thermal conductivity cores or a high thermal conductivity additive is defined as a material, core or additive used in a superficially porous particle having a thermal conductivity greater than 20 W/(m·K). In various embodiments the core or additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). This high thermal conductivity core or additive can be a 0.1-8 μm core particle, nanoparticle additives, or a metal oxide precursor. In various embodiments the high thermal conductivity core or additive includes (but is not limited to) aluminum, copper, gold, and diamonds.

A high thermal diffusivity additive is defined as an additive used in a superficially porous particle having a thermal diffusivity greater than 20 mm²/s. In various embodiments the additive has a thermal diffusivity ranges from: about 20 mm²/s to not more than 2000 mm²/s; about 100 mm²/s to not more than 1600 mm²/s; and 150 mm²/s to not more than 1400 mm²/s. This high thermal conductivity additive can be a 0.1-8 μm core particle, nanoparticle additives, or a metal oxide precursor. In various embodiments the high thermal conductivity additive includes (but is not limited to) aluminum, copper, gold, and diamonds.

A magnetic material include materials that have a mass magnetization (σ, magnetic moment per unit mass, magnetic saturation or saturation magnetization) at room temperature greater than 15 emu/g (A m$^2$/kg). This includes ferromagnetic and ferrimagnetic materials, including (but is not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

Gradient Materials

In certain embodiments, the superficially porous materials of the invention utilize core materials having an increased hybrid content near the surface of the core.

In other embodiments, the superficially porous material of the invention utilize core materials having a decreased hybrid content near the surface of the core.

In such cases, such increase or decrease generally occurs within 1-200 nm of the surface of the core; alternatively within 5-60 nm of the surface of the core.

Similarly, in certain embodiments, the superficially porous materials of the invention include superficially porous materials having an increased hybrid content near the surface of the core. In other embodiments, the superficially porous material of the invention include superficially porous materials having a decreased hybrid content near the surface of the core.

In such cases, such increase or decrease generally occurs within 1-200 nm of the surface of the superficially porous material; alternatively within 5-60 nm of the surface of the superficially porous material.

Core and Material Morphology

In certain embodiments, the superficially porous material of the invention has specific core morphology. In certain embodiments, such core morphology is produced by using cores having the defined shape. In certain other embodiments, the core morphology refers to the specific defined shape of the product material of the invention.

In certain embodiments, the cores or the product material has a highly spherical, rod shaped, bent-rod shaped, toroid shaped or dumbbell shaped core morphology.

In certain other embodiments, the cores or the product material has a mixture of highly spherical, rod shaped, bent-rod shaped, toroid shaped or dumbbell shaped core morphologies.

Core and Material Properties.

The superficially porous material of the invention have significantly higher thermal conductivity than fully porous silica particles of the same size. In certain embodiments, the superficially porous material of the invention have significantly higher thermal conductivity than superficially porous silica particles of the same size. Determination of particle thermal conductivity can be made by the method of Gritti and Guiochon [*J. Chromatogr. A,* 2010, 1217, 5137) taking into account differences in bulk material properties, pore volume, surface modification type and coverage.

The superficially porous material of the invention have significantly improved chemical stability when exposed to high pH mobile phases unbonded, fully porous silica particles of the same size. In certain embodiments, the superficially porous material of the invention have significantly improved chemical stability when exposed to high pH mobile phases unbonded, superficially porous silica particles of the same size.

The superficially porous material of the invention are capable of forming a packed beds with improved permeability as compared to fully porous silica particles of the same size. In certain embodiments, the superficially porous material of the invention are capable of forming a packed beds with improved permeability as compared to superficially porous silica particles of the same size. Improved permeability for a give particle size is observed as a decrease in column backpressure. Determination of permeability of packed beds can be made by inverse size exclusion chromatography.

The superficially porous materials (which are particles) have an average particle size of the material is between 0.8-3.0 μm. Specifically, the average particle size of the material may be between 1.1-2.9 μm or between 1.3-2.7 μm.

The superficially porous materials have pores which have an average diameter of about 25-600 Å; about 60-350 Å; about 80-300 Å; or about 90-150 Å.

The superficially porous materials have an average pore volume of about 0.11-0.50 cm$^3$/g; about 0.09-0.45 cm$^3$/g; or about 0.17-0.30 cm$^3$/g.

The superficially porous materials have a pore surface area between about 10 m$^2$/g and 400 m$^2$/g.

Surface Modification

The materials of the invention may further be surface modified.

Thus, in one embodiment, the material as described herein may be surface modified with a surface modifier having the formula $Z_a(R')_b Si$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the materials have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R' is selected from the group consisting of alkyl, alkenyl, alkynyl, aryl, cyano, amino, diol, nitro, ester, a cation or anion exchange group, an alkyl or aryl group containing an embedded polar functionality and a chiral moiety. In certain embodiments, R' is selected from the group consisting of aromatic, phenylalkyl, fluoroaromatic, phenylhexyl, pentafluorophenylalkyl and chiral moieties.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier comprises an embedded polar functionality. In certain embodiments, such embedded polar functionality includes carbonate, amide, urea, ether, thioether, sulfinyl, sulfoxide, sulfonyl, thiourea, thiocarbonate, thiocarbamate, ethylene glycol, heterocyclic, or triazole functionalities. In other embodiments, such embedded polar functionality includes carbamate functionalities such as disclosed in U.S. Pat. No. 5,374,755, and chiral moieties. Such groups include those of the general formula

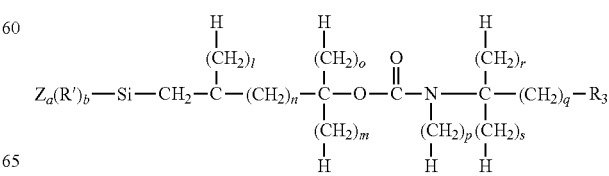

wherein l, m, o, r and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Advantageously, the carbamate functionality has the general structure indicated below:

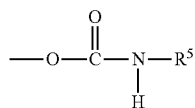

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

In certain embodiments, the surface modifier is selected from the group consisting of phenylhexyltrichlorosilane, pentafluorophenylpropyltrichlorosilane, octyltrichlorosilane, octadecyltrichlorosilane, octyldimethylchlorosilane and octadecyldimethylchlorosilane. In some embodiments, the surface modifier is selected from the group consisting of octyltrichlorosilane and octadecyltrichlorosilane. In other embodiments, the surface modifier is selected from the group consisting of an isocyanate or 1,1'-carbonyldiimidazole (particularly when the hybrid group contains a $(CH_2)_3OH$ group).

In another embodiment, the material has been surface modified by a combination of organic group and silanol group modification.

In still another embodiment, the material has been surface modified by a combination of organic group modification and coating with a polymer. In a further embodiment, the organic group comprises a chiral moiety.

In yet another embodiment, the material has been surface modified by a combination of silanol group modification and coating with a polymer.

In other embodiments, the material has been surface modified via formation of an organic covalent bond between the particle's organic group and the modifying reagent.

In still other embodiments, the material has been surface modified by a combination of organic group modification, silanol group modification and coating with a polymer.

In another embodiment, the material has been surface modified by silanol group modification.

Approaches to Synthesis

The invention provides a method for preparing a superficially porous material comprising:
 a.) providing a substantially nonporous core material; and
 b.) applying to said core material one or more layers of porous shell material to form a superficially porous material In certain embodiments, the method further provides the step of:
 c.) optimizing one or more properties of the superficially porous material.

The approaches described herein allows for the synthesis of narrow particle size distribution fully porous, spherical particles as well as narrow particle size distribution superficially porous (defined as a porous shell layer on a nonporous core particle) particles having a chromatographically enhanced pore geometry. The processes involves the condensation of a tetraalkoxysilane (e.g., tetraethoxysilane or tetramethoxysilane) alone or co-condensed with a second organosilane through modification of a traditional Stöber-growth process. Listed below are non-limiting descriptions of this process.

Method A:

Step 1) Condensation of a tetraalkoxysilane with or without $(R^1)_a(R^2)_b(R^3)_c Si(OR^4)_d$ to form seed particles (0.2-10 μm) in the presence or absence of surfactants or pore structuring agents (including pore expanding molecules and polymers).

Step 2) Grow seed particles by condensation of a tetraalkoxysilane with or without $(R^1)_a(R^2)_b(R^3)_n Si(OR^4)_d$ to form larger core particles (0.3-20 μm) in the presence or absence of surfactants or pore structuring agents (including pore expanding molecules and polymers).

Step 3) Further grow particles by co-condensation of a tetraalkoxysilane with $(R^1)_a(R^2)_b(R^3)_c Si(OR^4)_d$ to yield non-porous particles (0.4-20 μm) in the presence or absence of surfactants or pore structuring agents (including pore expanding molecules and polymers).

Step 4) Improve particle size distribution through particle classification techniques Step 5) Produce a porous silica particle by removal of organic group and or surfactants by thermal treatment.

Step 6) Pore structure modification using fluorine containing chemical techniques, including ammonium bifluoride and hydrofluoric acid.

Step 7) Pore structure modification by hydrothermal processing in the presence or absence of surfactants or pore structuring agents (including pore expanding molecules and polymers).

Step 8) Improve particle size distribution through particle classification techniques.

Step 9) Use of elevated temperature treatment (>600° C.) to improve particle mechanical stability.

Step 10) Prepare the particle surface for modification by acid treatment (e.g., hydrochloric acid or hydrofluoric acid).

Step 11) Chemical modification of the particle surface

Method B:

Step 1) Condensation of a tetraalkoxysilane with or without $(R^1)_a(R^2)_b(R^3)_c Si(OR^4)_d$ to form seed particles (0.2-10 μm) in the presence or absence of surfactants or pore structuring agents.

Step 2) Grow seed particles by condensation of a tetraalkoxysilane with or without $(R^1)_a(R^2)_b(R^3)_c Si(OR^4)_d$ to form larger core particles (0.3-20 μm) in the presence or absence of surfactants or pore structuring agents.

Step 3) Further grow particles by co-condensation of a tetraalkoxysilane with $(R^1)_a(R^2)_b(R^3)_c Si(OR^4)_d$ to yield non-porous particles (0.4-20 μm) in the presence or absence of surfactants or pore structuring agents (including pore expanding molecules and polymers).

Step 4) Improve particle size distribution through particle classification techniques Step 5) Produce a porous silica particle by removal of organic group and/or surfactants by thermal treatment or extraction techniques.

Step 6) Pore structure modification using fluorine containing chemical techniques, including ammonium bifluoride and hydrofluoric acid.

Step 7) Pore structure modification by pseudomorphic transformation in the presence of surfactants and/or pore structuring agents (including pore expanding molecules and polymers).

Step 8) Surfactant removal by extraction techniques or by calcination.
Step 9) Pore structure modification by hydrothermal processing in the presence or absence of surfactants or pore structuring agents (including pore expanding molecules and polymers).
Step 10) Improve particle size distribution through particle classification techniques
Step 11) Use of elevated temperature treatment (>600° C.) to improve particle mechanical stability.
Step 12) Prepare the particle surface for modification by acid treatment (e.g., hydrochloric acid or hydrofluoric acid).
Step 13) Chemical modification of the particle surface
Method C (Specific Version of Method A):
Step 1) Condensation of $Si(OCH_2CH_3)_4$ to form seed particles (0.2-2 μm)
Step 2) Grow seed particles by condensation of $Si(OCH_2CH_3)_4$ to form a larger core particle (0.3-7 μm).
Step 3) Further grow particles by co-condensation of $Si(OCH_2CH_3)_4$ with $RSi(OR')_3$ (R=octyl or octadecyl and R' is methyl or ethyl) to yield non-porous particle (0.4-10 μm) in the presence or absence of a pore structuring agent (e.g., mesitylene or an alkane). Here R=octyl or octadecyl and R' is methyl or ethyl.
Step 4) Improve particle size distribution through particle classification techniques
Step 5) Produce a porous silica particle by removal of organic group by thermal treatment (500-600° C. in air).
Step 6) Pore structure modification using ammonium bifluoride (4-20 hours, 25-60° C.).
Step 7) Pore structure modification by hydrothermal processing (7-20 hours, pH 5-7, 90-150° C.).
Step 8) Improve particle size distribution through particle classification techniques
Step 9) Use of elevated temperature treatment (800-1,000° C.) to improve particle mechanical stability.
Step 10) Prepare the particle surface for modification using hydrofluoric acid treatment.
Step 11) Chemical modification of the particle surface using chlorosilanes coupling and endcapping protocols.
Method D (Modified Core Particle):
Step 1) <10 μm particles (e.g., diamonds, zirconia, titanic, iron oxides, cerium, cobalt, cobalt oxides, carbon, silica, silica carbide) are surface activated through treatment with acid, base, chemical reduction, chemical oxidation, or through attachment of a surface modifying group (e.g., adsorption of an amine, surfactant, silane bond).
Step 2) Particles are grown by condensation of a tetraalkoxysilane with or without $(R^1)_a(R^2)_b(R^3)_cSi(OR^4)_d$ in the presence or absence of surfactants or pore structuring agents (including pore expanding molecules and polymers).
Step 3) Particle are further grown by co-condensation of a tetraalkoxysilane with $(R^1)_a(R^2)_b(R^3)_cSi(OR^4)_d$ to yield a non-porous particles in the presence or absence of surfactants or pore structuring agents (including pore expanding molecules and polymers).
Step 4) Improve particle size distribution through particle classification techniques
Step 5) Produce a porous silica particle by removal of organic group and/or surfactants by thermal treatment or extraction techniques.
Step 6) Pore structure modification using fluorine containing chemical techniques, including ammonium bifluoride and hydrofluoric acid.
Step 7) Pore structure modification by pseudomorphic transformation in the presence of surfactants and/or pore structuring agents (including pore expanding molecules and polymers).
Step 8) Surfactant removal by extraction techniques or by calcination.
Step 9) Pore structure modification by hydrothermal processing in the presence or absence of surfactants or pore structuring agents (including pore expanding molecules and polymers).
Step 10) Improve particle size distribution through particle classification techniques
Step 11) Use of elevated temperature treatment (>600° C.) to improve particle mechanical stability.
Step 12) Prepare the particle surface for modification by acid treatment (e.g., hydrochloric acid or hydrofluoric acid).
Step 13) Chemical modification of the particle surface
Alternatives
Many alternatives within a Method A-D can be explored. For example, if particle are substantially uniform in size after growth, further sizing steps may not be required. Other steps that may be avoided are the use of fluorine containing chemical modification step before pseudomorphic transformation, or the use of a higher temperature treatment to improve particle mechanical stability if the particles already have sufficient mechanical strength without the use of this step.

Method D may be useful for preparing superficially porous magnetic particles.

Other Approaches which Will be Useful in the Methods of the Invention are as Follows.

In one aspect, the invention provides a method for preparing a superficially porous material comprising:
 a.) providing a substantially nonporous hybrid core material; and
 b.) applying to said core material one or more layers of porous shell material to form a superficially porous material In certain embodiments, the method for preparing a superficially porous material further comprises the step of:
 c.) optimizing one or more properties of the superficially porous material.

In other embodiments, each layer of porous shell material wherein each layer is independently selected from is a porous inorganic/organic hybrid material, a porous silica, a porous composite material or mixtures thereof.

In still other embodiments, each layer of porous shell material is applied using sols, a polyelectrolyte or a chemically degradable polymer, wherein:
 a) the sols are inorganic sols, hybrid sols, nanoparticles, or mixtures thereof; and
 b) the polyelectrolyte or chemically degradable polymer is removed from the material using chemical extraction, degradation, or thermal treatment at temperatures less than 500° C., or combinations thereof.

In certain embodiments, each layer of porous shell material is applied by formation through an electrostatic or acid/base interaction of an ionizable group comprising the steps of:
 a) pretreating or prebonding the substantially nonporous core with an alkoxysilane that has an ionizable group,
 b) treating the substantially nonporous core to sols that are inorganic, hybrid, nanoparticle, or mixtures thereof, that have been prebonded with an alkoxysilane that has an ionizable group of the opposite charge to the ionizable group on the surface of the core; and c) forming additional layers on the material with sols that are inorganic, hybrid, nanoparticle, or mixtures thereof that have been prebonded with an alkoxysilant that has an ionizable group of opposite charge to the ionizable group of prior layer.

In particular embodiments, the pretreatment of the substantially nonporous core or sols includes washing with and acid or base, or a charged polyelectrolyte. In other embodiments, the pretreatment of the substantially nonporous core or sols includes chemical transformation of an accessible hybrid organic group.

In still other embodiments the accessible hybrid organic group is an aromatic group that can undergo sulfonation, nitration, amination, or chloromethylation followed by oxidation or nucleophillic displacement with amine containing groups to form ionizable groups. In yet other embodiments, the accessible hybrid organic group is an alkene group that can undergo oxidation, cross-metathesis, or polymerization to form ionizable groups. In specific embodiments, the accessible hybrid organic group is an thiol group that can undergo oxidation, radical addition, nucleophillic displacement, or polymerization to form ionizable groups.

In yet other embodiments, the prebonding of the substantially nonporous core or sols includes bonding with an alkoxysilane that has an ionizable group of equation 1,

$$R(CH_2)_n Si(Y)_{3-x}(R')_x \quad \text{(equation 1)}$$

where n=1-30, advantageously 2-3;
x is 0-3; advantageously 0;
Y represents chlorine, dimethylamino, triflate, methoxy, ethoxy, or a longer chain alkoxy group;
R represent a basic group, including (but not limited to) —$NH_2$, —$N(R')H$, —$N(R')_2$, —$NH(CH_2)_m NH_2$, —$NH(CH_2)_m N(R')H$, —$NH(CH_2)_m N(R')_2$, —$NH(CH_2)_m N(R')_3^+$, pyridyl, imidizoyl, polyamine.
R' independently represents an alkyl, branched alkyl, aryl, or cycloalkyl group;
m is 2-6.

In still yet other embodiments, the prebonding of the substantially nonporous core or sols includes bonding with an alkoxysilane that has an ionizable group of equation 2,

$$A(CH_2)_n Si(Y)_{3-x}(R')_x \quad \text{(equation 2)}$$

where n=1-30, advantageously 2-3;
x is 0-3; advantageously 0;
Y represents chlorine, dimethylamino, triflate, methoxy, ethoxy, or a longer chain alkoxy group;
A represent an acidic group, including (but not limited to) a sulfonic acid, carboxylic acid, phosphoric acid, boronic acid, arylsulfonic acid, arylcarboxylic acid, arylphosphonic acid, and arylboronic acid.
R' independently represents an alkyl, branched alkyl, aryl, or cycloalkyl group.

In particular embodiments, each layer of porous shell material is applied using a polyelectrolyte or a chemically degradable polymer.

In other embodiments, the polyelectrolyte or a chemically degradable is removed from the material by chemical extraction, degradation, or thermal treatment at temperatures less than 500° C., or combinations thereof.

In certain embodiments, each layer of porous shell material is applied using alkoxysilanes, organoalkoxysilanes, nanoparticles, polyorganoalkoxysiloxanes, or combinations thereof, comprising the steps of:
a) condensing siloxane precursors on the substantially nonporous core in a reaction mixture comprising ethanol, water and ammonium hydroxideand optionally containing a non-ionic surfactant, an ionic surfactant, a polyelectrolyte or a polymer to form the porous shell material; and
b) introducing porosity is introduced through extraction, degradation, oxidation, hydrolysis, deprotection, or transformation of the hybrid group, ionic surfactant or non-ionic surfactant or a combination thereof.

In particular embodiments, the alkoxysilanes, organoalkoxysilanes, nanoparticles, polyorganoalkoxysiloxanes, or combinations thereof, are condensed on the substantially nonporous core in a solution comprising ethanol, water, ammonium hydroxide, an ionic surfactant; and an non-ionic surfactant.

In other embodiments, the ionic surfactant is $C_{10}$-$C_{30}$N$(R)_3^+ X^-$, where R is methyl, ethyl, propyl, alkyl, fluoroalkyl; X is a halogen, hydroxide, or of the form $R'SO_3^-$ or $R'CO_2^-$ where R' is methyl, ethyl, butyl, propyl, isopropyl, tert-butyl, aryl, tolyl, a haloalkyl or a fluoroalkyl group.

In yet other embodiments, the ionic surfactant is octadecyltrimethylammonium bromide, octadecyltrimethylammonium chloride, hexadecyltrimethylammonium bromide, hexadecyltrimethylammonium chloride, dodecyltrimethylammonium bromide, or dodecyltrimethylammonium chloride.

In particular embodiments, the concentration of ionic surfactant is maintained in the reaction solution between 5-17 mM; or in certain embodiments between 8-14 mM.

In other embodiments, the non-ionic surfactant is a diblock or triblock copolymer. In certain embodiments, the copolymer is $(PEO)_x(PPO)_y(PEO)_x$, wherein
PEO is a polyethylene oxide repeat unit,
PPO is a polypropylene oxide repeat unit,
x is an integer between 5-106,
y is an integer between 30-85.

In particular embodiments the triblock copolymer is Pluronic® P123, having $(PEO)_{20}(PPO)_{70}(PEO)_{20}$. In still other embodiments, the alkoxysilanes, organoalkoxysilanes, or combinations thereof, are condensed on the substantially nonporous core in a solution comprising:
ethanol, water, ammonium hydroxide or combinations thereof;
octadecyltrimethylammonium bromide; and
Pluronic® P123.

In certain embodiments, the alkoxysilane used is selected from the group of tetramethoxsilane or tetraethoxysilane.

In still other embodiments, the organosiloxane is selected from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 2-bis(triethoxysilyl) ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl) ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene.

In yet other embodiments, the alkoxysilane used is tetraethoxysilane and the organoalkoxysilane used is 1,2-bis(triethoxysilyl)ethane.

In certain other embodiments, the concentration of octadecyltrimethylammonium bromide is maintained between 8-14 mM.

In certain other embodiments, the molar ratio of octadecyltrimethylammonium bromide and Pluronic® P123 is maintained at or above 1.30.

In still other embodiments, the molar ratio of alkoxysilane to organoalkoxysilane ranges between 30:1 to 1:30.

In certain embodiments, alkoxysilane, organoalkoxysilane, or combinations thereof are prediluted in ethanol. In certain such embodiments, prediluted ethanol solutions of alkoxysilane, organoalkoxysilane, or combinations thereof are added at a slow and constant rate to prevent fines generation, aggregation and agglomeration. In other such embodiments, prediluted ethanol solutions of alkoxysilane, organoalkoxysilane, or combinations thereof are added a rate between 5-500 µL/min.

In other embodiments, a secondary solution comprising ethanol, water, ammonium hydroxide, ionic surfactant and non-ionic surfactant is added at a slow and constant rate to prevent fines generation, aggregation and agglomeration. In certain such embodiments the secondary solution comprising ethanol, water, ammonium hydroxide, ionic surfactant and non-ionic surfactant is added within a range between the rate required to maintain a uniform ratio of particle surface area ($m^2$) to reaction volume, to the rate required to maintain a uniform ratio of particle volume ($m^3$) to reaction volume.

In certain embodiments, the surfactant mixture is removed through one or more of the following; extractions with acid, water, or organic solvent; ozonolysis treatments, thermal treatments <500° C., or thermal treatments between 500-1000° C.

In still other embodiments, the surfactant mixture is removed through combination of acid extractions and ozonolysis treatments.

In certain embodiments, each layer of porous shell material is applied using alkoxysilanes, organoalkoxysilanes, nanoparticles, polyorganoalkoxysiloxanes, or combinations thereof: comprising the steps of:
  a) condensing siloxane precursors on the substantially nonporoous core in a reaction mixture comprising ethanol, water or ammonium hydroxide to form a non-porous hybrid inorganic/organic shell material; and
  b) introducing porosity is introduced through extraction, degradation, oxidation, hydrolysis, deprotection, or transformation of the hybrid group or a combination thereof.

In some such embodiments, the alkoxysilane used is selected from the group of tetramethoxsilane or tetraethoxysilane.

In other such embodiments, the organosiloxane is selected as one or more of the following from the group of phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane, diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(trimethoxysilyl)ethane; 1,2-bis(triethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; or 1,3-bis(trimethoxysilylethyl)benzene, octadecyltrimethoxysilane, octadecyltriethoxysilane, octyltrimethoxysilane, octyltriethoxysilane, dodecyltrimethoxysilane, and dodecyltriethoxysilane.

In still other such embodiments, the alkoxysilane used is tetraethoxysilane and the organoalkoxysilane used is octadecyltrimethoxysilane.

In certain such embodiments, the alkoxysilane, one or more organoalkoxysilanes, or combinations thereof are prediluted in ethanol.

In some such embodiments, the prediluted ethanol solutions of alkoxysilane, one or more organoalkoxysilanse, or combinations thereof are added a slow and constant rate to prevent fines generation, aggregation and agglomeration.

In other such embodiments, prediluted ethanol solutions of alkoxysilane, one or more organoalkoxysilanes, or combinations thereof are added a rate between 5-500 µL/min In certain embodiments, a secondary solution comprising ethanol, water, and ammonium hydroxide is added at a slow and constant rate to prevent fines generation, aggregation and agglomeration.

In certain other embodiments, a secondary solution comprising ethanol, water, and ammonium hydroxide is added within a range between the rate required to maintain a uniform ratio of particle surface area ($m^2$) to reaction volume, to the rate required to maintain a uniform ratio of particle volume ($m^3$) to reaction volume.

In certain embodiments, porosity is introduced through extraction, degradation, hydrolysis, deprotection, or transformation of the hybrid group through one or more of the following; extractions with acid, water, or organic solvent; ozonolysis treatments, thermal treatments <500° C., or thermal treatments between 500-1000° C.

In still other embodiments, porosity is introduced through extraction, degradation, hydrolysis, deprotection, or transformation of the hybrid group through combination of acid extractions, ozonolysis treatments and/or thermal treatments <500° C.

In certain embodiments, each layer is applied using a mixture of formula XX.

$$(D)_d(E)_e(F)_f \qquad \text{(Formula XX)}$$

wherein,
  a) $d+e+f=1$
  b) D is one or more inorganic components upon initial condensation.
  c) E is one or more hybrid components upon initial condensation.
  d) F is one or more hybrid components upon initial condensation that can be further reacted to increase the porosity of the superficially porous layer In certain such embodiments, the precursor for the inorganic component upon initial condensation (D) is selected from oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of silicon, titanium, zirconium, or aluminum.

In other such embodiments, the precursor for the inorganic component upon initial condensation (D) is selected from tetraethoxysilane, tetramethoxysilane, methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

In still other such embodiments, the precursor for the hybrid component upon initial condensation (E) is selected from 1,2-bis(triethoxysilyl)ethane, 1,2-bis(trimethoxysilyl)ethane, 1,4-bis(triethoxysilyl)benzene, 1,4-bis(trimethoxysilyl)benzene, 1,3-bis(triethoxysilyl)benzene, 1,3-bis(trimethoxysilyflbenzene, 1,3,5-tris(triethoxysilyl)benzene, 1,3,5-tris(trimethoxysilyl)benzene, and bis(4-triethoxysilylphenyl)diethoxysilane.

In yet other such embodiments, the precursor for the hybrid component upon initial condensation that can be further reacted to increase the porosity of the superficially porous layer (F) is selected from phenyltrimethoxysilane, phenyltriethoxysilane, acetyloxyethyltrimethoxysilane; acetyloxyethyltriethoxysilane; chloroethyltriethoxysilane; chloroethyltrimethoxysilane; methacryloxypropyltrimethoxysilane; methacryloxypropyltriethoxysilane; bromoethyltrimethoxysilane; bromoethyltriethoxysilane; fluorotriethoxysilane; fluorotrimethoxysilane; and alkoxysilanes of the type:

(CH₃CH₂O)₄₋ᵥSi(OR*)ᵥ (Formula XXb)

wherein

R* was the corresponding octadecyl, dodecyl, octyl, 2-ethoxyethyl, or 3-ethyl-3-pentyl group, v was an integer equal to 1-4, In such embodiments, porosity is introduced by reaction of hybrid group F through protodesilylation, hydrolysis, deprotection, acid extraction, thermal treatment<500° C., oxidation, ozonolysis or decomposition.

Another aspect of the invention provides, a method to produce a hybrid core with increased hybrid content near the surface of the core by modifying a nonporous silica core with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid material that has increased hybrid content near the external surface of the material by modifying a superficially porous material with one more or more layers formed using an organosiloxane, a mixture of organosiloxane and alkoxysilane, polyorganoalkoxysilanes, a hybrid inorganic/organic surrounding material, or combination thereof.

Yet another aspect of the invention provides, a method to produce a superficially porous hybrid particle that has increased hybrid content near the external surface of the particle by modifying a superficially porous particle with one more or more layers formed using an organosiloxane, a mixture of organosiloxane and alkoxysilane, polyorganoalkoxysilanes, a hybrid inorganic/organic surrounding material, or combination thereof.

Still another aspect of the invention provides, a method to produce a superficially porous hybrid particle that has increased hybrid content near the external surface of the particle by modifying a superficially porous particle that is substantially silica (>90 molar %) with one more or more layers formed using an organosiloxane, a mixture of organosiloxane and alkoxysilane, polyorganoalkoxysilanes, a hybrid inorganic/organic surrounding material, or combination thereof.

Still yet another aspect of the invention provides, a method to produce a superficially porous hybrid particle that has increased hybrid content near the external surface of the particle comprising the steps of a.) forming a superficially porous particle that is substantially silica (>90 molar %) and has a pore volume between 0.18-0.50 cm³/g; and b.) reducing the porosity of this particle by 0.01-0.20 cm³/g by modify this particle with one more or more layers formed using an organosiloxane, a mixture of organosiloxane and alkoxysilane, polyorganoalkoxysilanes, a hybrid inorganic/organic surrounding material, or combination thereof.

In certain embodiments of the invention, the methods provide materials in which 1-15 layers are formed in the process. In other aspects, 2-5 layers are formed. In still other 1-2 layers are formed.

In certain embodiments of the invention the superficially porous material is optimized by acid extraction, classification, ozonolysis treatment, hydrothermal treatment, acid treatment or combinations thereof.

In yet other embodiments of the invention, the superficially porous material is further surface modified. In some aspects by: coating with a polymer; coating with a polymer by a combination of organic group and silanol group modification; a combination of organic group modification and coating with a polymer; a combination of silanol group modification and coating with a polymer; formation of an organic covalent bond between the material's organic group and a modifying reagent; or a combination of organic group modification, silanol group modification and coating with a polymer.

In another aspect, the invention provides a method for increasing the porosity of a substantially nonporous material comprising:

a.) providing a substantially nonporous core material; and b.) applying to said core material one or more layers of porous shell material to form a superficially porous material.

In such methods of increasing the porosity of a substantially nonporous material, the methods of applying to said core material one or more layers of porous shell material will be understood to be substantially the same as those described above for preparing a superficially porous material and should be considered as such.

Separation Devices and Kits

Another aspect provides a variety of separations devices having a stationary phase comprising the materials as described herein. The separations devices include, e.g., chromatographic columns, thin layer plates, filtration membranes, sample cleanup devices and microtiter plates; packings for HPLC columns; solid phase extraction (SPE); ion-exchange chromatography; magnetic bead applications; affinity chromatographic and SPE sorbents; sequestering reagents; solid supports for combinatorial chemistry; solid supports for oligosaccharide, polypeptides, and/or oligonucleotide synthesis; solid supported biological assays; capillary biological assay devices for mass spectrometry, templates for controlled large pore polymer films; capillary chromatography; electrokinetic pump packing materials; packing materials for microfluidic devices; polymer additives; catalysis supports; and packings materials for microchip separation devices. Similarly, materials of the invention can be packed into prepartory, microbore, capillary, and microfluidic devices.

The materials of the invention impart to these devices improved lifetimes because of their improved stability. Thus, in a particular aspect, the invention provides a chromatographic column having improved lifetime, comprising a) a column having a cylindrical interior for accepting a packing material, and b) a packed chromatographic bed comprising a materials as described herein.

I another particular aspect, the invention provides a chromatographic device, comprising a) an interior channel for accepting a packing material and b) a packed chromatographic bed comprising a materials as described herein.

The invention also provides for a kit comprising the materials as described herein, as described herein, and instructions for use. In one embodiment, the instructions are for use with a separations device, e.g., chromatographic columns, thin layer plates, filtration membranes, sample cleanup devices, solid phase extraction device, microfluidic device, and microtiter plates.

EXAMPLES

The present invention may be further illustrated by the following non-limiting examples describing the chromatographic materials.

Materials

All reagents were used as received unless otherwise noted. Those skilled in the art will recognize that equivalents of the following supplies and suppliers exist and, as such, the suppliers listed below are not to be construed as limiting.

Characterization

Those skilled in the art will recognize that equivalents of the following instruments and suppliers exist and, as such, the instruments listed below are not to be construed as limiting. The % C, % H, % N values were measured by combustion analysis (CE-440 Elemental Analyzer; Exeter Analytical Inc., North Chelmsford, Mass.) or % C by Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multipoint $N_2$ sorption method (Micromeritics ASAP 2400; Micromeritics Instruments Inc., Norcross, Ga.). The SSA was calculated using the BET method, the SPV was the single point value determined for $P/P_0 > 0.98$ and the APD was calculated from the desorption leg of the isotherm using the BJH method. Scanning electron microscopic (SEM) image analyses were performed (JEOL JSM-5600 instrument, Tokyo, Japan) at 7 kV. Focused ion beam scanning electron microscopic (FEB/SEM) image analyses were performed by Analytical Answers Inc. (Woburn, Mass.) on an FEI Model 200 Focused Ion Beam instrument, and a Hitachi 54800 Ultra-Field emission SEM. Particle sizes were measured using a Beckman Coulter Multisizer 3 analyzer (30 µm aperture, 70,000 counts; Miami, Fla.). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Light scattering particle size measurements were measured using a Malvern Mastersizer 2000 in water. Zeta-potential measurements were made using a Malvern ZetaSizer NanoSeries (model ZEN3600). Multinuclear ($^{13}$C, $^{29}$Si) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}$C and $^{29}$Si CP-MAS NMR spectral shifts were recorded relative to tetramethylsilane using the external standards adamantane ($^{13}$C CP-MAS NMR, δ 38.55) and hexamethylcyclotrisiloxane ($^{29}$Si CP-MAS NMR, δ −9.62). Populations of different silicon environments were evaluated by spectral deconvolution using DMFit software. [Massiot, D.; Fayon, F.; Capron, M.; King, I.; Le Calvé, S.; Alonso, B.; Durand, J.-O.; Bujoli, B.; Gan, Z.; Hoatson, G. Magn. Reson. Chem. 2002, 40, 70-76]. Classification techniques are described, for example, in W. Gerhartz, et al. (editors) *Ullmann's Encyclopedia of Industrial Chemistry, 5$^{th}$ edition*, Volume B2: Unit Operations I, VCH Verlagsgesellschaft mbH, (Weinheim™, Fed. Rep. Germ. 1988). Magnetic measurements were made using a vibrating sample magnetometer (ADE/DMS Model 880) by ArKival Technology Corporation (Nashua, N.H.). Phase characterization were made by Wide Angle X-Ray Powder Diffraction (XRPD) analysis (H&M Analytical Services, Inc. Allentown, N.J.), using a Bruker D4 diffractometer (Cu radiation at 40 KV/30 mA). Scans were run over the angular range of 10° to 90° 2-Theta with a step size of 0.02° and a counting time of 715 seconds per step.

Example 1

Nonporous hybrid particles were formed following a modification of a reported process {Choi, J. Y.; Kim, C. H.; Kim, D. K. *J. Am. Ceram. Soc.*, 1998, 81, 1184-1188. Seog, I. S; Kim, C. H. *J. Mat. Sci.*, 1993, 28, 3277-3282}. To a clean 40 mL vial was added a stir bar, water (26 mL) and 14.8 M NH$_4$OH (4.3 mL). This solution was then heated to 60° C. with stirring (600 rpm) in a water bath before one or more alkoxysilanes, including phenyltriethoxysilane (PTES, Gelest, Morrisville, Pa.), 1,8-bis(triethoxysilyl)octane (BTEO, Gelest, Morrisville, Pa.), 1,2-bis(triethoxysilyl)ethane (BTEE, Gelest, Morrisville, Pa.), 1,2-bis(methyldiethoxysilyl)ethane (BMDEE, Gelest, Morrisville, Pa.), vinyltriethoxysilane (VTES, Gelest, Morrisville, Pa.), or mercaptopropyltrimethoxysilane (MPTMS, Lancaster Chemical, Lancaster UK) were added (3 mL total). The reaction was sealed, and returned to the 60° C. water bath for 2 h. The reaction was further continued for 24 h at 25° C. The particles were isolated by repeated centrifugation from water (3×40 mL) and then ethanol (3×40 mL). The particles were then air dried for 12 h and vacuum dried (70° C., 30 mm Hg) for 24 h. Carbon content was determined by combustion analysis. Average particle size was determined by SEM. These experiments differ from the prior reports in the use of bridging hybrid silanes (BTEO, BTEE, and BMDEE) which are known to have increased high pH stability, as well as the use of synthetically relevant groups. For example, particles containing surface vinyl groups can be further reacted by the following transformation (not limited to); oxidation, polymerization, radical addition or metathesis. Particles containing surface thiol groups can be further reacted by the following transformation (not limited to); oxidation, radical addition, or disulfide bond formation. Particles containing surface phenyl groups can be further reacted by the following transformation (not limited to); protodesilylation or aromatic substitution. As shown in FIG. 1 these nonporous hybrid materials are highly spherical particles that can have varying particle size distribution depending on synthetic conditions. FIG. 1 contains SEM images of product 1 h and 11. Product 1 h clearly has a wider particle size distribution than product 11. The assessment of particle size distribution can also be made by determining the 90/10 ratio. This approach is suitable to prepare products with 90/10 ratios<1.20 and 90/10 ratios between 1.20-1.55. Differences in particle size distributions impacts packed bed structure and pressure of packed beds of chromatographic materials.

TABLE 1

| Product | Silanes (vol/vol Ratio) | % C | Particle Size (μm) | Spherical Particles (Y/N) |
|---|---|---|---|---|
| 1a | PTES | 42.4% | 1.3 | Y |
| 1b | BTEO/PTES (1:2) | 29.4% | — | Y |
| 1c | BTEO/PTES (2:1) | 29.2% | — | Y |
| 1d | BTEE/PTES (1:2) | — | — | Y |
| 1e | BTEE/PTES (2:1) | — | — | N |
| 1f | BMDEE/PTES (2:1) | — | — | N |
| 1g | BMDEE/PTES (1:1) | 41.6% | 1.3 | Y |
| 1h | BMDEE/PTES (1:5) | 49.8% | 1.4 | Y |
| 1i | VTES/PTES (10:1) | 26.0% | — | Y |
| 1j | VTES/PTES (3.3:1) | — | — | Y |
| 1k | VTES/PTES (1:1) | — | — | Y |
| 1l | VTES/PTES (1:2.5) | 30.6% | 1.1 | Y |
| 1m | VTES/PTES (1:9) | 26.0% | 2.3 | Y |
| 1n | VTES | 23.7% | 1.2 | Y |
| 1o | MPTMS | 25.9% | 0.88 | Y |

Example 2

Nonporous hybrid particles were formed following a modification of a reported process {U.S. Pat. Nos. 4,983,369 and 4,911,903}. To a clean Nalgene bottle (125 mL) was added a stir bar, water (14 mL), ethanol (80 mL), and NH$_4$OH (7 mL, 14.8 M). One or more alkoxysilanes, including tetraethoxysilane (TEOS, Gelest, Morrisville, Pa.), phenyltriethoxysilane (PTES, Gelest, Morrisville, Pa.), or mercaptopropyltrimethoxysilane (MPTMS, Lancaster Chemical, Lancaster UK) were added with stirring (600 rpm, 4 mL, 25° C.). The reaction was sealed and the onset of turbidity was monitored. The formation of spherical particles was further monitored over 24 h by light microscopy. The particles were purified and isolated by repeated centrifugation from ethanol (3×100 mL) and water (3×100 mL). The particles were air dried for 12 h and then vacuum dried (70° C., 30 mm Hg) for 12 h. Carbon content was determined by combustion analysis. Average particle size was determined by SEM.

TABLE 2

| Product | Silanes (vol/vol Ratio) | % C | Particle Size (μm) | Spherical Particles (Y/N) |
|---|---|---|---|---|
| 2a | TEOS | 3.5 | 0.55 | Y |
| 2b | PTES/TEOS (1:1) | 18.4 | 0.72 | Y |
| 2c | MPTMS/TEOS (1:1) | 22.4 | 0.81 | Y |

Example 3

Product 2c was thermally treated in an air muffled oven at 700° C. for 3 h. The resulting nonporous silica product (3a) had no organic content.

Example 4

One or more organoalkoxysilanes (all from Gelest Inc., Morrisville, Pa. or United Chemical Technologies, INC., Bristol, Pa.) were mixed with ethanol (anhydrous, J. T. Baker, Phillipsburgh, N.J.) and 0.1 N hydrochloric acid (Aldrich, Milwaukee, Wis.) in a flask. The resulting solution was agitated and refluxed for 16 hours in an atmosphere of argon or nitrogen. Alcohol was removed from the flask by distillation at atmospheric pressure. Residual alcohol and volatile species were removed by heating at 95-120° C. for 1-2 hours in a sweeping stream of argon or nitrogen. The resulting polyorganoalkoxy siloxanes (POS) were clear viscous liquids. The chemical formulas are listed in Table 3 for the organoalkoxysilanes used to make the product POS. Specific amounts are listed in Table 4 for the starting materials used to prepare these products.

TABLE 3

| Product | Organoalkoxysilane A Chemical Formula | Organoalkoxysilane or Alkoxysilane B Chemical Formula | Molar Ratio A:B |
|---|---|---|---|
| 4a | (CH$_3$CH$_2$O)$_3$Si(CH$_2$)$_2$Si(OCH$_2$CH$_3$)$_3$ | — | 1:0 |
| 4b | (CH$_3$CH$_2$O)$_3$Si(CH$_2$)$_2$Si(OCH$_2$CH$_3$)$_3$ | (CH$_3$CH$_2$O)$_3$Si(CH$_2$)$_8$Si(OCH$_2$CH$_3$)$_3$ | 4:1 |
| 4c | (CH$_3$CH$_2$O)$_3$Si(CH$_2$)$_2$Si(OCH$_2$CH$_3$)$_3$ | (CH$_3$CH$_2$O)$_2$(CH$_3$)Si(CH$_2$)$_2$Si(CH$_3$)(OCH$_2$CH$_3$)$_2$ | 1:4 |

TABLE 4

| Product | Organosilane A (g) | Organosilane B (g) | 0.1N HCl (g) | Ethanol (g) | % C | Viscosity (cP) |
|---|---|---|---|---|---|---|
| 4a | 130 | — | 11.5 | 42.2 | 34.6 | 227 |
| 4b | 100 | 31 | 11.1 | 40.6 | 36.2 | 262 |
| 4c | 27.8 | 100 | 8.2 | 45.2 | 37.9 | 45 |

Example 5

Figure 2:
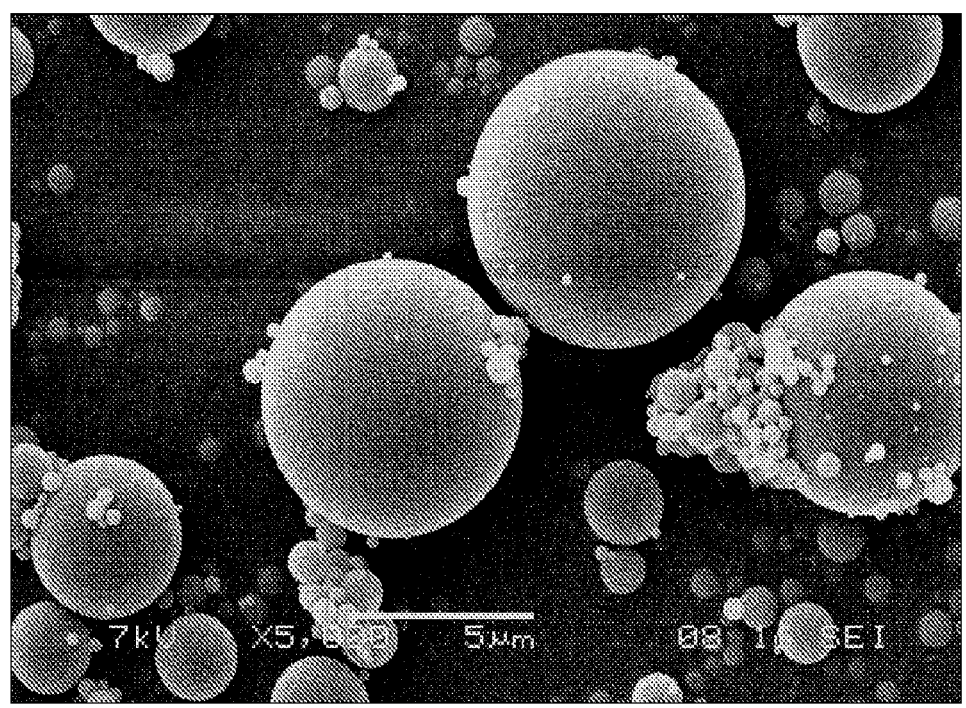
FIG. 2 is an SEM analysis of Products 5a from Example 5.

Following a modified process of WO2008103423, An aqueous mixture of Triton® X-100 (5.6 g, X100, Dow Chemical, Midland, Mich.), deionized water and ethanol (52 g, EtOH; anhydrous, J. T. Baker, Phillipsburgh, N.J.) was heated at 55° C. for 0.5 h. In a separate flask, an oil phase solution was prepared by mixing a POS (58 g) from Example 4 for 0.5 hours with toluene (Tol; HPLC grade, J. T. Baker, Phillipsburgh, N.J.). Under rapid agitation, the oil phase solution was added into the EtOH/water/X100 mixture and was emulsified in the aqueous phase using a rotor/stator mixer (Model 100L, Charles Ross & Son Co., Hauppauge, N.Y.). Thereafter, 30% ammonium hydroxide (44 mL, $NH_4OH$; J. T. Baker, Phillipsburgh, N.J.) was added into the emulsion. Suspended in the solution, the gelled product was transferred to a flask and stirred at 55° C. for 16 h. Formed particles were isolated on 0.5 μm filtration paper and washed consecutively with copious amounts of water and methanol (HPLC grade, J. T. Baker, Phillipsburgh, N.J.). The particles were then dried at 80° C. under vacuum for 16 hours. Specific amounts of starting materials used to prepare these products are listed in Table 5. The % C values, specific surface areas (SSA), specific pore volumes (SPV) and average pore diameters (APD) of these materials are listed in Table 5. Materials prepared by this approach are highly spherical by SEM (FIG. 2), and have little to no porosity (SSA≤24 $m^2/g$, SPV≤0.1 $cm^3/g$). Materials prepared by this approach are larger and have broader particle size distributions than those prepared in Examples 1-3. Modifications in shear rate or addition of charged co-surfactants can be used to increase or decrease average particle size. Classification techniques can be used to isolate individual product fractions of desired size range (1-15 μm). This approach is suitable to prepare products with 90/10 ratios<1.20 and 90/10 ratios between 1.20-1.55. Differences in particle size distributions impacts packed bed structure and pressure of packed beds of chromatographic materials.

TABLE 5

| Product | POS | Toluene (g) | Water (g) | % C | SSA ($m^2$/g) | SPV ($cm^3$/g) | $dp_{50}$ (μm) | 90/10 Ratio |
|---|---|---|---|---|---|---|---|---|
| 5a | 4a | 5.2 | 360 | 30.6 | 17 | 0.03 | 5.8 | 3.8 |
| 5b | 4b | 10.5 | 360 | 35.2 | 5 | 0.01 | 13.9 | 4.6 |
| 5c | 4c | 5.2 | 280 | 30.9 | 24 | 0.10 | 14.6 | 6.5 |

Example 6

Non-porous particles are prepared by thermal treatment of porous silica and hybrid inorganic/organic particles in an air muffled oven at 1,000-1,200° C. for 20-40 hours. Example of porous hybrid particles included (but are not limited to) examples in Jiang {U.S. Pat. Nos. 6,686,035; 7,223,473; 7,919,177} and Wyndham {WO 2008/103423}. The resulting nonporous silica products have no organic content. These materials maintain the general morphology and particle size distribution of the feed material. Average particle size decreases in this process. The degree of particle size decrease depends on the composition, density and porosity of the feed material. Any agglomerated materials are removed through grinding or classification. This approach is suitable to prepare products with 90/10 ratios<1.20 and 90/10 ratios between 1.20-1.55. Differences in particle size distributions impacts packed bed structure and pressure of packed beds of chromatographic materials.

Example 7

Following the reports of Kievsky {*IEEE Transactions on Nanotechnology,* 2005, 4, 5, 490}, rod shaped materials were prepared through the hydrochloric acid catalyzed hydrolysis of tetraethoxysilane (TEOS, Gelest, Morrisville, Pa.) in water in the presence of cetyltrimethyl ammonium chloride (CTAC, Aldrich, Milwaukee, Wis.). Products were collected on a filter and were washed with water and methanol. The products were dried under vacuum (80° C., 12 h) and were submitted for SEM characterization. Depending on concentration of water (336 mL), hydrochloric acid (0.8-1.7 mol), CTAC (0.02-0.04 mol) and TEOS (0.02 mol), initial agitation, reaction time and temperature (4-25° C.) a variety of different material morphologies were generated, including straight rods, bent rods, spirals, and spherical particles. This approach is suitable to prepare products with distributions of lengths and thicknesses. Isolation of sized samples and removal of any agglomerated materials is achieved through classification. Differences rod lengths and thickness are an important variable that impacts packed bed structure and pressure of packed beds, alone or in a mixture with spherical particle packings.

Example 8

Modification of experiment detailed in Example 7 to replace tetraethoxysilane with the use one or more of the following (but not limited to): phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyl)benzene; 1,3-bis(triethoxysilyl)benzene; 1,3-bis(trimethoxysilyl)benzene; 1,8-bis(triethoxysilyl)octane; 1,8-bis(trimethoxysilyl)octane; 1,2-bis(triethoxysilyl)ethane; 1,2-bis(trimethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl) ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; 3-cyanobutyltrimethoxysilane; methacryloxypropyltrimethoxysilane; methacryloxypropyltriethoxysilane; acetyloxyethyltrimethoxysilane; acetyloxyethyltriethoxysilane; chloroethyltriethoxysilane; chloroethyltrimethoxysilane; fluorotriethoxysilane; or fluorotrimethoxysilane alone or in a mixture with tetraethoxysilane or tetramethoxysilane. Products were collected on a filter and were washed with water and methanol. The products are dried under vacuum (80° C., 12 h) and are submitted for SEM characterization. Through optimization of reagents and temperature conditions a variety of different material morphologies are generated, including straight rods, bent rods, spirals, and spherical particles. Removal of excess surfactant is achieved through extraction. Isolation of sized samples and removal of any agglomerated materials is achieved through classification. This approach is suitable to prepare products with distributions of lengths and thicknesses. Isolation of sized samples and removal of any agglomerated materials is achieved through classification. Differences rod lengths and thickness are an important variable that impacts packed bed structure and pressure of packed beds, alone or in a mixture with spherical particle packings.

Example 9

The porosity of products obtained in Example 7 and 8 are reduced by thermal treatment in an air muffled furnace at 700-1,200° C. for 10-72 hours. Isolation of sized samples and removal of any agglomerated materials is achieved through classification.

Example 10

Selected products from Examples 8 and 9, or porous silica (SSA between 5-1,000 $m^2/g$; SPV between 0.1-1.6 $cm^3/g$; and APD between 10-1000 Å) and hybrid inorganic/organic particles (SSA between 5-1,000 $m^2/g$; SPV between 0.1-1.6 $cm^3/g$; and APD between 10-1000 Å) are partially or completely pore filled with a mixture of one or more of the following; polymer, polymerizable monomer, silane, polyorganosiloxanes, or nanoparticles (5-200 nm) of diamonds, aluminum, gold, silver, iron, copper, titanium, niobium, zirconium, cobalt, carbon, silicon, silica carbide, cerium or any oxides thereof. The use of nanoparticles of diamonds allows for improved thermal conductivity of these materials. The use of ferromagnetic and ferrimagnetic nanoparticles, includes (but is not limited to): magnetite (ferrous ferric oxide); maghemite; yttrium iron garnet, cobalt, $CrO_2$; and ferrites containing iron and Al, Mg, Ni, Zn, Mn or Co). These magnetic materials allow for magnetic capture and processing of these materials. Examples of silanes and polyorganosilanes include (but are not limited to) those included in Example 4 and Jiang {U.S. Pat. Nos. 6,686,035; 7,223,473; 7,919,177} and Wyndham {WO 2008/103423}. Examples of polymers include latexes, epoxides, methacrylates, styrene, divinyl benzene, polysaccharides, dendrigrafts, hyperbranched polymers, and others included in Polymer Handbook {$4^{th}$ edition, J. Brandrup; E. H. Immergut; E. A. Grulke; editors: Wiley: Hoboken, N.J., 1999}. The filling of these porous particles can be performed by creating a mixture of additives in a solvent including (but not limited to) methylene chloride, water, acetone or ethanol followed by slow evaporation using an efficient rotary evaporator (0-78° C., 1-24 h), to yield a free flowing powder. Alternatively, dry powder can be tumbled with additives in a polyethylene bottle at 0-100° C. for 1-24 h), to yield a free flowing power. The powder produced can be washed with a suitable solvent including (but not limited to) ethanol or methanol.

When silanes or polyorganosiloxanes are employed as additives, hydrolytic condensation can be performed using an aqueous solution of ammonium hydroxide and an alcohol, including (but not limited to) ethanol, isopropanol, or methanol. After stirring for 2-20 hours the product is collected on a filter and is washed with water and methanol or acetone. The product is dried under vacuum (80° C., 12 h) and is submitted for SEM characterization.

When polymerizable monomers are employed as additives, polymerization is performed using an appropriate initiator including (but not limited to) free radical initiators, ring opening polymerization catalysts, metathesis catalysts, and living polymerization catalysts. After stirring for 2-20 hours the product is collected on a filter and is washed with water and toluene or acetone. The product is dried under vacuum (80° C., 12 h) and is submitted for SEM characterization.

This process is repeated as needed to further reduce porosity and increase amounts of additives in the pore structure. Interval approaches of silanes or polyorganosiloxanes additives with polymer additives are performed as needed to further reduce porosity and increase amounts and types of additives in the pore structure. Layered or repeating structures of additives can be prepared by this approach. For example, a composite material containing both diamonds and magnetite would be beneficial for thermal conductivity improvements and magnetic capture processing. A material that contains alumina or titania is suitable for glycopeptides, phosphopeptide and phospholipids separations. A material that contains ceria may be suitable for phospholipid and phosphatidylcholines separations.

Materials prepared by this approach are free flowing and maintain the general morphology and particle size distribution of the porous feed material. This approach is suitable to prepare products with 90/10 ratios<1.20 and 90/10 ratios between 1.20-1.55. SPV decreases in this process. Exemplary products of this process are nonporous. The degree of porosity reduction depends on the amount of additives incorporated in the pore structure. Any agglomerated materials can be removed through grinding or classification.

Example 11

Composite materials of Example 10 are thermally treated at 700-1,200° C. for 10-40 hours to further reduce SPV. This thermal treatment is performed in air, under an inert atmosphere, or in a reducing atmosphere depending on compatibility of the additives employed. Materials containing diamond or magnetite employ an inert or reducing atmosphere is used to prevent oxidation.

Materials prepared by this approach are free flowing and maintain the general morphology and particle size distribution of the porous feed material. SPV decreases in this process. Exemplary products of this process are nonporous. The degree of porosity reduction depends on the composition, density and porosity of the feed material. Any agglomerated materials can be removed through grinding or classification.

Example 12

Figure 3:
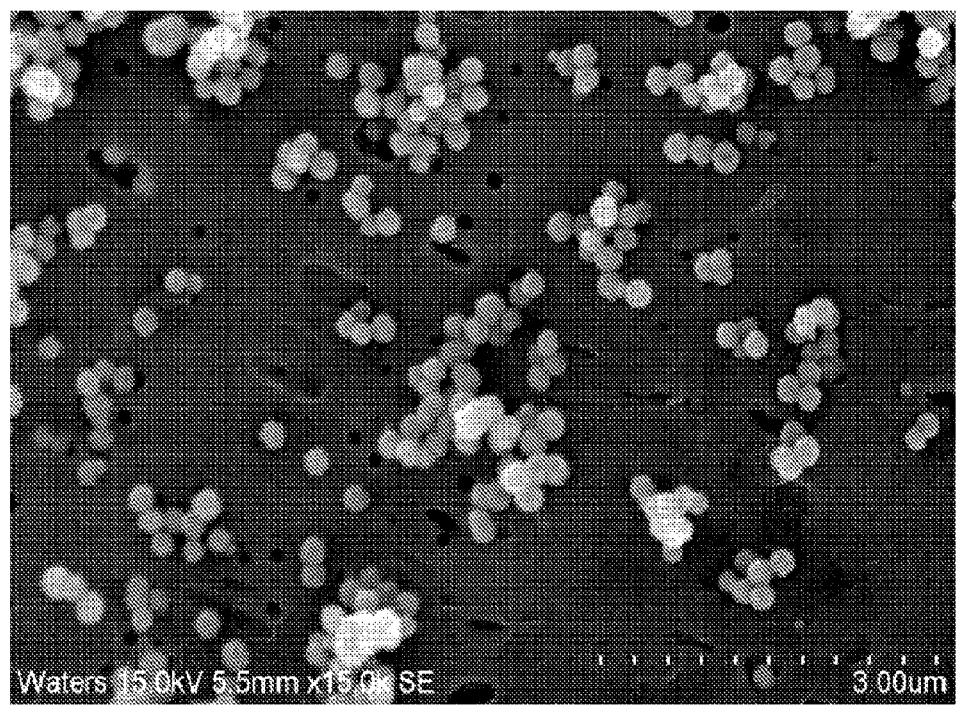
FIG. 3 is an SEM analysis of Products 11b from Example 11.

Following the report of Zhang {*Functional Materials Letters*, 2010, 3, 2, 125.} spheroidal magnetite particles were prepared through the solvothermal reaction of iron trichloride. In a 600 mL stainless steel autoclave equipped with a removable glass liner and an overhead mixer a mixture of anhydrous iron (III) chloride (Fisher Scientific), deionized water, ethylene glycol (Sigma-Aldrich, St. Louis, Mo.), polyethylene glycol (PEG 3400, Sigma-Aldrich, St. Louis, Mo.) and urea (Sigma-Aldrich, St. Louis, Mo.) were stirred at 50° C. until completely dissolved. The headspace was evacuated under vacuum and the pressure reactor was sealed before being heated (with or without stirring) to 220° C. and was held at this temperature overnight. The reactor was cooled to ambient temperature. Products were isolated in a magnetic separator, and were washed by repeated resuspension in deionized water. Specific reaction data is provided on Table 6. Percent conversion of iron trichloride to magnetite was determined by iron concentrations analysis by digestion in hydrochloric acid and complexation with potassium thiocyanate. Magnetic properties were determined by VSM. Phase confirmation was determined by XRD. Particle size and standard deviation were determined by measuring individual particles by SEM (minimum particles counted≥60). The effects of temperature, solvent, cosolvent, reagent concentrations, and stirring speed were investigated as part of the process optimization. Specific product data are listed in Table 6. As shown in FIG. 3, products obtained by this approach are spheroidal. A low level of agglomerated materials can be observed in this figure, which can be reduced through optimization and control of reaction conditions. Products 12j-121m showed the impact of increased stirring rate on this reaction. As stirring rates increase the average particle size decreases, and the particle size standard deviation decreases. XRD analysis of product 12j indicates 100% magnetite with an average domain size of 64.6 nm.

as dispersed particles or aggregates of nanoparticles. The silica layer thickness is controlled in this process through changes in reaction conditions and can produce final product sizes between 0.8-5 μm. Any agglomerated materials can be removed through grinding or classification. Products prepared by this approach are free flowing and have little to no porosity. While this approach is applicable to a variety of different feed morphologies, a significant degree of rounding occurs during this process. This rounding increases with silica layer thickness, and can decrease the observation of flat surfaces or sharp edges on these materials. This is advantageous for use as liquid chromatographic packing since sharp edges can lead to increase material fracturing and fines generation during packing of the chromatographic device.

TABLE 6

| Product | FeCl₃ (g) | Water (mL) | ethylene glycol (g) | PEG 3400 (g) | urea (g) | Stirring RPM | Particle Size (nm) | Standard Deviation (nm) | % Conversion |
|---|---|---|---|---|---|---|---|---|---|
| 12a | 2.5 | 1.62 | 133.7 | 5.0 | 4.5 | 0 | 217 | 23 | 45 |
| 12b | 2.5 | 1.62 | 134.5 | 5.1 | 4.5 | 0 | 216 | 26 | 44 |
| 12c | 7.3 | 0.00 | 404.2 | 14.6 | 13.0 | 0 | 68 | 40 | 45 |
| 12d | 7.3 | 4.75 | 403.0 | 14.6 | 13.1 | 0 | 269 | 39 | 33 |
| 12e | 7.5 | 9.7 | 401.3 | 14.6 | 13.1 | 0 | 449 | 97 | 71 |
| 12f | 7.4 | 19.5 | 405.1 | 14.2 | 13.1 | 0 | 158 | 41 | 72 |
| 12g | 7.3 | 4.75 | 407.1 | 14.6 | 13.1 | 0 | 405 | 63 | 47 |
| 12h | 5.1 | 3.24 | 134.5 | 5.0 | 4.5 | 0 | 68 | 12 | 44 |
| 12i | 14.6 | 9.46 | 403.0 | 14.6 | 13.1 | 0 | 103 | 21 | 47 |
| 12j | 103.9 | 140.0 | 5574.4 | 200.3 | 180.0 | 0 | 496 | 109 | 75 |
| 12k | 103.4 | 139.8 | 5572.3 | 200.0 | 179.9 | 34 | 207 | 21 | 78 |
| 12l | 103.5 | 140 | 5570.0 | 200.0 | 180.0 | 96 | 137 | 15 | 82 |
| 12m | 103.7 | 140.0 | 5570.2 | 198.3 | 179.7 | 250 | 55 | 12 | 69 |

Example 13

Magnetite core particles (0.1-0.5 μm) from Example 12 are reacted with tetraethoxysilane in an aqueous ammonical ethanol solution following a general process described by Example 2, U.S. Pat. No. 4,983,369, U.S. Pat. No. 4,911,903, Giesche {J. Eur. Ceram. Soc., 1994, 14, 189; J. Eur. Ceram. Soc., 1994, 14, 205} or Nozawa {Phys. Rev. E: Stat., Nonlinear, Soft Matter Phys., 2005, 72 (1), 011404}. The product of this is a free flowing powder with a thick silica shell material. The final particle sizes for these materials are controlled between 0.8-1.7 μm through changes in reaction conditions. Products are isolated by centrifugation, magnetic capture or filtration, and are washed with copious amounts of water and methanol. The product is air dried before drying under vacuum (80° C., 12 h) and is submitted for SEM characterization. Any agglomerated materials can be removed through grinding or classification. Products prepared by this approach have little to no porosity. This silica layer on magnetite is advantageous because it reduces iron dissolution and reduces undesired secondary interactions between analytes and the magnetite surface during a chromatographic separation.

Example 14

The process described in Example 13 is applied to other materials, including ones prepared in Examples 1-3, 5-11 as well as diamond, aluminum, gold, silver, iron, copper, titanium, niobium, zirconium, cobalt, carbon, silicon, silica carbide, cerium or any oxides thereof. The size of these materials is between 0.01-2.0 μm. These materials can exist Example 15

The process described in Example 13 is applied to other materials having non-spherical morphologies, including (but not limited to) spirals, capsules rings, discoidal, concave disks, spools, rings, helix, saddles, cross, cube, derby, helix, cylinders, and tubes. Examples of dumbbell, doughnut, rod, spiral, and gyroid shaped materials have been reported {Doshi, N. *PNAS,* 2009, 106, 51, 21495; Alexander, L. *Chem. Commun.,* 2008, 3507; Naik, S. *J. Phys. Chem. C* 2007, 111, 11168; Pang, X. *Microporous and Mesoporous Materials* 2005, 85, 1; Kievsky, Y. *IEEE Transactions on Nanotechnology,* 2005, 4, 5, 490; Sugimoto, T. in Monodispersed Particles, (Elsevier Science BV, Amsterdam) 2001; Ozin, G. *Adv. Mater.,* 1997, 9, 662}. Examples of ferrimagnetic and ferromagnetic iron oxide rings and capsules have been reported {Wu, W. *J. Phys. Chem. C* 2010, 114, 16092; Jia, C.-J. *J. Am. Chem. Soc.* 2008, 130, 16968}. The external diameter of these feed materials is between 0.2-5 μm. The silica layer thickness is controlled in this process through changes in reaction conditions and produces final external sizes between 0.3-5.5 μm. Any agglomerated materials can be removed through grinding or classification.

Example 16

The process described in Example 13-15 is modified to replace tetraethoxysilane with one or more of the following (but not limited to): phenyltriethoxysilane; phenyltrimethoxysilane; phenylethyltriethoxysilane; phenylethyltrimethoxysilane; ethyltriethoxysilane; ethyltrimethoxysilane; methyltriethoxysilane; methyltrimethoxysilane diethyldiethoxysilane; diethyldimethoxysilane 1,4-bis(triethoxysilyl)benzene; 1,4-bis(trimethoxysilyflbenzene; 1,3-bis(triethoxysilyl)benzene; 1,3-bis(trimethoxysilyl)benzene; 1,8-bis(triethoxysilyl)octane; 1,8-bis(trimethoxysilyfloctane; 1,2-bis(trimethoxysilyl)ethane; 1,2-bis(methyldiethoxysilyl)ethane; 1,2-bis(methyldimethoxysilyl)ethane; vinyltriethoxysilane; vinyltrimethoxysilane; mercaptopropyltrimethoxysilane; mercaptopropyltriethoxysilane; 1,2-bis(triethoxysilyl)ethene; 1,2-bis(trimethoxysilyl)ethene; 1,1-bis(triethoxysilyl)ethane; 1,1-bis(trimethoxysilyl)ethane; 1,4-bis(triethoxysilylethyl)benzene; 1,4-bis(trimethoxysilylethyl)benzene; 1,3-bis(triethoxysilylethyl)benzene; 1,3-bis(trimethoxysilylethyl)benzene; hexyltriethoxysilane; hexyltrimethoxysilane; chloropropyltriethoxysilane; chloropropyltrimethoxysilane; octadecyltrimethoxysilane; octadecyltriethoxysilane; octyltrimethoxysilane; octyltriethoxysilane; 3,3,3-trifluoropropyltrimethoxysilane; 3,3,3-trifluoropropyltriethoxysilane; 3-cyanobutyltriethoxysilane; and 3-cyanobutyltrimethoxysilane alone or in a mixture with tetraethoxysilane or tetramethoxysilane.

The silica shell thickness is controlled in this process through changes in reaction conditions and can produce final product sizes between 0.8-1.7 μm. Any agglomerated materials can be removed through grinding or classification. Products prepared by this approach are free flowing and have little to no porosity.

Example 17

Selected products in Example 13-16 are thermally treated at 700-1,200° C. for 10-72 hours to further reduce SPV. This thermal treatment is performed in air, under an inert atmosphere, or in a reducing atmosphere depending on the additives employed. When additives of diamond or magnetite are used, an inert or reducing atmosphere is used to prevent oxidation.

Materials prepared by this approach are free flowing and maintain the general morphology and size distribution of the porous feed material. SPV decreases in this process. Exemplary products of this process are nonporous. The degree of porosity reduction depends on the composition, density and porosity of the feed material. Any agglomerated materials can be removed through grinding or classification.

Example 18

Product 12j (0.2 g, 496 nm) from Examples 11 was twice washed with deionized water (500 mL) followed by twice washing with an aqueous solution of 0.7% poly(vinylpyrrolidone) (PVP, MW=360,000, 400 mL, Aldrich). Materials were isolated in a magnetic separator. The material was then dispersed in an aqueous solution of 0.7% PVP (400 mL) using sonication (10 minutes), followed by gentile agitation for 16 hours. The material was then allowed to completely settle and the volume was reduced by 28 mL. The mixture was then transferred to a round bottom flask equipped with overhead stirring and a condenser. To this mixture was added anhydrous ethanol (200 mL, JT Baker) and 28% (w/v) ammonium hydroxide (28 mL, Fisher Scientific). This mixture was stirred at ambient temperature for 20 minutes.

In a separate flask a solution of distilled tetraethoxysilane (0.388 mL, TEOS, Gelest) was diluted in anhydrous ethanol (4.00 mL). This solution was then added to the particle mixture in four equal aliquots spaced 20 minutes apart, with continued stirring. The reaction was then allowed to continue for an additional 60 minutes. Materials were isolated in a magnetic separator and were washed twice with anhydrous ethanol and twice with deionized water.

This material was resuspended in 0.7% PVP (400 mL) and the growth process described above was repeated until the final particle size was achieved. The product (18a) was isolated in a magnetic separator and was washed twice with anhydrous ethanol and five times in deionized water. A sample of this product was submitted for SEM analysis. Particle size and standard deviation was determined by measuring individual particles by SEM (minimum particles counted≥60). The final product indicated a final particle size of 1.198±0.119 μm.

Example 19

The alkoxysilanes used in Example 1 are modified to include substituted benzenes, including (but not limited to) 1,4-bis(triethoxysilyflbenzene, 1,4-bis(trimethoxysilyl)benzene, 1,3-bis(triethoxysilyflbenzene, 1,3-bis(trimethoxysilyl)benzene, 1,3,5-tris(triethoxysilyl)benzene, 1,3,5-tris(trimethoxysilyflbenzene, and bis(4-triethoxysilylphenyl)diethoxysilane. Bridging arylene materials have been shown to have improved thermal stability over traditional hybrid inorganic/organic materials {Shea, K. J. *Non-Cryst. Solids*, 1993, 160, 234}. Particles prepared by this approach are spherical and free flowing.

Example 20

The alkoxysilanes used in Example 2 are modified to include substituted benzenes, including (but not limited to) 1,4-bis(triethoxysilyflbenzene, 1,4-bis(trimethoxysilyl)benzene, 1,3-bis(triethoxysilyl)benzene, 1,3-bis(trimethoxysilyl)benzene, 1,3,5-tris(triethoxysilyl)benzene, 1,3,5-tris(trimethoxysilyflbenzene, and bis(4-triethoxysilylphenyl)diethoxysilane. Materials prepared by this approach are free flowing and have improved thermal stability over traditional hybrid inorganic/organic materials.

Example 21

Superficially porous silica layers are formed on selected hybrid core materials from Example 1, 2, 19 and 20 using a modified process described by Kirkland {US 20070189944; 20080277346}. In this approach 0.8-1.7 μm hybrid core materials are treated with a 0.1-0.5 wt % solution of one or more polyelectrolytes including (but not limited to): poly(diallydimethylammonium chloride, polyethylenimine and poly(allylamine hydrochloride) in water. The molecular weight of these polyelectrolytes can vary between 2,000 and 500,000. These materials are washed with water using repeated centrifugation, before redispersing in water. A 2-10 wt % solution of silica sols (8-85 nm) is then added with mixing. These materials are washed with water using repeated centrifugation. This process of polyelectrolyte treatment followed by washing, silica sol treatment, and washing can be repeated until a final particle size is achieved. Final drying of product is performed in a vacuum oven or lyophilizer at ambient to elevated temperatures.

Products prepared in this manner have both silica sols and polyelectrolyte on the core material. In order to remove the polyelectrolyte thermal treatment at temperatures greater than 500° C. (10-20 hours) is employed. To further strengthen these materials, a second thermal treatment at 825-1000° C. for 10-20 hours is employed. These thermal treatments are performed in air, under an inert atmosphere, or in a reducing atmosphere depending on the additives employed. When additives of diamond or magnetite are used, an inert or reducing atmosphere is used to prevent oxidation.

While materials prepared by this process are free flowing spherical superficially porous materials with rough surface features, the thermal treatments steps remove all carbon content from these materials. Expected improvement in chemical stability of a hybrid core in chromatographic applications is not realized by this approach. Similar performance with commercially available silica superficially porous materials is achieved by this approach.

Example 22

The polyelectrolyte of Example 21 is modified to include the use of chemically degradable polymers, including (but not limited to) polyethylene glycol, polypropylene glycol, polymethacrylate, polymethylmethacrylate, poly(acrylic acid), and polylactic acid based polymers containing pendant primary, secondary, or tertiary amino groups. For example, polyethylene glycol (PEG) based polyether amines are described in U.S. Pat. No. 7,101,52, and others are commercially available as Jeffamine polyetheramines (Huntsman Corporation).

Products prepared in this manner have both silica sols and polymer on the core material. In order to remove the polymer, different approaches are employed that do not require thermal treatment at or above 500° C. Polymethylmethacrylate networks can be decomposed using β-ray irradiation. Acrylate and methacrylate polymer backbones having thermally cleavable tertiary ester linkages can decompose between 180-200° C. {Ogino, K. *Chem. Mater,* 1998, 10, 3833}. Polyethylene glycol groups can be removed by oxidative degradation {Andreozzi, R. Water Research, 1996, 30, 12, 2955; Suzuki, J. J. Applied Polymer Science, 1976, 20, 1, 93} and microwave assisted template removal using nitric acid and hydrogen peroxide {Tian, B. *Chem. Commun.,* 2002, 1186}. A listing of other degradable polymer backbones and degradation mechanism is reported in Degradable Polymers: Principles and Applications {Editors G. Scott and D. Gilead, D., Chapman & Hall (Kluwer) 1995}.

Materials prepared by this process are free flowing spherical superficially porous particles with rough surface features, Expected improvements in chemical stability of a hybrid core in chromatographic applications are realized by this approach. Improvements in chemical stability of these superficially porous particles over commercially available silica superficially porous particles are achieved by this approach.

After polymer degradation, there is a substantial reduction of polymer containing primary, secondary or tertiary amino groups remain within these superficially porous materials. Further processing steps can be performed to further reduce and remove this polymer content. Any agglomerated materials or fine materials can be removed through classification.

These particles still contain carbon content of the core hybrid particles. To improve pore diameter and further strengthen these superficially porous materials, hydrothermal treatment method of Jiang {U.S. Pat. Nos. 6,686,035; 7,223,473; 7,919,177} and Wyndham {WO 2008/103423} are employed. Alternatively a surrounding material method described by Wyndham {WO 2010/141426} can be used to strengthen these superficially porous materials. The addition of a surrounding material decreases the porosity of these materials. The surrounding material method is of particular importance when a hybrid inorganic/organic surrounding material is used on the silica-sol superficially porous layer. Such materials have improved chemical stability over commercially available silica superficially porous particles. When the surrounding material contains nanoparticles, including (but not limited to) nanodiamonds—as noted in Examples 12 and 13 of Wyndham {WO 2010/141426}—improvements in thermal conductivity can be achieved.

Example 23

The core material of Example 21 is modified to include the precursor or product materials from Examples 5-18. Included in this are spherical, irregular, rod-shaped and toroid-shaped materials. Included in this are 0.5-1.5 µm cores that are diamond, magnetite, coated diamond, or coated magnetite.

Example 24

The core material of Example 22 is modified to include the precursor or product materials from Examples 5-18. Included in this are spherical, irregular, rod-shaped and toroid-shaped materials. Included in this are 0.5-1.9 µm cores that are diamond, magnetite, coated diamond, or coated magnetite.

Example 25

The silica sol used in Examples 21-24 is modified to include the use of hybrid sols. Hybrid sols are prepared by the condensation of hybrid inorganic/organic alkoxysilanes in the presence or absence of a tetraethoxysilane or tetramethoxysilane. Similar sol sizes can be achieved in this approach (8-85 nm) by this approach. Alternatively a hybrid layer can be formed by surface modifying preformed silica sols (8-85 nm). The use of a hybrid core material and chemically degradable polymers containing pendant primary, secondary, or tertiary amino groups described in Example 22, allows for the formation of hybrid superficially porous materials. Alternatively 0.8-1.9 µm nonporous silica cores are used. These materials contain carbon content of the core and porous layers. To improve pore diameter and further strengthen these superficially porous materials, hydrothermal treatment method of Jiang {U.S. Pat. No. 6,686,035; U.S. Pat. No. 7,223,473; U.S. Pat. No. 7,919, 177} and Wyndham {WO 2008/103423} are employed. Alternatively a surrounding material method described by Wyndham {WO 2010/141426} can be used to strengthen these superficially porous materials. No high temperature thermal treatment (>600° C.) is used in this approach.

Example 26

The process of Examples 21-25 is modified to replace a part of all of sols used with similar size sols, including (but not limited to) diamonds, aluminum, gold, silver, iron, copper, titanium, niobium, zirconium, cobalt, carbon, silicon, silica carbide, cerium or any oxides thereof.

Example 27

The process of Examples 21-26 is modified to include incorporation of one or more nanoparticles within the superficially porous layer, including (but not limited to) nanoparticles listed in Example 10.

Example 28

Nonporous silica particles (1.26 µm, 10.4 g), that were previously thermally treated at 600° C. (10 h) and rehydroxylated using 10% nitric acid (Fisher scientific) were dispersed in 80 mL of solvent (water: anhydrous ethanol 2:1 v/v) by sonication for 10 minutes. Separately, octadecyltrimethylammonium bromide (0.43 g, $C_{18}$TAB, Sigma-Aldrich) was dissolved in 80 mL of solvent (water: anhydrous ethanol 2:1 v/v). The $C_{18}$TAB solution was then added into the particle solution and was sonicated for 10 minutes. This solution was labeled solution A. In a separate beaker of pluronic P123 (8.44 g, Sigma-Aldrich) was dissolved in 240 mL of solvent (water: anhydrous ethanol 2:1 v/v) and was labeled solution B. Solution B (240 mL) was added into solution A (160 mL) and was sonicated for 20 minutes. The mixture was then transferred into a 1 L round bottom flask and stirred at 600 rpm Ammonium hydroxide solution (30%, 12 mL, J. T. Baker) was added into the flask and allowed to continue stirring for 5 minutes. 1,2-bis(triethoxysilyl)ethane (2.3 mL, BTEE, Gelest) was then added over a minute. The reaction was allowed to continue with stirring for an hour. The final concentrations reagents used were $C_{18}$TAB (2.6-10.5 mM), Pluronic P123 (3.5-13.8 mM), and BTEE (0.015-0.030 M).

During the washing step, the sample was diluted four times the sample volume with deionized water followed by centrifugation (Form a Scientific Model 5681, 2,500 rpm, 6 min). The wash sequence was repeated two times using sonication to redisperse particles.

The growth process was repeated three times to yield four hybrid layers on the nonporous silica core. With each layer the volume of solution A (5-7 vol %), solution B (6 vol %) and ammonium hydroxide (3-10 vol %) were increased to compensate for the increase in solids volume after each growth layer while maintaining the concentration of the reagents constant. Amounts of $C_{18}$TAB, BTEE and ethanol/water used are shown on Table 7. Products were isolated by centrifugation and washed consecutively with copious amounts of water and methanol (HPLC grade, J. T. Baker, Phillipsburgh, N.J.). The particles were then air dried and vacuum dried at 80° C. under vacuum for 16 hours. Products were submitted for SEM analysis.

Reactions in this process used <3 mM $C_{18}$TAB. Very little hybrid layer growth was observed in this approach. In contrast increased aggregation and elevated amount fine particle (<1 μm) were observed.

TABLE 7

| Product | Concentration $C_{18}$TAB (mM) | Ratio ETOH:$H_2$O (v/v) | Concentration BTEE (M) | SEM Comments |
| --- | --- | --- | --- | --- |
| 28a | 2.6 | 1:2 | 0.03 | Small bumps on the particle surface Particle were aggregated |
| 28b | 2.6 | 1:2 | 0.02 | Well dispersed particles Particles did not appear to grow after the second growth |
| 28c | 2.6 | 1:2 | 0.03 | Small bumps on particle surface |
| 28d | 2.6 | 1:2 | 0.02 | Particles were aggregated No fine particles observed |
| 28e | 2.6 | 1:2 | 0.03 | Small bumps on the particle surface |

TABLE 7-continued

| Product | Concentration $C_{18}$TAB (mM) | Ratio ETOH:$H_2$O (v/v) | Concentration BTEE (M) | SEM Comments |
| --- | --- | --- | --- | --- |
| 28f | 2.6 | 1:1 | 0.02 | Particles did not appear to grow after the second growth Well dispersed particles No fine particles observed |

Example 29

Nonporous silica particles (10.4 g, 1.26 μm), that were previously thermally treated at 600° C. (10 h) and rehydroxylated using 10% nitric acid (Fisher scientific), were dispersed in 100 mL of solvent (water: anhydrous ethanol 2:1 v/v) by sonicating for 10 minutes. Separately, octadecyltrimethylammonium bromide (2.46 g, $C_{18}$TAB, Sigma-Aldrich) was dissolved in 100 mL of solvent (water: anhydrous ethanol 2:1 v/v). The $C_{18}$TAB solution was then added into the particle solution and was sonicated for 10 minutes. This solution was labeled solution A. In a separate beaker of Pluronic P123 (39.0 g, Sigma-Aldrich) was dissolved in 400 mL of solvent (water: anhydrous ethanol 2:1 v/v) and was labeled solution B. Solution B (400 mL) was added into solution A (200 mL) and allowed to continue sonicate for 20 minutes. The mixture was then transferred into a 1 L round bottom flask and stirred at 750 rpm Ammonium hydroxide solution (30%, 24 mL, J. T. Baker) was added into the flask and allowed to continue stirring for 5 minutes. 1,2-bis (triethoxysilyl)ethane (6 mL, BTEE, Gelest) was first diluted with anhydrous ethanol (dilution factor=3) and then added to the flask with a peristaltic pump (ISMATEC, ISM596D equipped with 1/32 inch diameter PTFE tubing from Cole-Palmer) at a constant flow rate (50 μL/min). The reaction was allowed to continue stirring until all BTEE was added, allowed to stir for an extra hour before washing. The final concentrations reagents used were $C_{18}$TAB (2.6-17.27 mM), Pluronic P123 (3.5-22.16 mM), and BTEE (0.020-0.030 M).

The wash steps were performed as detailed in Example 28. The growth process was done once to grow a hybrid layer on the nonporous silica core. Reaction details are included on Table 8. Products were isolated by centrifugation and washed consecutively with copious amounts of water and methanol (HPLC grade, J. T. Baker, Phillipsburgh, N.J.). The particles were then air dried and at 80° C. under vacuum for 16 hours. Products were submitted for SEM analysis. Particle size was determined by measuring individual particles by SEM. As shown in Table 8, and increase in $C_{18}$TAB concentration (2.6-13.6 mM) results in an increase in shell thickness (0.04-0.16 μm) by this approach. Similar to Example 28, reactions using less than 3 mM $C_{18}$TAB had increased aggregation and elevated amount fine particle (<1 μm) were observed. Concentrations of $C_{18}$TAB between 8-17 mM advantageoulsy resulted in well formed products.

TABLE 8

| Product | Concentration C$_{18}$TAB (mM) | Concentration BTEE (M) | Product Particle Size (μm) | Shell Thickness (μm) | SEM Comments |
|---|---|---|---|---|---|
| 29a | 2.6 | 0.02 | 1.33 | 0.04 | Particle with a smooth surface Very little growth Particles stuck together |
| 29b | 5.30 | 0.03 | 1.45 | 0.10 | Well dispersed particles No fine particles observed Smooth particle surface |
| 29c | 17.27 | 0.03 | 1.57 | 0.16 | Well dispersed particles No fine particles observed Smooth particle surface |
| 29d | 10.50 | 0.02 | 1.55 | 0.15 | Well dispersed particles No fine particles observed Smooth particle surface |
| 29e | 13.63 | 0.02 | 1.51 | 0.13 | Well dispersed particles No fine particles observed Smooth particle surface |

Example 30

An initial hybrid growth layer is formed on rehydroxylated nonporous silica particles (0.8-1.7 μm, 10.4 g) using a modified process for Product 29b. These core particles can have 90/10 ratios<1.20 or 90/10 ratios between 1.2-1.55. In this reaction 1,2-bis(triethoxysilyl)ethane (6 mL, BTEE, Gelest) is first diluted with anhydrous ethanol (dilution factor=3) and is added to the flask with a peristaltic pump (ISMATEC, ISM596D equipped with ⅟₃₂ inch diameter PTFE tubing from Cole-Palmer) at 5-100 μL/min. The particle size is monitored during this growth process. The reaction is allowed to continue stirring until the target particle size is reached or all BTEE is added. The mixture is allowed to stir for an extra hour before the wash steps, which are performed as detailed in Example 28.

This process is repeated for products requiring one or more additional hybrid growth layers. Increases in C$_{18}$TAB, Pluronic P123, ethanol, and ammonium hydroxide are made to maintain a low concentration of solids. C$_{18}$-TAB concentration is maintained between 8-11 mM, and the mol ratio of C$_{18}$-TAB/Pluronic P123 was maintained at 1.3:1. Optimization experiments showed that lower ratios of these two surfactants leads to increased aggregation. BTEE is diluted with anhydrous ethanol (dilution factor≥3) and is added to the reaction at a flow rate of 5-100 μL/min. The particle size of these materials is monitored during this growth process. The reaction is allowed to continue stirring until the target particle size is reached or all BTEE is added. The mixture is allowed to stir for an extra hour before the wash steps, which are performed as detailed in Example 28.

Products are isolated by centrifugation and are washed consecutively with copious amounts of water and methanol (HPLC grade, J. T. Baker, Phillipsburgh, N.J.). The products are then air dried and at 80° C. under vacuum for 16 hours. Products are submitted for SEM, and FIB/SEM analysis. Particle size is determined by measuring individual particles by SEM. As listed in Table 9, final products have an average particle size of 1.2-2.7 μm, with shell thickness varying from 0.03-0.60 μm. Products prepared by this approach are free flowing, spherical and have a smooth surface. Products 30a, 30b, and 30 g are prepared in one layer. Products 30c-f, 30-h-l are prepared in two to four growth layers. Products 30m-p are prepared in 5-15 layers. This approach allows for superficially porous materials with different physical properties to be prepared. For example Products 30d and 30 g (1.30 μm); Products 30e and 30 h (1.50 μm); Products 30f, 30i and 30 k (1.70 μm); and Products 30m and 30n (2.30 μm) have similar final particle size, but vary in shell thickness and the ratio of shell thickness to radius of the core. The ratio of shell thickness to core radius can be modified over a large range by this approach (0.04-0.71).

TABLE 9

| Product | Initial Core Size (μm) | Product Particle Size (μm) | Shell Thickness (μm) | Ratio Shell Thickness to Radius Core |
|---|---|---|---|---|
| 30a | 0.80 | 1.00 | 0.10 | 0.25 |
| 30b | 0.80 | 1.10 | 0.15 | 0.38 |
| 30c | 0.80 | 1.20 | 0.20 | 0.50 |
| 30d | 1.00 | 1.30 | 0.15 | 0.30 |
| 30e | 1.00 | 1.50 | 0.25 | 0.50 |
| 30f | 1.00 | 1.70 | 0.35 | 0.70 |
| 30g | 1.25 | 1.30 | 0.03 | 0.04 |
| 30h | 1.25 | 1.50 | 0.13 | 0.20 |
| 30i | 1.25 | 1.70 | 0.23 | 0.36 |
| 30j | 1.25 | 1.90 | 0.33 | 0.52 |
| 30k | 1.50 | 1.70 | 0.10 | 0.13 |
| 30l | 1.50 | 2.00 | 0.25 | 0.33 |
| 30m | 1.50 | 2.30 | 0.40 | 0.53 |
| 30n | 1.70 | 2.30 | 0.30 | 0.35 |
| 30o | 1.70 | 2.60 | 0.45 | 0.53 |
| 30p | 1.70 | 2.90 | 0.60 | 0.71 |

Example 31

The process of Examples 30 is modified to have a superficially porous layer formed in a single continued growth layer using rehydroxylated nonporous silica particles (0.8-2.5 μm). These core particles can have 90/10 ratios<1.20 or 90/10 ratios between 1.2-1.55. In this reaction 1,2-bis(triethoxysilyl)ethane (BTEE, Gelest), diluted with anhydrous ethanol (dilution factor=3), is added with a peristaltic pump (ISMATEC, ISM596D equipped with ⅟₃₂ inch diameter PTFE tubing from Cole-Palmer) at 5-100 μL/min A second solution containing octadecyltrimethylammonium bromide (C$_{18}$TAB, Sigma-Aldrich), water, ethanol, Pluronic P123 (Sigma-Aldrich) and ammonium hydroxide solution (30%, 24 mL, J. T. Baker) is added using a separate peristaltic pump at a constant rate in order to maintain concentrations of C$_{18}$TAB, water, ethanol, Pluronic P123, ammonium hydroxide within a range between the rate required to maintain a uniform ratio of particle surface area (m$^2$) to reaction volume, to the rate required to maintain a uniform ratio of particle volume (m$^3$) to reaction volume. The particle size of these materials is monitored during this growth process. The reaction is allowed to continue stirring until the target particle size is reached or all BTEE is added. The mixture is allowed to stir for an extra hour before the wash steps, which are performed as detailed in Example 28.

Final products have an average particle size of 1.0-2.9 μm, with shell thickness varying from 0.03-0.60 μm. Products are submitted for SEM, and FIB/SEM analysis. Particle size is determined by measuring individual particles by SEM. Products prepared by this approach are free flowing, spherical and have a smooth surface. Analysis of particle by FIB/SEM shows evidence of a single step process, having no observable interlayer contrast.

Example 32

1.26 μm nonporous silica particles (10.4 g) that were previously thermally treated at 600° C. (10 h) and rehydroxylated using 10% nitric acid (Fisher scientific) were used in this process.

A silica layer was formed by the following process. Particles were dispersed in 80 mL of solvent (water: anhydrous ethanol 2:1 v/v) by sonicating for 10 minutes. Separately, octadecyltrimethylammonium bromide (0.46 g, $C_{18}TAB$, Sigma-Aldrich) was dissolved in 80 mL of solvent (water: anhydrous ethanol 2:1 v/v). The $C_{18}TAB$ solution was added into the particle solution and the mixture was sonicated for 10 minutes. This solution was labeled solution A. In a separate beaker of Pluronic P123 (8.44 g, Sigma-Aldrich) was dissolved in 240 mL of solvent (water: anhydrous ethanol 2:1 v/v) and was labeled solution B. Solution B (240 mL) was added into solution A (160 mL) and was sonicated for 20 minutes. The mixture was then transferred into a 1 L round bottom flask and stirred at 750 rpm Ammonium hydroxide solution (30%, 12 mL, J. T. Baker) was added into the flask and allowed to continue stirring for 5 minutes. Tetraethoxysilane (4.6 mL, TEOS, Sigma-Aldrich) was added in two steps. First 2.3 mL of TEOS was added and the reaction was continued for 30 minutes before an additional 2.3 mL of TEOS was added and the reaction allowed continuing for an hour. The wash steps were performed as detailed in Example 28.

A hybrid layer was formed on these particles using the following process. Particles were redispersed in 100 mL solvent (water: anhydrous ethanol 2:1 v/v) by sonication. Separately, octadecyltrimethylammonium bromide (3.0 g, $C_{18}TAB$, Sigma-Aldrich) was dissolved in 100 mL of solvent (water: anhydrous ethanol 2:1 v/v). The $C_{18}TAB$ solution was then added into the particle solution and was sonicated for 10 minutes. This solution was labeled solution A. In a separate beaker of Pluronic P123 (58 g, Sigma-Aldrich) was dissolved in 400 mL of solvent (water: anhydrous ethanol 2:1 v/v) and was labeled solution B. Solution B (400 mL) was added into solution A (200 mL) and allowed to continue to sonicate for 20 minutes. The mixture was then transferred into a 1 L round bottom flask and was stirred at 750 rpm. Ammonium hydroxide solution (30%, 24 mL, J. T. Baker) was added into the flask and was stirred for 5 minutes. In this growth step 1,2-bis(triethoxysilyl)ethane (6 mL, BTEE, Gelest) was first diluted with anhydrous ethanol (dilution factor=3) and was added to the flask with a peristaltic pump (ISMATEC, ISM596D equipped with 1/32 inch diameter PTFE tubing from Cole-Palmer) at 50 μL/min Once all the BTEE was added the reaction was allowed to continue for an hour. The product was isolated and was washed as detailed in Example 28.

A silica layer was then grown on the hybrid layer using the silica layer process described above, but the volume of the solution was increased to compensate for the increase in solids volume while maintaining a constant concentration of the reagents. A hybrid layer was formed on this silica layer using the hybrid layer process described above, but the volume of the solution was increased to compensate for the increase in solids volume while maintaining a constant concentration of the reagents.

Reaction details are included on Table 10. Products were isolated by centrifugation and washed consecutively with copious amounts of water and methanol (HPLC grade, J. T. Baker, Phillipsburgh, N.J.). The particles were then air dried and at 80° C. under vacuum for 16 hours. Products were submitted for SEM analysis. Particle size was determined by measuring individual particles by SEM. The advantageous use of increased amounts of $C_{18}TAB$ and Pluronic P123 for acceptable hybrid layer growth (32L2 and 32L4) is evident in this data. When $C_{18}TAB$ concentrations were <5 mM, little to no hybrid layer growth is observed.

This process was repeated separately to prepare two additional products. The first (product 32a) had a silica followed by hybrid layer. The second (product 32b) had a silica followed by two consecutive hybrid layers, resulting in an increased hybrid content near the exterior surface.

TABLE 10

| Product | Layer Type | TEOS (mL) | BTEE (mL) | $C_{18}TAB$ (g) | Sol. (mL) | P123 (g) | Sol. B (mL) | NH$_4$OH (mL) | particle size (μm) |
|---|---|---|---|---|---|---|---|---|---|
| 32L1 | Silica | 4.6 | — | 0.5 | 160 | 8.4 | 240 | 15 | 1.32 |
| 32L2 | Hybrid | — | 6.0 | 3.0 | 200 | 58 | 400 | 24 | 1.54 |
| 32L3 | Silica | 4.6 | — | 0.6 | 200 | 11 | 400 | 15 | 1.64 |
| 32L4 | Hybrid | — | 8.1 | 5.0 | 400 | 92 | 600 | 30 | 1.76 |

Example 33

The process of Example 28-32 is modified to use tetraethoxysilane in the first layer followed by 1,2-bis(triethoxysilyl)ethane or a mixture of tetraethoxysilane and 1,2-bis(triethoxysilyl)ethane in the following layer. This solution varies from 0-99 vol % tetraethoxysilane. This sequence is repeated (2-15 times) to create a distinct silica and hybrid layers. By changing reaction conditions the thickness of the silica porous layer and the hybrid porous layers can be modified between 10-1000 nm. The composition of this 1,2-bis(triethoxysilyl)ethane and tetraethoxysilane mixture can vary for each layer, creating an enriched hybrid content at the external porous surface. Alternatively the composition of this 1,2-bis(triethoxysilyl)ethane and tetraethoxysilane mixture can vary for each layer, creating enriched silica content at the external porous surface. For the general process of Examples 29-31, the composition of a mixed tetraethoxysilane and 1,2-bis(triethoxysilyl)ethane solution can be modified by changing the feed alkoxysilane solution over the course of these reactions.

Example 34

The process of Example 28-32 is modified to use 1,2-bis(triethoxysilyl)ethane in the first layer followed by 1,2-bis (triethoxysilyl)ethane or a mixture of tetraethoxysilane and 1,2-bis(triethoxysilyl)ethane in the following layer. This solution varies from 1-100 vol % tetraethoxysilane. This sequence is repeated (2-15 times) to create a distinct hybrid and silica layers. By changing reaction conditions the thickness of the hybrid porous layers can be modified between 10-1000 nm. The composition of this 1,2-bis(triethoxysilyl)ethane and tetraethoxysilane mixture can vary for each layer, creating an enriched hybrid content at the external porous surface. Alternatively the composition of this 1,2-bis(triethoxysilyl)ethane and tetraethoxysilane mixture can vary for each layer, creating enriched silica content at the external porous surface. For the general process of Examples 29-31, the composition of a mixed tetraethoxysilane and 1,2-bis(triethoxysilyl)ethane solution can be modified by changing the feed alkoxysilane solution over the course of these reactions.

Example 35

The core material of Example 28-34 is modified to include the precursor or product materials from Examples 1-3, or 5-20. Included in this are spherical, irregular, rod-shaped and toroid-shaped materials. Included in this are 0.5-1.9 µm cores that are hybrid, diamond, magnetite, coated diamond, or coated magnetite.

Example 36

The process of Examples 28-35 is modified to replace a part of all of the alkoxysilane used with one or more of the following silanes (but not limited to) listed in Example 16 and 19, Jiang {U.S. Pat. Nos. 6,686,035; 7,223,473; 7,919,177}, Wyndham {WO 2008/103423}, or a POS used in Example 4.

Example 37

The process of Examples 28-36 is modified to replace a part of all of the alkoxysilane used with one or more of the following metal oxide precursors (but not limited to): the oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of titanium, zirconium, iron, copper, niobium, cobalt, cerium or aluminum. Advantageously, the metal oxide precursors are methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

Example 38

The process of Examples 28-37 is modified to include incorporation of one or more nanoparticles within the superficially porous layer, including (but not limited to) nanoparticles listed in Example 10.

Example 39

The process of Examples 28-38 is modified to add or replace part or all of the ionic and or non-ionic surfactants with one or more polyectrolyte or polymers detailed in Examples 21 or 22.

Example 40

The surfactants and or polymers used in select products from Examples 28-39 are removed by extraction in a 1-2 M solution of hydrochloric acid in methanol, ethanol or acetone, at elevated temperatures (30-90° C.) for 1-20 hours. Products are isolated on isolated on 0.5 µm filtration paper and washed consecutively with copious amounts of water and methanol (HPLC grade, J. T. Baker, Phillipsburgh, N.J.). This process can be repeated 1-3 times to further remove surfactants and or polymers from these particles. Products are dried at 80° C. under vacuum for 16 hours and are submitted for carbon, CP-MAS NMR, SEM, and nitrogen sorption analysis. For products that contain hybrid content in the shell or porous layer, carbon content is present in the product. Identification of the hybrid product species is made using $^{13}$C and $^{29}$Si CP-MAS NMR spectroscopy. The specific surface areas (SSA) and specific pore volumes (SPV) of these materials are increased with respect to the core materials used in these reactions. Products prepared by this approach are free flowing. Any agglomerated materials can be removed through grinding or classification.

Example 41

The surfactants and or polymers used in select products from Examples 28-40 are removed by ozonolysis in water at low to moderate temperatures (0-30° C.) for 1-20 hours. Products are isolated on isolated on 0.5 µm filtration paper and washed consecutively with copious amounts of water and methanol (HPLC grade, J. T. Baker, Phillipsburgh, N.J.). This process can be repeated 1-3 times to further remove surfactants and or polymers from these particles. This process can be combined with an acid extraction approach detailed in Example 40. Products are dried at 80° C. under vacuum for 16 hours and are submitted for carbon, CP-MAS NMR, SEM, and nitrogen sorption analysis. For products that contain hybrid content in the shell or porous layer, carbon content is present in the product. Identification of the hybrid product species is made using $^{13}$C and $^{29}$Si CP-MAS NMR spectroscopy. The specific surface areas (SSA) and specific pore volumes (SPV) of these materials are increased with respect to the core materials used in these reactions. Products prepared by this approach are free flowing. Any agglomerated materials can be removed through grinding or classification.

Example 42

The surfactants and or polymers used in select products from Examples 28-41 are removed by 500° C. (10-20 hours) is employed. To further strengthen these superficially porous materials, increased thermal treatment at 825-1,000° C. in air for 10-20 hours is employed. Products prepared by this approach are free flowing. Any agglomerated materials can be removed through grinding or classification.

The specific surface areas (SSA) and specific pore volumes (SPV) of these materials are increased with respect to the core materials used in these reactions. While materials prepared by this process are free flowing superficially porous particles, the thermal treatments steps remove all carbon content from these materials. Expected improvement in chemical stability of a hybrid superficially porous material in chromatographic applications is not realized by this approach.

Example 43

When the superficially porous materials of Examples 28-41 contain arylene-bridged hybrids, the surfactants and or polymers used in select products from Examples 28-41 are removed by 390-490° C. (10-20 hours) in air or under a nitrogen atmosphere. Products are submitted for carbon, CP-MAS NMR, SEM, and nitrogen sorption analysis. For products that contain hybrid content in the shell or porous layer, carbon content is present in the product. Identification of the hybrid product species is made using $^{13}C$ and $^{29}Si$ CP-MAS NMR spectroscopy. The specific surface areas (SSA) and specific pore volumes (SPV) of these materials are increased with respect to the core materials used in these reactions. Products prepared by this approach are free flowing. Any agglomerated materials can be removed through grinding or classification.

Example 44

To improve pore diameter and further strengthen select materials from Examples 28-43, hydrothermal treatment methods of Jiang {U.S. Pat. Nos. 6,686,035; 7,223,473; 7,919,177} or Wyndham {WO 2008/103423} are employed. Alternatively, when a material from Examples 28-39 are used that have a surfactant or polymer additive, hydrothermal treatments are used to improve pore diameter. Alternatively a surrounding material method described by Wyndham {WO 2010/141426} can be used to strengthen these superficially porous materials. The surrounding material method is of particular importance when a hybrid inorganic/organic surrounding material is used on the silica superficially porous layer. In this instance, the hybrid inorganic/organic surrounding material reduces the porosity. Such materials have improved chemical stability over commercially available silica superficially porous particles. When the surrounding material contains nanoparticles, including (but not limited to) nanodiamonds—as noted in Examples 12 and 13 of Wyndham {WO 2010/141426}—improvements in thermal conductivity can be achieved. Products, after surfactant or polymer removal, have pore diameters between 60 Å and 350 Å.

Example 45

A series of superficially porous materials were prepared following a multi-step process: (1) Stoller seeds preparation using tetraethoxysilane (TEOS); (2) core growth using TEOS; (3) hybrid layer growth using a mixture of TEOS and octadecyltrimethoxysilane ($C_{18}$TMOS); (4) classification to remove fines; (5) calcination to introduce porosity; (6) pore processing steps; (7) re-calcination to improve mechanical strength; (8) rehydroxylation; and (9) surface bonding.

The seeds were prepared by a modified Stoller process. Uniform sized silica can be prepared (0.1-2.0 μm) depending on the concentration of TEOS, composition of the hydrolysis solution, temperatures, and mixing. In current studies, TEOS addition rate was fixed at 0.044 g/mL and hydrolysis solution consisted of ethanol, water and 30% ammonium hydroxide solution at volume ratio of 80/14/7, respectively. Increased mixing levels during seed formation resulted in higher content of aggregates. Optimal mixing conditions were determined to be initial vigorous shaking for 15 seconds before maintaining the reaction unstirred. This approach resulted in less than 5 wt % aggregates.

The cores were further grown with concurrent additions of TEOS and hydrolysis solution (ethanol, waters, and ammonium hydroxide). Additional hydrolysis solution was added to prevent reseeding and aggregation/agglomeration events. Solvent conditions were optimized by exploring ternary phase diagrams to ensure the TEOS was miscible in the aqueous ethanol mixture. Typical addition rates of TEOS and the hydrolysis solution were set at 0.125 mL/min and 1 mL/min, respectively, and the reaction temperature was 50° C. Core size was verified using light scattering, Coulter Counter, or SEM.

Upon achieving the desired core size, the TEOS reservoir was switched to a mixture of $C_{18}$TMOS and TEOS to grow a hybrid layer on the core particles. Molar ratios of $C_{18}$TMOS/TEOS varied from ¼ to ⅑. Advantageous molar ratios are from ¼ to ⅙. Due to differing solubility of $C_{18}$TMOS and TEOS the relative addition rates of silanes and hydrolysis solution were adjusted to ensure miscibility. Conditions were based on the ternary phase diagrams of $C_{18}$TMOS/TEOS mixtures, water and ethanol. The process was monitored by light scattering, Coulter Counter, and SEM. Table 11 details experiments performed in ethanol/water/30% ammonium hydroxide (80/14/7 v/v/v). Table 12 details experiments with varied hydrolysis solutions.

TABLE 11

| Product | Target Core Size (μm) | Target Coating Thickness (μm) | Temp (° C.) | Hydrolysis Solution (mL/min) | Molar Ratio $C_{18}$TMOS/TEOS | Silane (mL/min) |
|---|---|---|---|---|---|---|
| 45a | 0.8 | 0.20 | 50 | 1.00 | 1/9 | 0.123 |
| 45b | 1.0 | 0.35 | 50 | 1.00 | 1/9 | 0.119 |
| 45c | 1.0 | 0.35 | 60 | 1.00 | 1/9 | 0.116 |
| 45d | 1.0 | 0.35 | 40 | 1.00 | 1/9 | 0.125 |
| 45e | 1.0 | 0.35 | 21 | 1.00 | 1/9 | 0.143 |
| 45f | 1.0 | 0.35 | 50 | 1.00 | 1/6 | 0.126 |
| 45g | 1.0 | 0.35 | 60 | 1.00 | 1/6 | 0.132 |
| 45h | 1.0 | 0.35 | 50 | 1.26 | 1/6 | 0.150 |
| 45i | 1.0 | 0.35 | 50 | 1.00 | 1/4 | 0.135 |
| 45j | 1.0 | 0.35 | 60 | 1.00 | 1/4 | 0.135 |
| 45k | 1.0 | 0.35 | 50 | 2.00 | 1/4 | 0.132 |
| 45l | 1.0 | 0.35 | 60 | 2.00 | 1/4 | 0.140 |
| 45m | 1.0 | 0.35 | 40 | 2.00 | 1/4 | 0.124 |

TABLE 12

| Product | Temp (° C.) | Hydrolysis Solution Volume Ratio Ethanol/Water/$NH_4OH$ | Hydrolysis Solution (mL/min) | Molar Ratio $C_{18}$TMOS/TEOS | Silane (mL/min) |
|---|---|---|---|---|---|
| 45n | 21 | 74/10/3 | 1.00 | 1/9 | 0.125 |
| 45o | 50 | 74/10/3 | 1.00 | 1/9 | 0.125 |
| 45p | 50 | 240/52/31 | 1.00 | 1/9 | 0.125 |
| 45q | 50 | 240/52/11 | 1.00 | 1/9 | 0.125 |
| 45r | 50 | 240/32/31 | 1.00 | 1/9 | 0.125 |
| 45s | 50 | 240/32/11 | 1.00 | 1/9 | 0.125 |

Classification was performed, if needed, to remove fines, aggregates and/or agglomerates. A variety of classification techniques (e.g., sedimentation, elutriation, and centrifugation) can be used to for this separation.

Materials were calcined at 500° C. (1° C./min and held at temperature for 12 hours) in air to remove the organic groups and introduce porosity. Products prepared using a ⅑ molar ratio of $C_{18}$TMOS/TEOS had a SSA between 298-337 $m^2/g$; SPV between 0.20-0.23 $cm^3/g$; and an APD between 25-27 Å. Products prepared using a ¼ molar ratio of $C_{18}$TMOS/TEOS had a SSA between 505-508 $m^2/g$; SPV between 0.38-0.41 $cm^3/g$; and an APD between 27-28 Å. These APD are too small to be useful in most HPLC and UPLC applications.

In order to enlarge the pore diameter, a variety of pore processing steps were explored, detailed in Table 13. Process B allowed for the largest increase in pore diameter (APD=126-272 Å) when the temperature was between 150-200° C. At temperatures between 60-100° C. smaller changes pore diameters were achieved (APD=27-47 Å). Process A allowed for a noticeably lower increases in pore diameter (APD=37-94 Å at 100-150° C.). Process C allowed for increases in pore volume (SPV) to be achieved (~0.1 cm$^3$/g) along with small increases in APD (<50 Å). Process A or B was also used after Process C to further increase pore diameter. Results for process C were very dependent on the lot, purity, and concentration of the ammonium bifluoride as well as reaction time. It also appears this increase in porosity came at the expense of mechanical strength. Alternatively, increased porosity was achieved through modification of the molar ratio in step 3. An advantageous molar ratio of C$_{18}$TMOS/TEOS is ¼. Optimal pore processing was achieved using alkaline hydrothermal treatments at pH 8 (e.g., Process B). Table 14 provides details on selected prototypes. Alternative modifications using other pore modification processes can be performed [U.S. Pat. No. 7,223,473; EP2181069; WO2006106493; US publication 20080269368; Chem. Commun., 2007, 1172; Chem Commun, 2007, 111 (3), 1093; *Solid State Science*, 2003, 5, 1303; Coll. Surf. A, 2003, 229, 1].

TABLE 13

| Process Type | Description | Additives | Temperature (° C.) | Time (h) |
|---|---|---|---|---|
| A | Hydrothermal Treatment with pH control | 0.2M ammonia acetate/acetic (pH 5) | 60-200 | 20 |
| B | Hydrothermal Treatment with pH control | 0.2M TRIS (pH 8) | 60-200 | 20 |
| C | Treatment with Ammonium Bifluoride | Ammonium biflouride (0.3-1.0 g per g silica) | 21-50 | 4-20 |

TABLE 14

| Product | Process Type | Temp (° C.) | SSA (m$^2$/g) | SPV (cm$^3$/g) | APD (Å) |
|---|---|---|---|---|---|
| 45t | A | 100 | 263 | 0.33 | 43 |
| 45u | B | 100 | 119 | 0.30 | 96 |
| 45v | B | 125 | 70 | 0.30 | 164 |
| 45w | B | 155 | 43 | 0.26 | 237 |
| 45x | B | 100 | 107 | 0.28 | 99 |
| 45y | B | 200 | 18 | 0.10 | 273 |

In order to increase the mechanical strength of these materials for use in HPLC and UPLC, a second calcination step was performed at 800° C. (1° C./min then held at temperature for 12 hours). In order to prepare these materials for surface modification a rehydroxylation reaction was performed in dilute hydrofluoric acid. Particle size and polydispersity were measured using Coulter Counter or light scattering. As shown in FIG. 7, particle morphology was confirmed to be spherical and free flowing by SEM. Evaluation of coating thickness and uniformity was determined using FIB/SEM.

Surface bondings were performed on these materials using standard procedures using octadecyltrichlorosilane (ODTCS) or octadecyldimethylchlorosilane (ODDMCS). Materials were further endcapped using monofunctional chlorosilanes using standard protocols. Prototypes data is provided in Table 15. Surface coverage was determined by difference in % C data before and after surface modification. Products were further packed into chromatographic columns and evaluated for performance (e.g., van Deemter analysis).

TABLE 15

| | Unbonded Data | | | | C$_{18}$- |
| Product | dp (μm) | SSA (m$^2$/g) | SPV (cc/g) | APD (Å) | Bonding | coverage (μmol/m$^2$) |
|---|---|---|---|---|---|---|
| 45z | 1.25 | 88 | 0.31 | 128 | ODDMCS | 1.85 |
| 45aa | 1.75 | 105 | 0.25 | 83 | ODDMCS | 2.75 |
| 45ab | 1.65 | 95 | 0.24 | 95 | ODDMCS | 2.97 |
| 45ac | 1.74 | 93 | 0.23 | 92 | ODDMCS | 2.53 |
| 45ad | 1.74 | 96 | 0.24 | 95 | ODTCS | 2.53 |
| 45ae | 1.53 | 97 | 0.26 | 97 | ODTCS | 2.35 |

Example 46

Example 45 (steps 1-4) is modified to include the precursor or product materials from Examples 1-3, or 5-20. Included in this are spherical, irregular, rod-shaped and toroid-shaped materials. Included in this are 0.5-1.9 μm cores that are hybrid, diamond, magnetite, coated diamond, or coated magnetite. A further modification is not to include steps 5-9.

Example 47

The process of Examples 45-46 is modified to replace a part of all of the alkoxysilane used with one or more of the following silanes (but not limited to) listed in Example 16 and 19, Jiang {U.S. Pat. Nos. 6,686,035; 7,223,473; 7,919,177}, Wyndham {WO 2008/103423}, or a POS used in Example 4. A further modification is not to include steps 5-9 of Example 45.

Example 48

The process of Examples 45-47 is modified to replace a part of all of the alkoxysilane used with one or more of the following metal oxide precursors (but not limited to) listed in Example 37. A further modification is not to include steps 5-9 of Example 45.

Example 49

The process of Examples 45-48 is modified to include incorporation of one or more nanoparticles within the superficially porous layer, including (but not limited to) nanoparticles listed in Example 10. A further modification is not to include steps 5-9 of Example 45.

Example 50

To a clean round bottom flask, equipped with a stir bar, thermometer and condenser was added tetraethoxysilane (Gelest, Morrisville, Pa.) and one equivalent of octadecanol, dodecanol, octanol, 2-ethoxyethanol, or 3-ethyl-3-pentanol (all alcohols were from Aldrich, Milwaukee, Wis.). A catalytic amount of p-toluene sulfonic acid was added, and the solution was stirred and heated overnight at 90° C. under nitrogen. Ethanol generated in this process was removed using a rotovap with regular vacuum. The product alkoxysilane was separated by vacuum distillation (2 mm Hg) to yield separate products having the following formula;

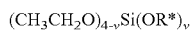   (Formula XXb)

wherein

R* was the corresponding octadecyl, dodecyl, octyl, 2-ethoxyethyl, or 3-ethyl-3-pentyl group, v was an integer equal to 1-4, The monoderivatized product (v=1, R*=octadecyl, dodecyl, octyl, 2-ethoxyethyl) were isolated in ≥90% purity by gas chromatography.

Example 51

The process of Examples 28-39, 45-49 is modified to employ a three component alkoxysilane mixture to form a superficially porous layer of formula XX.

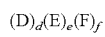  (Formula XX)

wherein, d+e+f=1,

D is an inorganic component upon initial condensation. Suitable precursors include (but are not limited to) the oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of silicon, titanium, zirconium, or aluminum. Advantageously, the precursors are tetraethoxysilane, tetramethoxysilane, methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

E is a hybrid component upon initial condensation. Suitable precursors include (but are not limited to) alkoxysilanes listed in Example 16 and 19, Jiang {U.S. Pat. Nos. 6,686,035; 7,223,473; 7,919,177} or Wyndham {WO 2008/103423}. Advantageously, E is 1,2-bis(triethoxysilyl)ethane, 1,2-bis(trimethoxysilyl)ethane, 1,4-bis(triethoxysilyl)benzene, 1,4-bis(trimethoxysilyflbenzene, 1,3-bis(triethoxysilyl)benzene, 1,3-bis(trimethoxysilyl)benzene, 1,3,5-tris(triethoxysilyl)benzene, 1,3,5-tris(trimethoxysilyflbenzene, and bis(4-triethoxysilylphenyl)diethoxysilane.

F is a hybrid component upon initial condensation that can be further reacted to increase the porosity of the superficially porous layer. Suitable precursors include (but are not limited to) an alkoxysilane from Example 50, phenyltrimethoxysilane, phenyltriethoxysilane, acetyloxyethyltrimethoxysilane; acetyloxyethyltriethoxysilane; chloroethyltriethoxysilane; chloroethyltrimethoxysilane; methacryloxypropyltrimethoxysilane; methacryloxypropyltriethoxysilane; fluorotriethoxysilane; fluorotrimethoxysilane or silanes reported by Corriu, R. J. P. {Adv. Mater, 2000, 12, 13, 989}. Reactions used to increase porosity include protodesilylation, deprotection, thermal treatment<500° C., oxidation or decomposition. Products employing alkoxysilanes from Example 50 can result in products with increased porosity layers through acid extraction (as detailed in Example 40) or ozonolysis (as detailed in Example 41). The resulting reacted material may include a hybrid group or silica.

Example 52

Example 51 is modified to have a two component initially condensed formula (d=0). When F includes a silane from Example 50 the produce is reacted by repeated acid extraction (as detailed in Example 40) to create a superficially porous layer.

Example 53

Selected materials from Examples 45-49 and 51-52 are further processed following the processes described in Examples 40-44. Classification is performed if needed to improve the particle size distribution, removing any fines or agglomerated materials.

Example 54

Selected precursor and product core materials from Examples 1-3, or 5-20 are surface modified with an alkoxysilane that contains a basic group of equation 1, using the surface modification methods of Jiang {U.S. Pat. Nos. 6,686,035; 7,223,473; 7,919,177} and Wyndham {WO 2008/103423}.

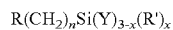  (equation 1)

where n=1-30, advantageously 2-3;

x is 0-3; advantageously 0;

Y represents chlorine, dimethylamino, inflate, methoxy, ethoxy, or a longer chain alkoxy group;

R represent a basic group, including (but not limited to —NH$_2$, —N(R')H, —N(R')$_2$, —N(R')$_3^+$, —NH(CH$_2$)$_m$NH$_2$, —NH(CH$_2$)$_m$N(R')H, —NH(CH$_2$)$_m$N(R')$_2$, —NH(CH$_2$)$_m$N(R')$_3^+$, pyridyl, imidizoyl, polyamine.

R' independently represents an alkyl, branched alkyl, aryl, or cycloalkyl group;

m is 2-6.

Example 55

Selected precursor and product core materials from Examples 1-3, or 5-20 are surface modified with an alkoxysilane that contains a basic group of equation 2, using the surface modification methods of Jiang {U.S. Pat. Nos. 6,686,035; 7,223,473; 7,919,177} and Wyndham {WO 2008/103423}.

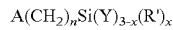  (equation 2)

where n=1-30, advantageously 2-3;

x is 0-3; advantageously 0;

Y represents chlorine, dimethylamino, triflate, methoxy, ethoxy, or a longer chain alkoxy group; A represent an acidic group, including (but not limited to) a sulfonic acid, carboxylic acid, phosphoric acid, boronic acid, arylsulfonic acid, arylcarboxylic acid, arylphosphonic acid, and arylboronic acid.

R' independently represents an alkyl, branched alkyl, aryl, or cycloalkyl group.

Example 56

Selected nanoparticulate materials detailed in Examples 10, 12, 14, 21, 22, 25, 26, 27, 37, and 38 are surface modified with an alkoxysilane that contains a basic group of equation 1 or 2, using the surface modification methods of Jiang {U.S. Pat. Nos. 6,686,035; 7,223,473; 7,919,177} and Wyndham {WO 2008/103423}.

Example 57

Selected surface modified core materials in Example 54 and 55 are reacted with surface modified nanoparticulate materials in Example 56 using a modified process detailed in Example 21. In this approach no polyelectrolyte is used. Solution pH adjusted for optimal porous layer formation. in certain aspects, the solution pH varies between pH 2-7. In certain aspects, the optimal pH can vary between pH 4.0-6.5. When a positively charged surface modified core material from Example 54 is used, a negatively charged nanoparticulate material from Example 56 is used. When a negatively charged surface modified core material from Example 55 is used, a positively charged nanoparticulate material from Example 56 is used.

After workup and isolation this single layered material can be used as is. Alternatively, additional layers can be added. These can be achieved by repeating this layering process using a. nanoparticulate material from Example 56 of opposite charge from the last surface layer. When the last surface layer used positively charged nanoparticulate material from Example 56, the following layer uses a negatively charged nanoparticulate material from Example 56. When the last surface layer uses a negatively charged nanoparticulate material from Example 56, the following layer uses a positively charged nanoparticulate material from Example 56. This sequence of alternating charge nanoparticulate material can be used to form 2-15 layers on the core material. In this approach no polyelectrolyte material used. The type of nanoparticulate material used can vary between layers or remain the same. For example, a silica layer can be layered between diamond or magnetite layers by this approach.

The specific surface areas (SSA) and specific pore volumes (SPV) of these materials are increased with respect to the core materials used in these reactions. Products prepared by this approach are free flowing. Any agglomerated materials can be removed through grinding or classification.

To improve pore diameter and further strengthen these superficially porous materials of select materials from Examples 40-43, hydrothermal treatment methods of Jiang {U.S. Pat. No. 6,686,035; U.S. Pat. No. 7,223,473; U.S. Pat. No. 7,919,177} or Wyndham {WO 2008/103423} are employed. Alternatively a surrounding material method described by Wyndham {WO 2010/141426} can be used to strengthen these superficially porous materials. The surrounding material method is of particular importance when a hybrid inorganic/organic surrounding material is used on the silica superficially porous layer. Such materials have improved chemical stability over commercially available silica superficially porous particles. When the surrounding material contains nanoparticles, including (but not limited to) nanodiamonds—as noted in Examples 12 and 13 of Wyndham {WO 2010/141426}—improvements in thermal conductivity can be achieved.

Alternatively, products are thermally treated at 700-1,000° C. for 10-40 hours to further strengthen these superficially porous materials. This thermal treatment is performed in air, under an inert atmosphere, or in a reducing atmosphere depending on compatibility of the additives employed. Materials containing diamond or magnetite employ an inert or reducing atmosphere is used to prevent oxidation.

Example 58

The process of 57 is modified to introduce a polyelectrolyte or polymer material from Example 21-27. When the last layer used a positively charged nanoparticulate material, the following polyelectrolyte or polymer used is negatively charged. When the last layer used a negatively charged nanoparticulate material, the following polyelectrolyte or polymer used is positively charged.

Example 59

The process of 57-58 is modified to introduce layers formed with polyelectrolyte and layers formed without polyelectrolyte.

Example 60

The process of 57-59 is modified to use charged nanoparticulate materials that have been charged modified through acid or base washing, or electrostatically. The charge of these nanoparticulate materials can be monitored through zeta-potential measurements.

Example 61

The process of 57-60 is modified to hybrid core materials that have surface acid or base groups. Surface acidic groups can be prepare using hybrid core materials of the type described in Example 1-3 and 5 using phenyltriethoxysilane, or mercaptopropyltrimethoxysilane. The phenyl groups can be sulfonated by heating in sulfuric acid. The mercaptopropyl group can be oxidized to sulfopropyl groups using hydrogen peroxide or nitric acid. The use of a protected aminopropyl group in a hybrid core material of the type described in Example 1-3 and 5 can be used to create surface basic groups. Methyl iodide treatment of these amino groups can be used to prepare dimethyl and trimethyl aminopropyl groups.

Example 62

The process of 57-61 is modified to use hybrid nanoparticulate materials that have surface acid or base groups of the type detailed in Example 61.

Example 63

Select materials from Examples 21-43, 45-49, 51-52, and 57-61 are further processed following the processes described in Examples 40-44. Classification is performed if needed to improve the particle size distribution, removing any fines or agglomerated materials.

Example 64

Select superficially porous materials prepared according to Examples 21-43, 45-49, 51-52, and 57-63 are dispersed in a 1 molar hydrochloric acid solution (Aldrich, Milwaukee, Wis.) for 20 h at 90-98° C. Alternatively materials are rehydroxylated in a 10% nitric acid solution, or dilute hydrofluoric acid (aqueous). Products are isolated on filter paper (or a magnetic separator) and are washed repeatedly with deionized water until a neutral pH is achieved, followed by acetone (HPLC grade, J. T. Baker, Phillipsburgh, N.J.).

Materials can be further treated by sedimentation in acetone to remove fines material. The products are dried at 80° C. under vacuum for 16 h. Superficially porous materials, prepared by this approach are submitted for analysis. The specific surface areas (SSA) and specific pore volumes (SPV) of these materials are increased with respect to the core materials. SPV vary between 0.08-0.45 cm$^3$/g and average pore diameter varies between 60-300 Å. Particle size measurements and SEM analysis indicate the formation of thick superficially porous layer. This porous layer thickness varies between 0.07-0.53 material average size varies between 1.2-15.0 and the product size distribution (90/10 ratio) are similar to the size distribution of the core materials. The surface roughness of these materials varies from rough to smooth. Rough surfaces generally formed from sol-based approaches. Smooth surfaces from high purity alkoxysilane-based approaches. The product shape generally resembles the core materials. For example, when the cores are spherical, products are spherical. When cores are rod-shaped, products are rod-shaped. The noticeable difference is these products is a rounding of rough edges for jagged or flat faced core materials after the porous layer is formed.

Example 65

Select spherical superficially porous materials prepared according to Example 64 are reacted with octadecyldimethylchlorosilane following the general process described in Jiang {U.S. Pat. Nos. 6,686,035; 7,223,473; 7,919,177} or Wyndham {WO 2008/103423}. These materials are further reacted with trimethylchlorosilane following the general process described in Jiang {U.S. Pat. Nos. 6,686,035; 7,223,473; 7,919,177} or Wyndham {WO 2008/103423}. Table 16 contains a description of these $C_{18}$-bonded materials. Material compositions used the following notation:

$(O_{1.5}SiCH_2CH_2SiO_{1.5})_x(SiO_2)_y$

In this table the following abbreviations are used: SM=Smooth Surface and RS=Rough Surface.

thickness to radius core as Product 65a, but vary in composition (0-100% hybrid) in both the core and porous layer.

Example 66

Select superficially porous materials prepared according to Example 64 are reacted with octadecyldimethylchlorosilane and trimethylchlorosilane following the process described in Example 65

Table 17 contains a description of these $C_{18}$-bonded materials. These products contain irregular shaped diamond cores that can be coated with silica. The core material before formation of the superficially porous layer has an average particle size of 1.18 μm and a 90/10 ratio of 1.4. The products have an average particle size of 1.80 μm, which have a 0.31 um porous layer thickness and a ratio of porous layer thickness to core radius of 0.53. Porous layers composition uses the following notation:

$(O_{1.5}SiCH_2CH_2SiO_{1.8})_x(SiO_2)_y(nanodiamond)_z$

In this table the following abbreviations are used: SM=Smooth Surface; and RS=Rough Surface.

Products 66a-66 h have differences in coating of the diamond cores, composition of the porous layer and surface roughness. Products 66i-66s have different composition of the porous layer to included nanodiamonds. In this approach nanodiamonds are incorporated within the porous layer in 0.1-16 wt %.

TABLE 16

| Product | Core Composition (x, y) | Initial Core Size (μm) | Core 90/10 ratio | Porous Layer Composition (x, y) | Product Surface | Product Particle Size (μm) | Shell Thickness (μm) | Ratio Shell Thickness to Radius Core |
|---|---|---|---|---|---|---|---|---|
| 65a | 0, 1 | 1.18 | 1.1 | 1, 0 | SM | 1.80 | 0.31 | 0.53 |
| 65b | 0, 1 | 1.18 | 1.1 | 1, 0 | RS | 1.80 | 0.31 | 0.53 |
| 65c | 0, 1 | 1.18 | 1.5 | 1, 0 | SM | 1.80 | 0.31 | 0.53 |
| 65d | 0, 1 | 1.18 | 1.5 | 1, 0 | RS | 1.80 | 0.31 | 0.53 |
| 65e | 0, 1 | 1.70 | 1.1 | 1, 0 | SM | 2.60 | 0.45 | 0.53 |
| 65f | 0, 1 | 1.70 | 1.1 | 1, 0 | RS | 2.60 | 0.45 | 0.53 |
| 65g | 0, 1 | 1.70 | 1.5 | 1, 0 | SM | 2.60 | 0.45 | 0.53 |
| 65h | 0, 1 | 1.70 | 1.5 | 1, 0 | RS | 2.60 | 0.45 | 0.53 |
| 65i | 0, 1 | 1.10 | 1.1 | 1, 0 | SM | 1.80 | 0.35 | 0.64 |
| 65j | 0, 1 | 1.10 | 1.1 | 1, 0 | RS | 1.80 | 0.35 | 0.64 |
| 65k | 0, 1 | 1.40 | 1.1 | 1, 0 | SM | 1.80 | 0.20 | 0.29 |
| 65l | | 1.40 | 1.1 | 1, 0 | RS | 1.80 | 0.20 | 0.29 |
| 65m | 0, 1 | 1.18 | 1.1 | 0.5, 0.5 | SM | 1.80 | 0.31 | 0.53 |
| 65n | 1, 0 | 1.18 | 1.1 | 0.5, 0.5 | SM | 1.80 | 0.31 | 0.53 |
| 65o | 1, 0 | 1.18 | 1.1 | 0, 1 | SM | 1.80 | 0.31 | 0.53 |
| 65p | 1, 0 | 1.18 | 1.1 | 1, 0 | SM | 1.80 | 0.31 | 0.53 |
| 65q | 0.5, 0.5 | 1.18 | 1.1 | 0.5, 0.5 | SM | 1.80 | 0.31 | 0.53 |
| 65r | 0.5, 0.5 | 1.18 | 1.1 | 0, 1 | SM | 1.80 | 0.31 | 0.53 |
| 65s | 0.5, 0.5 | 1.18 | 1.1 | 1, 0 | SM | 1.80 | 0.31 | 0.53 |

Products of this process are spherical having differences in particle size, distribution, surface morphology, shell thickness and composition. Products 65a-65 h detail the different final particle size, 90/10 ratio, and surface roughness that can be achieved in this process while maintain a comparable ratio of shell thickness to radius of the core material (0.53). Products 65i-65l have different ratios of shell thickness to radius of the core material (0.29-0.64), while maintaining a comparable final product particle size. These materials can be compared further with Products 65a and 65b. Products 65m-65s have comparable particle size, distribution, morphology, shell thickness and ratio of shell

TABLE 17

| Product | Core Coated | Porous Layer Composition (x, y, z) | Product Surface |
|---|---|---|---|
| 66a | Silica | 1, 0, 0 | SM |
| 66b | Silica | 1, 0, 0 | RS |
| 66c | None | 1, 0, 0 | SM |
| 66d | None | 1, 0, 0 | RS |
| 66e | Silica | 0, 1, 0 | SM |
| 66f | Silica | 0, 1, 0 | RS |
| 66g | None | 0, 1, 0 | SM |

TABLE 17-continued

| Product | Core Coated | Porous Layer Composition (x, y, z) | Product Surface |
|---|---|---|---|
| 66h | None | 0, 1, 0 | RS |
| 66i | Silica | 0.25, 0.25, 0.5 | RS |
| 66j | Silica | 0.35, 0.35, 0.30 | RS |
| 66k | Silica | 0.45, 0.45, 0.1 | RS |
| 66l | Silica | 0.49, 0.49, 0.02 | RS |
| 66m | Silica | 0.5, 0, 0.5 | RS |
| 66n | Silica | 0.7, 0, 0.3 | RS |
| 66o | Silica | 0.9, 0.0, 0.1 | RS |
| 66p | Silica | 0.99, 0, 0.01 | RS |
| 66q | Silica | 0, 0.5, 0.5 | RS |
| 66r | Silica | 0, 0.7, 0.3 | RS |
| 66s | Silica | 0, 0.9, 0.1 | RS |

Example 67

Select superficially porous materials prepared according to Example 64 are reacted with octadecyldimethylchlorosilane and trimethylchlorosilane following the process described in Example 65. Table 18 contains a description of these $C_{18}$-bonded materials. These products contain a magnetite core that has been coated with silica. The silica coated magnetite core material has an average particle size of 1.18 µm and a 90/10 ratio of 1.1-1.5. The products have an average particle size of 1.80 µm, which have a 0.31 um porous layer thickness and a ratio of porous layer thickness to core radius of 0.53. Porous layers composition uses the following notation:

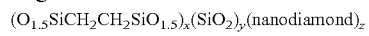
$(O_{1.5}SiCH_2CH_2SiO_{1.5})_x(SiO_2)_y(\text{nanodiamond})_z$

In this table the following abbreviations are used: SM=Smooth Surface; and RS=Rough Surface.

Products 67a-67l have different magnetite core size, coated core 90/10 ratio, and surface roughness, while having a comparable porous layer composition. Products 67m-67t have differences in the hybrid and nanodiamond content of the porous layer.

TABLE 18

| Product | Magnetite Size (µm) | Core 90/10 Ratio | Porous Layer Composition (x, y, z) | Product Surface |
|---|---|---|---|---|
| 67a | 0.2 | 1.1 | 1, 0, 0 | SM |
| 67b | 0.2 | 1.1 | 1, 0, 0 | RS |
| 67c | 0.5 | 1.1 | 1, 0, 0 | SM |
| 67d | 0.5 | 1.1 | 1, 0, 0 | RS |
| 67e | 1 | 1.1 | 1, 0, 0 | SM |
| 67f | 1 | 1.1 | 1, 0, 0 | RS |
| 67g | 0.2 | 1.5 | 1, 0, 0 | SM |
| 67h | 0.2 | 1.5 | 1, 0, 0 | RS |
| 67i | 0.5 | 1.5 | 1, 0, 0 | SM |
| 67j | 0.5 | 1.5 | 1, 0, 0 | RS |
| 67k | 1 | 1.5 | 1, 0, 0 | SM |
| 67l | 1 | 1.5 | 1, 0, 0 | RM |
| 67m | 0.5 | 1.5 | 0, 1, 0 | RS |
| 67n | 0.5 | 1.5 | 0.5, 0.5, 0 | RS |
| 67o | 0.5 | 1.5 | 0.25, 0.25, 0.5 | RS |
| 67p | 0.5 | 1.5 | 0.49, 0.49, 0.02 | RS |
| 67q | 0.5 | 1.5 | 0.5, 0, 0.5 | RS |
| 67r | 0.5 | 1.5 | 0.99, 0, 0.01 | RS |
| 67s | 0.5 | 1.5 | 0, 0.7, 0.3 | RS |
| 67t | 0.5 | 1.5 | 0, 0.9, 0.1 | RS |

Example 68

Select superficially porous materials prepared according to Example 64 are reacted with octadecyldimethylchlorosilane and trimethylchlorosilane following the process described in Example 65. Table 19 contains a description of these $C_{18}$-bonded materials. These products contain rod shaped core materials. Rod shaped cores are described with a length to width notation. Material composition uses the following notation:

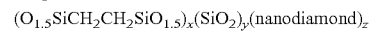
$(O_{1.5}SiCH_2CH_2SiO_{1.5})_x(SiO_2)_y(\text{nanodiamond})_z$

In this table the following abbreviations are used: SM=Smooth Surface; and RS=Rough Surface; CSD=Cross Sectional Diameter; and CCSR=Core Cross Sectional Radius.

Product 68a-l have changes in average core rod length (1-3 µm) and average core rod cross sectional diameter (CSD, 1-2 µm) and surface roughness, while having a comparable ratio of shell thickness to core rod cross sectional radius (CCSR). Products 68m-68p have changes in shell thickness to cross sectional radius and surface roughness, while having comparable core rod length and core rod CSD. These products can be compared with 68a-b. Products 68q-ac have changes in composition of the core rod and porous layer, while other parameters are comparable to Product 68b.

TABLE 19

| Product | Core Composition (x, y, z) | Initial Core length (µm) | Initial Core CSD (µm) | Porous Layer Composition (x, y, z) | Product Surface | Product length (µm) | Product CSD (µm) | Shell Thickness (µm) | Ratio Shell Thickness to CCSR |
|---|---|---|---|---|---|---|---|---|---|
| 68a | 0, 1, 0 | 3 | 1 | 1, 0, 0 | SM | 3.53 | 1.53 | 0.27 | 0.53 |
| 68b | 0, 1, 0 | 3 | 1 | 1, 0, 0 | RS | 3.53 | 1.53 | 0.27 | 0.53 |
| 68c | 0, 1, 0 | 3 | 2 | 1, 0, 0 | RS | 4.06 | 3.06 | 0.53 | 0.53 |
| 68d | 0, 1, 0 | 3 | 1 | 1, 0, 0 | RS | 3.53 | 1.53 | 0.27 | 0.53 |
| 68e | 0, 1, 0 | 3 | 1.5 | 1, 0, 0 | RS | 3.80 | 2.30 | 0.40 | 0.53 |
| 68f | 0, 1, 0 | 3 | 2 | 1, 0, 0 | RS | 4.06 | 3.06 | 0.53 | 0.53 |
| 68g | 0, 1, 0 | 2 | 1 | 1, 0, 0 | RS | 2.53 | 1.53 | 0.27 | 0.53 |
| 68h | 0, 1, 0 | 2 | 1.5 | 1, 0, 0 | RS | 2.80 | 2.30 | 0.40 | 0.53 |
| 68i | 0, 1, 0 | 2 | 2 | 1, 0, 0 | RS | 3.06 | 3.06 | 0.53 | 0.53 |
| 68j | 0, 1, 0 | 1 | 1 | 1, 0, 0 | RS | 1.53 | 1.53 | 0.27 | 0.53 |
| 68k | 0, 1, 0 | 1 | 1.5 | 1, 0, 0 | RS | 1.80 | 2.30 | 0.40 | 0.53 |
| 68l | 0, 1, 0 | 1 | 2 | 1, 0, 0 | RS | 2.06 | 3.06 | 0.53 | 0.53 |
| 68m | 0, 1, 0 | 3 | 1 | 1, 0, 0 | SM | 3.30 | 1.30 | 0.15 | 0.30 |

TABLE 19-continued

| Product | Core Composition (x, y, z) | Initial Core length (μm) | Initial Core CSD (μm) | Porous Layer Composition (x, y, z) | Product Surface | Product length (μm) | Product CSD (μm) | Shell Thickness (μm) | Ratio Shell Thickness to CCSR |
|---|---|---|---|---|---|---|---|---|---|
| 68n | 0, 1, 0 | 3 | 1 | 1, 0, 0 | RS | 3.30 | 1.30 | 0.15 | 0.30 |
| 68o | 0, 1, 0 | 3 | 1 | 1, 0, 0 | SM | 3.60 | 1.60 | 0.30 | 0.60 |
| 68p | 0, 1, 0 | 3 | 1 | 1, 0, 0 | RS | 3.60 | 1.60 | 0.30 | 0.60 |
| 68q | 0, 1, 0 | 3 | 1 | 0, 1, 0 | RS | 3.53 | 1.53 | 0.27 | 0.53 |
| 68r | 0, 1, 0 | 3 | 1 | 0.5, 0.5, 0 | RS | 3.53 | 1.53 | 0.27 | 0.53 |
| 68s | 0, 1, 0 | 3 | 1 | 0.25, 0.25, 0.5 | RS | 3.53 | 1.53 | 0.27 | 0.53 |
| 68t | 0, 1, 0 | 3 | 1 | 0.5, 0, 0.5 | RS | 3.53 | 1.53 | 0.27 | 0.53 |
| 68u | 0, 1, 0 | 3 | 1 | 0, 0.7, 0.3 | RS | 3.53 | 1.53 | 0.27 | 0.53 |
| 68v | 0.5, 0.5, 0 | 3 | 1 | 1, 0, 0 | RS | 3.53 | 1.53 | 0.27 | 0.53 |
| 68w | 0.5, 0.5, 0 | 3 | 1 | 0, 1, 0 | RS | 3.53 | 1.53 | 0.27 | 0.53 |
| 68x | 0.5, 0.5, 0 | 3 | 1 | 0.5, 0.5, 0 | RS | 3.53 | 1.53 | 0.27 | 0.53 |
| 68y | 1, 0, 0 | 3 | 1 | 1, 0, 0 | RS | 3.53 | 1.53 | 0.27 | 0.53 |
| 68z | 1, 0, 0 | 3 | 1 | 0, 1, 0 | RS | 3.53 | 1.53 | 0.27 | 0.53 |
| 68aa | 1, 0, 0 | 3 | 1 | 0.5, 0.5, 0 | RS | 3.53 | 1.53 | 0.27 | 0.53 |
| 68ab | 0, 0.7, 0.3 | 3 | 1 | 1, 0, 0 | RS | 3.53 | 1.53 | 0.27 | 0.53 |
| 68ac | 0, 0.7, 0.3 | 3 | 1 | 0, 1, 0 | RS | 3.53 | 1.53 | 0.27 | 0.53 |
| 68ad | 0, 0.7, 0.3 | 3 | 1 | 0.5, 0.5, 0 | RS | 3.53 | 1.53 | 0.27 | 0.53 |
| 68ac | 0, 0.7, 0.3 | 3 | 1 | 0, 0.7, 0.3 | RS | 3.53 | 1.53 | 0.27 | 0.53 |

Example 69

Select superficially porous materials prepared according to Example 64 are reacted with octadecyldimethylchlorosilane and trimethylchlorosilane following the process described in Example 65. Table 20 contains data for of these $C_{18}$-bonded materials. These cores have toroid shaped iron oxide, silica, hybrid, or polymeric core materials. Alternatively these cores are coated with silica. Toroid shaped core materials are described as an outer diameter (OD), and inner diameter (ID) of open volume, and cross sectional diameter (CSD=0.5(OD-ID)) of material. Material composition uses the following notation:

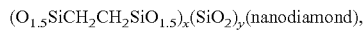

$(O_{1.5}SiCH_2CH_2SiO_{1.5})_x(SiO_2)_y$(nanodiamond)$_z$

In this table the following abbreviations are used: SM=Smooth Surface; and RS=Rough Surface; OD=outer diameter; ID=Inner Diameter; CSD=Cross Sectional Diameter; and CCSR=Core Cross Sectional Radius.

Product 69a-g have changes in average product OD (1.63-8.06 μm), average core OD (1.5-7 μm) and core CSD (0.5-2 μm), while having a comparable ratio of shell thickness to core cross sectional radius (CCSR, 0.53). Products 69h-k have changes in ratio of average shell thickness to CCSR (0.3-0.6) and surface roughness, while having comparable average core OD and average core CSD. These products can be compared with 69d. Products 69l-p have changes in composition of the porous layer, while other parameters are comparable to Product 69d.

TABLE 20

| Product | Initial Core OD (μm) | Initial Core CSD (μm) | Porous Layer Composition (x, y, z) | Product Surface | Product OD (μm) | Product ID (μm) | Shell Thickness (μm) | Ratio Shell Thickness to CCSR |
|---|---|---|---|---|---|---|---|---|
| 69a | 7.0 | 2.00 | 1, 0, 0 | SM | 8.06 | 1.94 | 0.53 | 0.53 |
| 69b | 5.0 | 1.58 | 1, 0, 0 | SM | 5.84 | 1.00 | 0.42 | 0.53 |
| 69c | 5.0 | 1.00 | 1, 0, 0 | SM | 5.53 | 2.47 | 0.27 | 0.53 |
| 69d | 3.0 | 0.79 | 1, 0, 0 | SM | 3.42 | 1.00 | 0.21 | 0.53 |
| 69e | 3.0 | 0.50 | 1, 0, 0 | SM | 3.27 | 1.74 | 0.13 | 0.53 |
| 69f | 2.0 | 0.50 | 1, 0, 0 | SM | 2.27 | 0.74 | 0.13 | 0.53 |
| 69g | 1.5 | 0.25 | 1, 0, 0 | SM | 1.63 | 0.87 | 0.07 | 0.53 |
| 69h | 3.0 | 0.79 | 1, 0, 0 | SM | 3.24 | 1.18 | 0.12 | 0.30 |
| 69i | 3.0 | 0.79 | 1, 0, 0 | RS | 3.24 | 1.18 | 0.12 | 0.30 |
| 69j | 3.0 | 0.79 | 1, 0, 0 | SM | 3.47 | 0.95 | 0.24 | 0.60 |
| 69k | 3.0 | 0.79 | 1, 0, 0 | RS | 3.47 | 0.95 | 0.24 | 0.60 |
| 69l | 3.0 | 0.79 | 0, 1, 0 | SM | 3.42 | 1.00 | 0.21 | 0.53 |
| 69m | 3.0 | 0.79 | 0.5, 0.5, 0 | SM | 3.42 | 1.00 | 0.21 | 0.53 |
| 69n | 3.0 | 0.79 | 0.25, 0.25, 0.5 | SM | 3.42 | 1.00 | 0.21 | 0.53 |
| 69o | 3.0 | 0.79 | 0.5, 0, 0.5 | SM | 3.42 | 1.00 | 0.21 | 0.53 |
| 69p | 3.0 | 0.79 | 0, 0.7, 0.3 | SM | 3.42 | 1.00 | 0.21 | 0.53 |

Example 70

Select superficially porous materials prepared according to Example 64 are reacted with octadecyldimethylchlorosilane and trimethylchlorosilane following the process described in Example 65. Table 22 contains data of these $C_{18}$-bonded materials. These products contain composite spherical core particles that have an average particle size of 1.18 μm and a 90/10 ratio of 1.4. Porous layers composition uses the following notation:

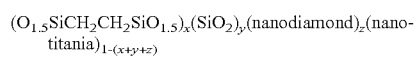
$(O_{1.5}SiCH_2CH_2SiO_{1.5})_x(SiO_2)_y(\text{nanodiamond})_z(\text{nanotitania})_{1-(x+y+z)}$ These products have an average particle size of 1.80 μm, which have a 0.31 μm porous layer thickness and a ratio of porous layer thickness to core radius of 0.53.

TABLE 22

| Product | nanoparticles in silica | Porous Layer Composition (x, y, z) |
|---|---|---|
| 70a | diamond | 1, 0, 0 |
| 70b | diamond | 0, 1, 0 |
| 70c | diamond | 0.5, 0.5, 0 |
| 70d | diamond | 0.25, 0.25, 0.5 |
| 70e | diamond | 0, 0.3, 0.3 |
| 70f | diamond | 0.5, 0, 0 |
| 70g | diamond | 0.25, 0.25, 0 |
| 70h | diamond | 0.25, 0.25, 0.25 |
| 70i | magnetite | 1, 0, 0 |
| 70j | magnetite | 0, 1, 0 |
| 70k | magnetite | 0.5, 0.5, 0 |
| 70l | magnetite | 0.25, 0.25, 0.5 |
| 70n | magnetite | 0, 0.3, 0.3 |
| 70o | titania | 1, 0, 0 |
| 70p | titania | 0, 1, 0 |
| 70q | titania | 0.5, 0.5, 0 |
| 70r | titania | 0.25, 0.25, 0.5 |
| 70s | titania | 0, 0.3, 0.3 |
| 70t | diamond and magnetite | 1, 0, 0 |
| 70u | diamond and magnetite | 0, 1, 0 |
| 70v | diamond and magnetite | 0.5, 0.5, 0 |
| 70w | diamond and magnetite | 0.25, 0.25, 0.5 |
| 70x | diamond and magnetite | 0, 0.3, 0.3 |
| 70y | diamond and titania | 1, 0, 0 |
| 70z | diamond and titania | 0, 1, 0 |
| 70aa | diamond and titania | 0.5, 0.5, 0 |
| 70ab | diamond and titania | 0.25, 0.25, 0.5 |
| 70ac | diamond and titania | 0, 0.3, 0.3 |

Example 71

Select materials prepared according to Example 64 and $C_{18}$-bonded materials prepared according to Example 65-70 are packed into 2.1×100 mm chromatographic columns using a slurry packing technique. The performance of these materials is evaluated using an ACQUITY® ULTRA PERFORMANCE LC® System and an ACQUITY® ULTRA PERFORMANCE LC® Tunable UV detector. Empower 2 Chromatography Data Software is used for data collection and analysis. Columns are evaluated under a series of different tests described in Jiang {U.S. Pat. Nos. 6,686,035; 7,223,473; 7,919,177} and Wyndham {WO 2008/103423; WO 2011/017418}, including isocratic reversed-phase (pH 3 and pH 7), gradient separations, and accelerated stability tests with high pH mobile phases.

Example 72

Mixtures of spherical and rod shaped C18-bonded materials prepared according to Examples 65 and 68 are packed into 2.1×100 mm chromatographic columns using a slurry packing technique. The weight percent of rod-shaped materials varies from 1-95 wt %. The performance of these materials is evaluated using an ACQUITY® ULTRA PERFORMANCE LC® System and an ACQUITY® ULTRA PERFORMANCE LC® Tunable UV detector. Empower 2 Chromatography Data Software is used for data collection and analysis. Reductions and column pressure and an increase in interstitial porosity and interstitial fraction is determined for columns containing increased content of rod-shaped materials. Interstitial fraction is well known in the art and can be determined by a number of known methods including (but not limited to) inverse size exclusion chromatography.

Example 73

Following a modified process of Example 21, to a mixture of 0.5-1.0 μm diamond particles (5 g, Mypodiamond, Smithfield, Pa.) dispersed in deionized water (45 g) was added a 0.5 wt % aqueous solution of poly(diallydimethylammonium chloride) (225 g, MW=100,000-200,000, Aldrich, Milwaukee, Wis.). The mixture was stirred for 10 minutes and the treated particles were collected by centrifugation. The particles were washed by four-fold repeated dispersion in deionized water (250 mL), followed by centrifugation. The particles were redispersed in deionized water (150 mL) before addition of a 10 wt % aqueous solution of 59 nm silica sols (50 g, Nexsil 85NH4, Nyacol Nano Technologies, Ashland, Mass., pH was adjusted to 2.98 using dilute nitric acid). The mixture was stirred for 15 minutes before collecting the particles by centrifugation. The particles were washed by five-fold repeated dispersion in deionized water (250 mL), followed by centrifugation (Product 73L1).

The particles were dispersed in deionized water (100 g) before addition of a 0.5 wt % aqueous solution of poly (diallydimethylammonium chloride) (225 g, MW=100,000-200,000, Aldrich, Milwaukee, Wis.). The mixture was stirred for 10 minutes and the treated particles were collected by centrifugation. The particles were washed by four-fold repeated dispersion in deionized water (250 mL), followed by centrifugation. The particles were redispersed in deionized water (150 mL) before addition of a 10 wt % aqueous solution of 59 nm silica sols (50 g, Nexsil 85NH4, Nyacol Nano Technologies, Ashland, Mass., pH was adjusted to 2.98 using dilute nitric acid). The mixture was stirred for 15 minutes before collecting the particles by centrifugation. The particles were washed by five-fold repeated dispersion in deionized water (250 mL), followed by centrifugation (Product 73L2).

Figure 4:
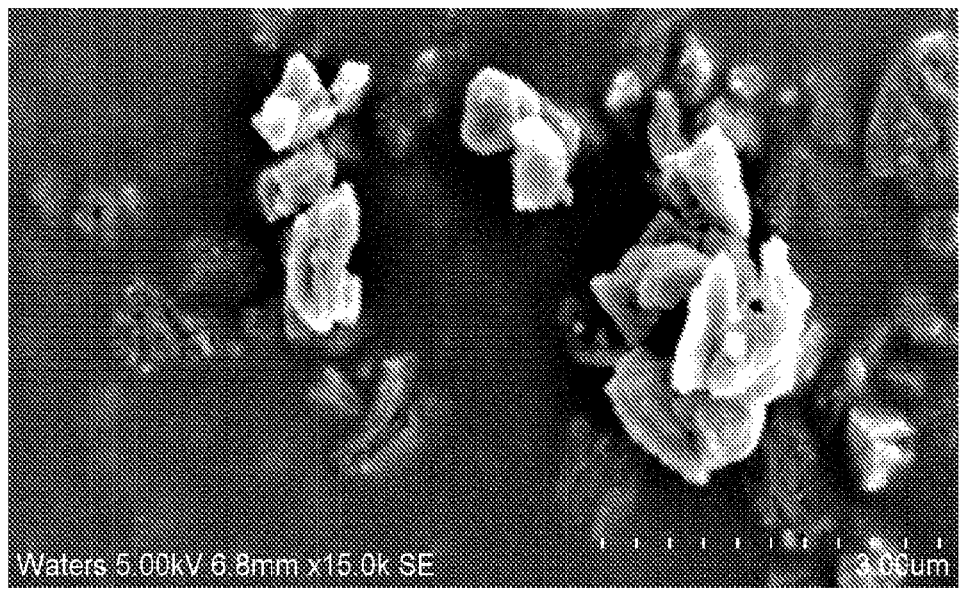
FIG. 4 is an SEM analysis of Products diamond cores (top) and Product 73L1(bottom) from Example 73.
Figure 4:
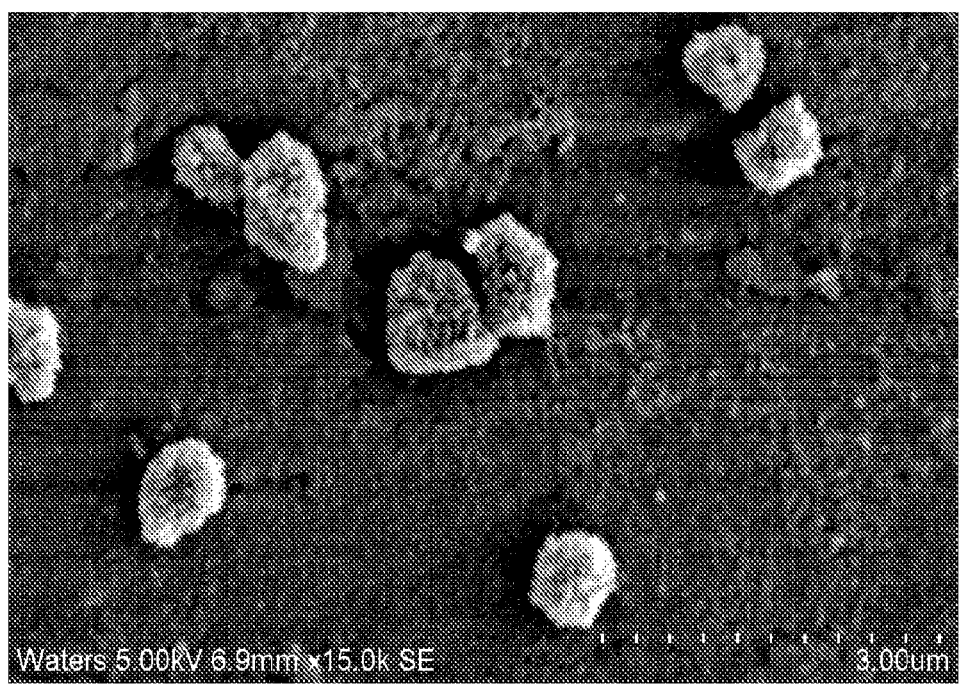

Aqueous samples were taken and air dried for SEM analysis (FIG. 4). Final product—was dried using lyophilization. Products prepared in this manner have both silica sols and polyelectrolyte on the core diamond material. As shown in FIG. 4 there is a clear difference in product morphology and surface roughness after a single layer of silica is added to the diamond cores.

Example 74

A superficially porous silica layer was formed on the product 18a from Example 18 using a modified process of Example 21. Silica coated magnetic cores (18a, 1.2 μm, 20 mg) were resuspended in a 0.5 wt % aqueous solution of polyethylenimine (1.0 mL, PEI, MW=2,000, Aldrich). This mixture was then mixed on a rotator for 10 minutes. Materials were isolated using a magnetic separator and were washed four times with deionized water (3.0 mL, MilliQ) before being resuspended in deionized water (0.6 mL). A 10 wt % aqueous solution of 59 nm silica sols (200 µl, Nexsil 85NH4, Nyacol Nano Technologies, Ashland, Mass., pH adjusted to 3.48) was then added. The mixture was rotated for 15 minutes, before isolating the product using a magnetic separator. The product was washed five times with deionized water (3.0 mL). The product (74L1) was isolated using a magnetic separator.

Figure 5:
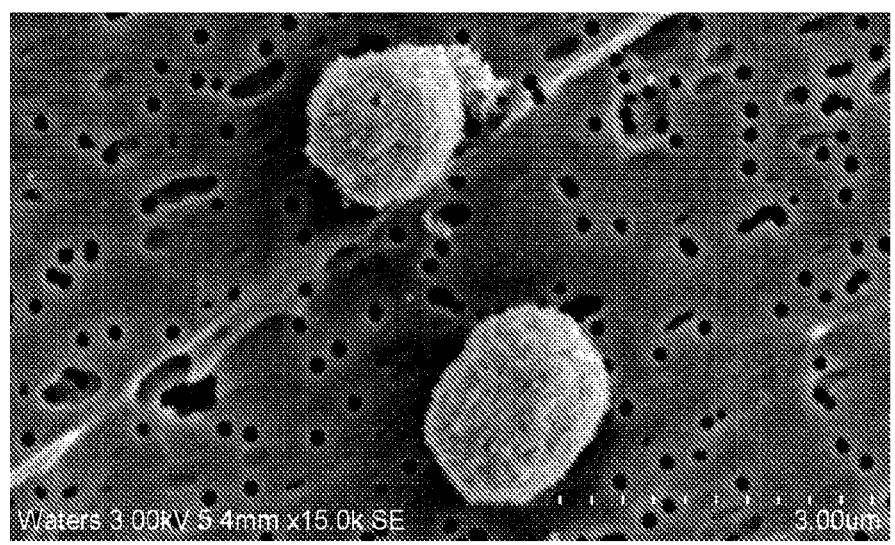
FIG. 5 is an SEM analysis of Products 74L3 from Example 74.
Figure 6:
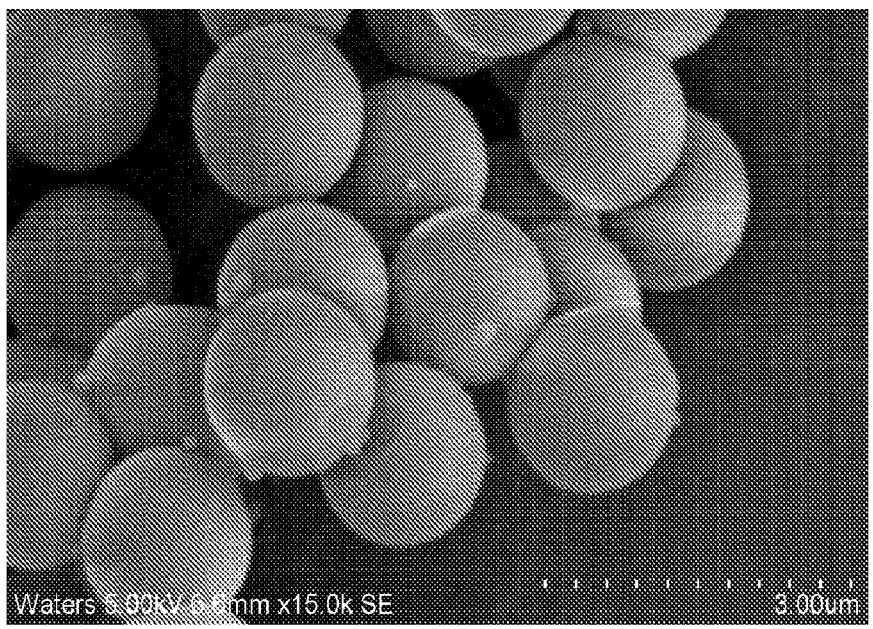
FIG. 6 is an SEM analysis of Products 76L2 (top) and 77L2 (bottom) from Examples 76 and 77.
Figure 6:
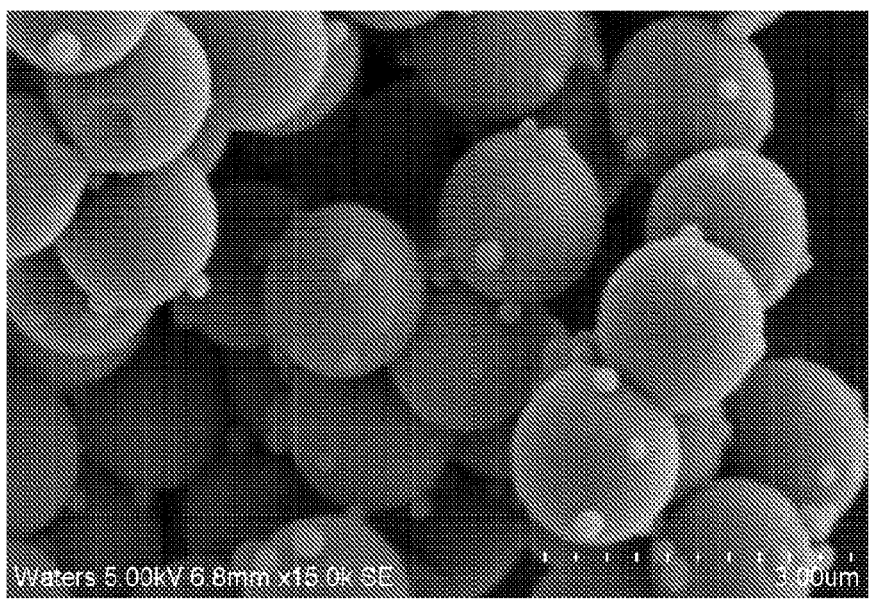

This process was repeated twice more to produce products a second (product 74L2) and third layer (product 74L3). The final product was air dried on a Nucleopore filter (0.2 Whatman). SEM analysis (FIG. 5) shows a final particle with a rough surface, having an average particle size of 1.4 This product has a 0.1 µm thick porous shell on the top of a 0.35 µm non-porous silica shell on a 0.5 µm diameter magnetic core particle.

mL of solvent (water: anhydrous ethanol 2:1 v/v) and was labeled solution B. Solution B was added into solution A and allowed to continue sonicate for 20 minutes. The mixture was then transferred into a 1 L round bottom flask and stirred at 750 rpm. Ammonium hydroxide solution (30%, J. T. Baker) was added into the flask and allowed to continue stirring for 5 minutes. A 3.3:1 mol ratio mixture of tetraethoxysilane (TEOS, Sigma-Aldrich) and 1,2-bis(triethoxysilyl) ethane (BTEE, Gelest) was first diluted with anhydrous ethanol (dilution factor=3) and was added to the flask using a peristaltic pump (ISMATEC, ISM596D equipped with 1/32 inch diameter PTFE tubing from Cole-Palmer) at 50 µL/min Once all the mixture was added the reaction was allowed to continue for 1 h before wash. The wash steps were performed as detailed in Example 28. This process was repeated two more times. The volume of the solution was increased to compensate for the increase in the solids volume maintaining the concentrations of the reagents constant. See Table 23 below for specific reaction conditions. An SEM image of product 76L2 is shown in FIG. 6.

TABLE 23

| Product | Layer | silane mixture (mL) | $C_{18}$TAB (g) | Sol. A (mL) | P123 (g) | Sol. B (mL) | NH$_4$OH (mL) | particle size (µm) | SEM Comments |
| --- | --- | --- | --- | --- | --- | --- | --- | --- | --- |
| 76L1 | 1 | 6.0 | 3.0 | 200 | 58 | 400 | 18 | 1.54 | Well dispersed particles No fine particles |
| 76L2 | 2 | 7.5 | 5.0 | 300 | 92 | 500 | 30 | 1.66 | Dispersed particles Small amount of fine particles |
| 76L3 | 3 | 8.1 | 6.0 | 400 | 115 | 600 | 45 | 1.84 | Dispersed particles Small amount of fine particles |

Example 75

Products 73L2 and 74L3 are thermally treated under a nitrogen atmosphere at 500° C. and 800-900° C. following the process of Example 21. An inert atmosphere is used to prevent oxidation of the diamond or magnetite cores. Classification is performed to improve the particle size distribution and remove any fines or agglomerated materials. These materials are rehydroxylated using the process of Example 64 and are reacted with octadecyldimethylchlorosilane and trimethylchlorosilane using the process of Example 65. $C_{18}$-bonded diamond core superficially porous particles (product 75a) and $C_{18}$-bonded magnetic core superficially porous particles (product 75b) are packed into a chromatographic device and performance is evaluated.

Example 76

1.26 µm nonporous silica particles (10.4 g), that were previously thermally treated at 600° C. (10 h) and rehydroxylated using 10% nitric acid (Fisher scientific), were dispersed in 100 mL of solvent (water: anhydrous ethanol 2:1 v/v) by sonicating for 10 minutes. Separately, octadecyltrimethylammonium bromide (3.0 g, $C_{18}$TAB, Sigma-Aldrich) was dissolved in 100 mL of solvent (water: anhydrous ethanol 2:1 v/v). The $C_{18}$TAB solution was then added into the particle solution and sonicated for 10 minutes. This solution was labeled solution A. In a separate beaker of Pluronic P123 (58.0 g, Sigma-Aldrich) was dissolved in 400

Example 77

The process of Example 76 was modified using a 1.6:1 mol ratio mixture of tetraethoxysilane and 1,2-bis(triethoxysilyl)ethane. See Table 24 below for specific reaction data. An SEM image of product 77L2 is shown in FIG. 6.

TABLE 24

| Product | Layer | particle size (µm) | SEM Comments |
| --- | --- | --- | --- |
| 77L1 | 1 | 1.47 | Well dispersed particles No fine particles |
| 77L2 | 2 | 1.58 | Dispersed particles Small amount of fine particles |
| 77L3 | 3 | 1.68 | Higher amount of fine particles |

Example 78

The process of Example 76 was modified using only 1,2-bis(triethoxysilyl)ethane. An SEM image of product 78L2 indicates a 1.55 µm average particle size that is highly aggregated and has increased quantities of fine particles (<1 µm).

Example 79

Hybrid porous layer, superficially porous particles (3.3 g) prepared following Examples 28-32 were dispersed in a 2 molar solution of hydrochloric acid in acetone. The mixture was mechanically stirred for 18 hours at room temperature. Products were isolated by centrifugation (Form a Scientific Model 5681, 4,000 rpm, 10 min) followed by repeated washes with deionized water until the pH was greater than 6, followed by two methanol washes. Sonication was used between washes to improved dispersion. Products were dried at 80° C. under vacuum for 16 hours and submitted for SEM, and nitrogen sorption analysis. Material data is shown in Table 25. Average particle size was determined by SEM.

TABLE 25

| Product | Precursor | Particle Size (μm) | Surface Area SSA (m$^2$/g) | Pore Volume SPV (cm$^3$/g) |
|---|---|---|---|---|
| 79a | 28f | 1.43 | 178 | 0.09 |
| 79b | 29c | 1.57 | 292 | 0.17 |
| 79c | 29d | 1.68 | 400 | 0.23 |
| 79d | 32a | 1.65 | 246 | 0.14 |
| 79e | 32b | 1.61 | 296 | 0.17 |

Example 80

Select materials from Examples 76-78 have surfactants removed by acid extraction following the process of Example 79.

Example 81

Select materials from Examples 79-80 are treated by ozonolysis following the process of Example 41, hydrothermally treated following the process of Example 44, and acid treated as detailed in Example 79, and classification to remove fines and/or agglomerated materials. These materials are reacted with octadecyldimethylchlorosilane and trimethylchlorosilane using the process of Example 65. These C$_{18}$-bonded hybrid porous layer superficially porous particles are packed into a chromatographic device and performance is evaluated.

Example 82

Select unbounded materials from Examples 63, 64, 75, 79-81 have silanol groups surface modified following the process of Jiang {U.S. Pat. Nos. 6,686,035; 7,223,473; 7,919,177} and Wyndham {WO 2008/103423} with reagents including (but not limited to) of the type:

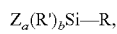

where
Z=Cl, Br, I, C$_1$-C$_5$ alkoxy, dialkylamino or trifluoromethanesulfonate;
a and b are each an integer from 0 to 3 provided that a+b=3;
R' is a C$_1$-C$_6$ straight, cyclic or branched alkyl group, methyl, ethyl, propyl, isopropyl, butyl, t-butyl, sec-butyl, pentyl, isopentyl, hexyl and cyclohexyl
R is a functionalizing group selected from the group consisting of alkyl, alkenyl, alkynyl, aryl, cyano, amino, diol, nitro, ester, a cation or anion exchange group, a pyridyl group, a pentafluorophenylalkyl group, an alkyl or aryl group containing an embedded polar functionality, and a C$_1$-C$_{30}$ alkyl group Advantageous silanol surface modification groups include (but are not limited to) octyltrichlorosilane, octadecyltrichlorosilane, octyldimethylchlorosilane, phenylhexyltrichlorosilane, n-butyldimethylchlorosilane, tert-butyldimethylchlorosilane, triisopropylchlorosilane, cyanopropyldiisopropylchlorosilane, pentafluorophenylpropyltrichlorosilane, 2-pyridylethyltrimethoxysilane, and octadecyldimethylchlorosilane Alternatively, the materials are surface modified by forming an organic covalent bond between surface organic groups and the modifying reagent. Alternatively, the materials are surface modified by coating with a polymer. Alternatively, the materials are modified by a combination of organic group and silanol group modification. Alternatively, the materials are surface modified by a combination of silanol group modification and coating with a polymer. Alternatively, the materials are surface modified by a combination of organic group modification and coating with a polymer. Alternatively, the materials are surface modified by a combination of organic group modification, silanol group modification, and coating with a polymer.

Example 83

Select unbounded materials from Example 45 (products 45t-45x) are modified with one more or more layers formed using an organosiloxane, a mixture of organosiloxane and alkoxysilane, polyorganoalkoxysilanes, a hybrid inorganic/organic surrounding material, or combination thereof. These materials have increased hybrid content near the external particle surface.

Example 84

Select unbounded materials from Example 45 (products 45t-45x) are modified with a hybrid inorganic/organic surrounding material resulting in (SiO$_2$)$_d$/(O$_{1.5}$SiCH$_2$CH$_2$SiO$_{1.5}$) where d is 0-30, a hybrid inorganic/organic surrounding material resulting in (SiO$_2$)$_d$/(O$_{1.5}$SiCH$_2$CH$_3$) where d is 0-30, or combination thereof. These products have increased hybrid content near the external particle surface, and have a 0.01-0.20 cm$^3$/g reduction in porosity with respect to the feed material from Example 45.

EQUIVALENTS

Those skilled in the art will recognize, or be able to ascertain using no more than routine experimentation, many equivalents to the specific embodiments of the invention described herein. Such equivalents are intended to be encompassed by this invention.

INCORPORATION BY REFERENCE

All publications, patent applications and patents identified herein are expressly incorporated herein by reference in their entireties.

The invention claimed is:
1. A superficially porous material comprising superficially porous particles, wherein the superficially porous particles comprise an inorganic/organic hybrid core and one or more layers of a porous shell material surrounding the inorganic/ organic hybrid core wherein the inorganic/organic hybrid core has a pore volume of less than 0.10 cc/g; and wherein the inorganic/organic hybrid core has the formula:

$$(SiO_2)_d/[R^2((R)_p(R^1)_q SiO_t)_m] \quad (I)$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl, wherein $R^2$ is attached to two or more silicon atoms;

R, $R^1$ and $R^2$ are optionally substituted;

p and q are each independently 0.0 to 2.0, t is 0.5, 1.0, or 1.5;

d is 0 to about 30; and m=2-20, $$t = \frac{(3-(p+q))}{2},$$

and p+q≤2.

2. The superficially porous material of claim 1, wherein the superficially porous material has chromatographically enhancing pore geometry.

3. The superficially porous material of claim 1 wherein the porous shell material is a porous inorganic/organic hybrid material.

4. The superficially porous material of claim 1 wherein the porous shell material is a porous silica.

5. The superficially porous material of claim 1 wherein the porous shell material is a porous composite material.

6. The superficially porous material of claim 1, wherein the superficially porous particles comprise an inorganic/organic hybrid core and more than one layer of a porous shell material wherein each layer of the porous shell material is independently selected from a porous inorganic/organic hybrid material of formula (I) according to claim 1, a porous silica, a porous composite material, or mixtures thereof.

7. The superficially porous material of claim 1 wherein the superficially porous material has a spherical core morphology, a rod shaped core morphology, a bent-rod shaped core morphology, a toroid shaped core morphology, or a dumbbell shaped core morphology.

8. The superficially porous material of claim 1, wherein the inorganic/organic hybrid core has a particle size of 0.5-10 μm.

9. The superficially porous material of claim 1, wherein the superficially porous particles comprise an inorganic/organic hybrid core and more than one layer of a porous shell material, wherein each layer of porous shell material is independently from 0.05 μm to 5 μm in thickness as measured perpendicular to an outer surface of the inorganic/organic hybrid core.

10. The superficially porous material of claim 1, wherein the superficially porous material has an average particle size between 0.8-10.0 μm.

11. The superficially porous material of claim 1, wherein the superficially porous material has an average pore diameter of about 25-600 Å.

12. The superficially porous material of claim 1, wherein the superficially porous material has an average pore volume of about 0.11-0.50 cm³/g.

13. The superficially porous material of claim 1, wherein pore surface area is between about 10 m²/g and 400 m²/g.

14. The superficially porous material of claim 1, which has been further surface modified.

15. The superficially porous material of claim 1, which has been further surface modified by:

coating with a polymer;

by coating with a polymer by a combination of organic group and silanol group modification;

a combination of organic group modification and coating with a polymer;

a combination of silanol group modification and coating with a polymer;

formation of an organic covalent bond between an organic group of the material and a modifying reagent; or a combination of organic group modification, silanol group modification and coating with a polymer.

16. A separations device having a stationary phase comprising the superficially porous material of claim 1.

17. A chromatographic column, comprising a) a column having a cylindrical interior for accepting a packing material and b) a packed chromatographic bed comprising the superficially porous material of claim 1.

18. A chromatographic device, comprising a) an interior channel for accepting a packing material and b) a packed chromatographic bed comprising the superficially porous material of claim 1.

19. A kit comprising the superficially porous material of claim 1, and instructions for use.

20. The superficially porous material of claim 1, wherein the superficially porous particles comprise an inorganic/organic hybrid core and one or more layer of a porous shell material; and wherein each layer of the porous shell material is independently selected from a porous inorganic/organic hybrid material of formula (I) according to claim 1.

* * * * *